United States Patent
Cuk

(10) Patent No.: US 8,134,351 B2
(45) Date of Patent: Mar. 13, 2012

(54) FOUR-SWITCH STEP-DOWN STORAGELESS CONVERTER

(75) Inventor: Slobodan Cuk, Laguna Niguel, CA (US)

(73) Assignee: Cuks, LLC, Irvine, CA (US)

( * ) Notice: Subject to any disclaimer, the term of this patent is extended or adjusted under 35 U.S.C. 154(b) by 79 days.

(21) Appl. No.: 12/803,670

(22) Filed: Jun. 30, 2010

(65) Prior Publication Data

US 2012/0001612 A1    Jan. 5, 2012

(51) Int. Cl.
*G05F 1/59*    (2006.01)
*G05F 1/595*   (2006.01)

(52) U.S. Cl. ........................................ 323/271; 323/282

(58) Field of Classification Search .............. 323/271, 323/282

See application file for complete search history.

(56) References Cited

U.S. PATENT DOCUMENTS

| | | | | |
|---|---|---|---|---|
| 5,262,930 A | * | 11/1993 | Hua et al. | ........ 363/21.03 |
| 6,486,642 B1 | * | 11/2002 | Qian | ........ 323/259 |
| 6,525,513 B1 | * | 2/2003 | Zhao | ........ 323/222 |
| 7,215,101 B2 | * | 5/2007 | Chang | ........ 323/224 |
| 7,332,897 B2 | * | 2/2008 | Lee et al. | ........ 323/222 |

* cited by examiner

*Primary Examiner* — Jeffrey Sterrett
*Assistant Examiner* — Nusrat Quddus

(57) ABSTRACT

A four-switch step-down storageless DC-DC converter is provided having simultaneously ultra high efficiency of over 99% in an ultra compact size, while also providing a regulation and maintaining fast transient response while in regulation. Because of its storageless feature it is ideal for demanding computer applications, such as VRM (Voltage Regulator Modules), with extremely fast step-load load current change requirements and tight output voltage regulation requiring ultra low output ripple voltages during the transients.

19 Claims, 43 Drawing Sheets

FOUR-SWITCH STEP-DOWN STORAGELESS CONVERTER

FIELD OF INVENTION

The general field of invention is switching DC-DC converters with step-down DC voltage characteristic. More specifically it also belongs to the class of non-isolated DC-DC converters. The present DC-DC converters all store the DC energy in the magnetic devices, inductors and/or transformers. The present invention belongs to the new category of DC-DC converters, which do not store DC energy in magnetics and therefore result in important performance advantages, such as ultra high efficiency, fast transient response; extremely compact size and ultra low weight.

DEFINITIONS AND CLASSIFICATIONS

The following notation is consistently used throughout this text in order to facilitate easier delineation between various quantities:
1. DC—Shorthand notation historically referring to Direct Current but by now has acquired wider meaning and refers generically to circuits with DC quantities;
2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta V$—The AC ripple voltage on resonant capacitor $C_r$;
6. $f_S$—Switching frequency of converter;
7. $T_S$—Switching period of converter inversely proportional to switching frequency $f_S$;
8. $T_{ON}$—ON-time interval $T_{ON}=DT_S$ during which switch $S_1$ is turned—ON;
9. $T_{OFF}$—OFF-time interval $T_{OFF}=D'T_S$ during which switch S1 is turned—OFF;
10. D—Duty ratio of the main controlling switch $S_1$;
11. $D_2$—Freewheeling duty ratio.
12. D'—Complementary duty ratio D'=1−D of the switch $S_2$ complementary to main controlling switch $S_1$;
13. $f_{r1}$—First resonant switching frequency defined by resonant inductor $L_{r1}$ and resonant capacitor $C_r$;
14. $T_{r1}$—Resonant period defined as $T_{r1}=1/f_{r1}$;
15. $t_{r1}$—One half of resonant period $T_{r1}$;
16. $f_{r2}$—Second resonant switching frequency defined by resonant inductor $L_{r1}$ and resonant capacitor $C_r$;
17. $T_{r2}$—Second resonant period defined as $T_{r2}=1/f_{r2}$;
18. $t_{r2}$—One half of second resonant period $T_{r2}$;
19. $S_1$—Controllable switch with two switch states: ON and OFF;
20. $S_2$—switch which operates in complementary way to switch S=1: when S is closed $S_2$ is open and opposite, when $S_1$ is open $S_2$ is closed;
17. $CR_1$—Two-terminal Current Rectifier, whose ON and OFF states depend on controlling switch $S_1$ states and the circuit parameters.
18. $CR_2$—Two-terminal Current Rectifier, whose ON and OFF states depend on controlling switch $S_2$ states and the circuit parameters.

BRIEF DESCRIPTION OF THE DRAWINGS

FIG. 3a illustrates DC voltage gain characteristic for the buck converter of FIG. 1a, FIG. 3b illustrates inductor current of the buck converter in FIG. 1a, and FIG. 3c illustrates inductor current transient from 25% load to 100% load current for the buck converter of FIG. 1a.

FIG. 6a illustrates the first embodiment of the present invention and FIG. 6b illustrates the states of two controllable switches and two current rectifiers for the converter of FIG. 6a.

FIG. 9a illustrates another embodiment of the present invention with three controllable MOSFET transistors and one current rectifier and FIG. 9b illustrates the states of three controllable switches and one current rectifier for the converter of FIG. 9a.

FIG. 10a illustrates another embodiment of the present invention with four controllable MOSFET transistors and FIG. 10b illustrates the states of four controllable MOSFET transistors for the converter of FIG. 10a.

FIG. 11a illustrates a linear switched network for converter of FIG. 8b for ON-time interval $DT_S$ and FIG. 11b illustrates equivalent circuit model for linear switched network of FIG. 11a.

FIG. 12a illustrates a linear switched network for converter of FIG. 8b for OFF-time interval $(1-D)T_S$ and FIG. 12b illustrates equivalent circuit model for linear switched network of FIG. 12a.

FIG. 15a illustrates volt-second requirements for the inductor of the buck converter of FIG. 1a, and FIG. 15b illustrates the volt-second requirements for the resonant inductors $L_{r1}$ and $L_{r2}$ of the converter in FIG. 6a.

FIG. 16a illustrates instantaneous and DC input current of a converter of FIG. 6a and FIG. 16b illustrates the instantaneous and DC load current for converter of FIG. 6a.

FIG. 17b illustrates the input current and FIG. 17c the output current of the converter in FIG. 17a.

FIG. 18b shows the output current to be twice compared to the output current shown jn FIG. 17b for the converter of FIG. 17a.

FIG. 24b illustrates the switched network for free-wheeling interval and FIG. 24c illustrates the switched network for remaining OFF-time interval of the switching converter of FIG. 9a.

FIG. 26b illustrates additional input switch current waveform under the same conditions as for FIG. 26a.

FIG. 40a is a four-switch converter showing two high side drivers used in the experimental prototype of a 750 W converter and the Schottky rectifier CR, and FIG. 40b are the state of the switches in the converter of FIG. 40a.

FIG. 42b illustrates the output voltage ripple waveforms obtained on 750 W experimental unit operating at full load current of 15 A.

PRIOR ART

Prior-Art Buck Converter

Figure 1A:
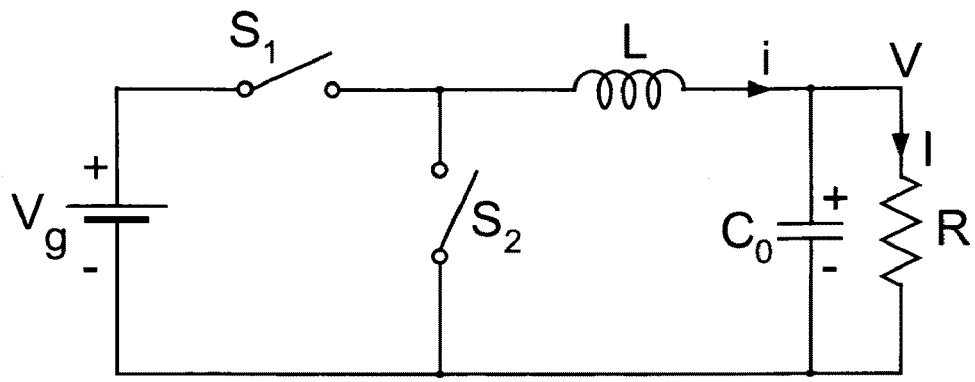
FIG. 1a illustrates a prior-art buck converter.
Figure 1B:
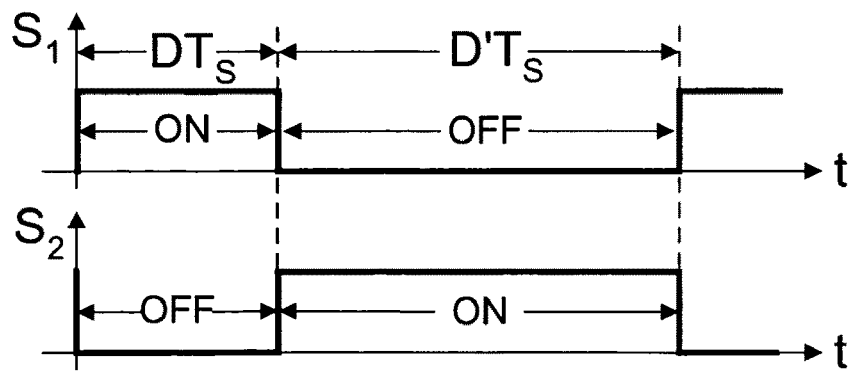
FIG. 1b illustrates the state of the switches for the buck converter of FIG. 1a, and FIG. 1c illustrates a prior-art buck converter implemented with semiconductor switching devices.

The non-isolated prior-art Pulse Width Modulated (PWM) buck switching converter shown in FIG. 1a consists of two complementary switches: when $S_1$ is ON, $S_2$ is OFF and vice versa as shown by the switch states in FIG. 1b. It is capable of step-down only of the input DC voltage dependent of operating duty ratio D, which is the ratio of the ON time of switch $S_1$ and switching period $T_S$.

Figure 1C:
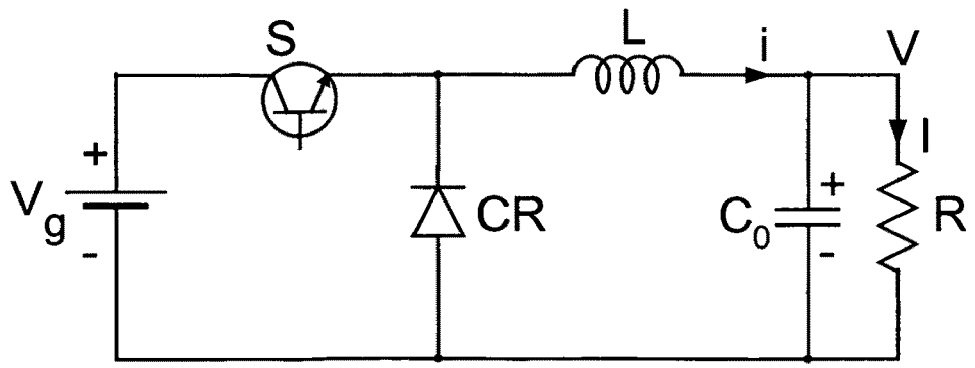

The minimal semiconductor switch implementation using bipolar transistor and diode are shown in FIG. 1c.

Figure 3A:
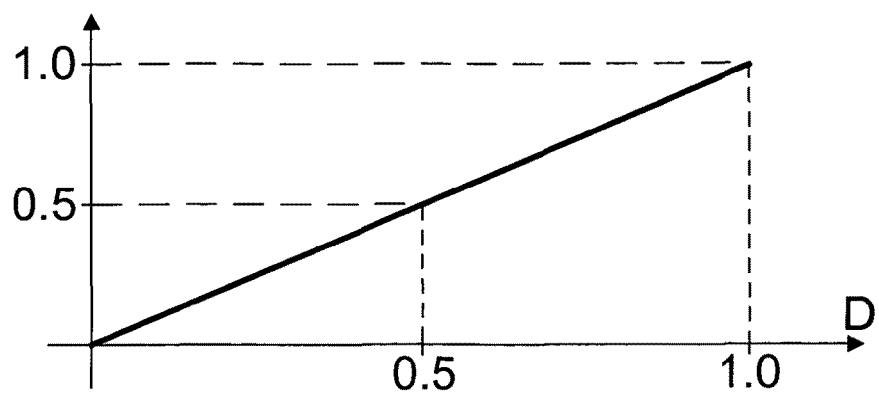

The DC gain characteristic of the buck converter is given by:

$$V/V_g = D \qquad (1)$$

and plotted in the FIG. 3a.

Figure 3B:
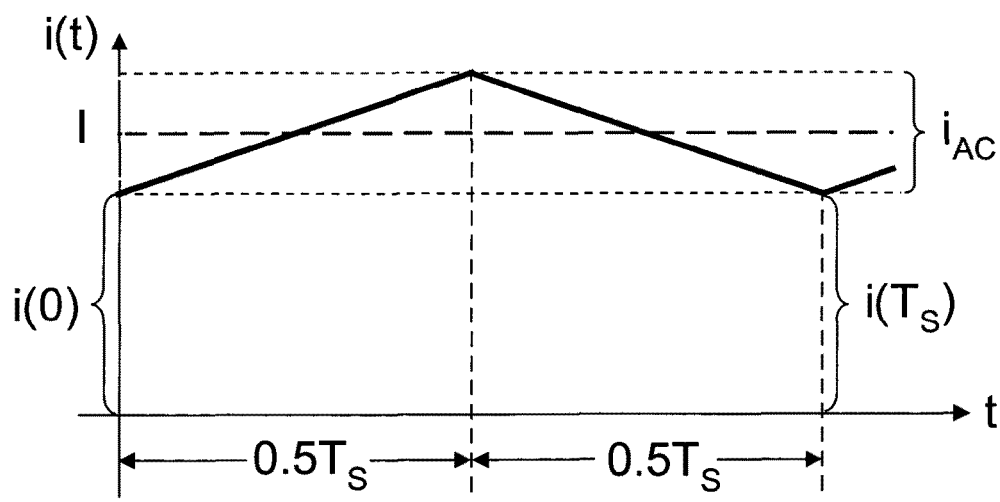

The inductor L in the buck converter of FIG. 1a must conduct a full DC load current so that its instantaneous inductor current waveform i(t) shown on FIG. 3b must have a DC-bias equal to DC load current and a superimposed AC triangular ripple current as in FIG. 3b. This implies that the inductor L must store DC energy.

Figure 3C:
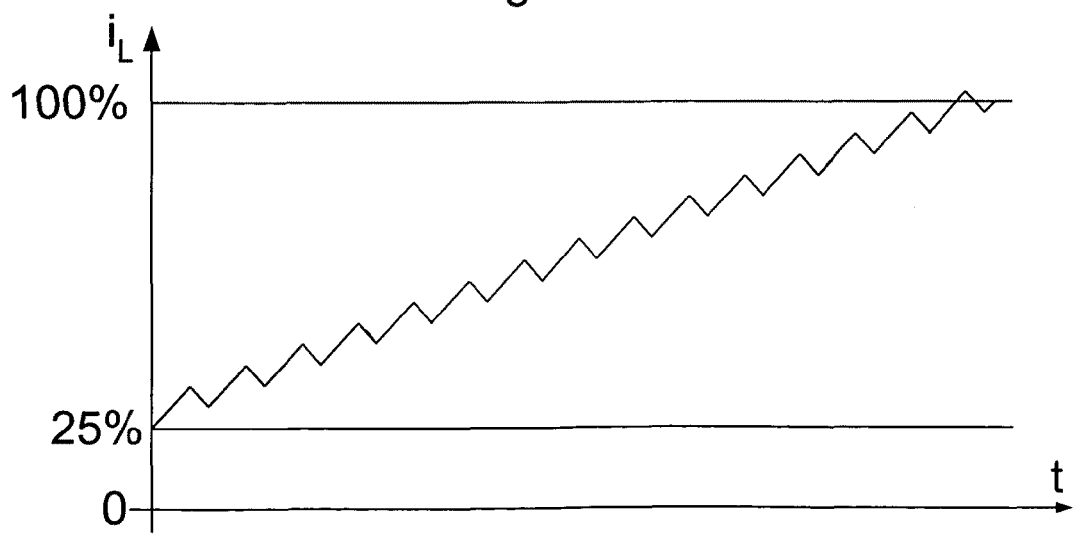

Herein lies one of the major limitation of the prior-art buck converter and all conventional switching converters currently known: they all must store DC energy every cycle. As a direct consequence, the converter can not respond immediately to a sudden change of the load current demand, such as from 25% of the load to the full 100% load as illustrated in FIG. 3c. Instead, the buck converter must pass through a large number of switching cycles before the instantaneous inductor current settles at the new steady state which has a full DC load current.

Figure 4A:
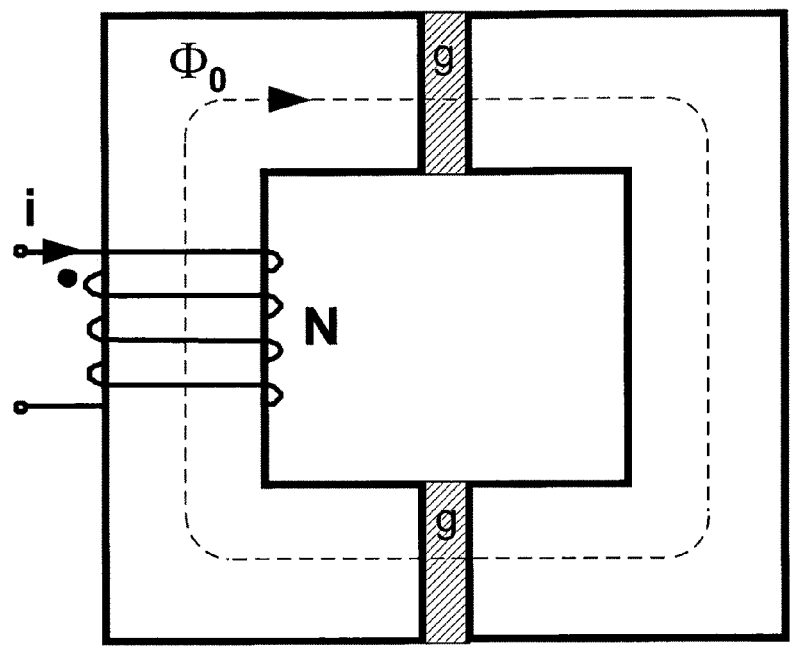
FIG. 4a shows a magnetic core with the air-gap needed for inductor of buck converter in FIG. 1a, and FIG. 4b shows the two-phase, phase-shifted buck converter.
Figure 4B:
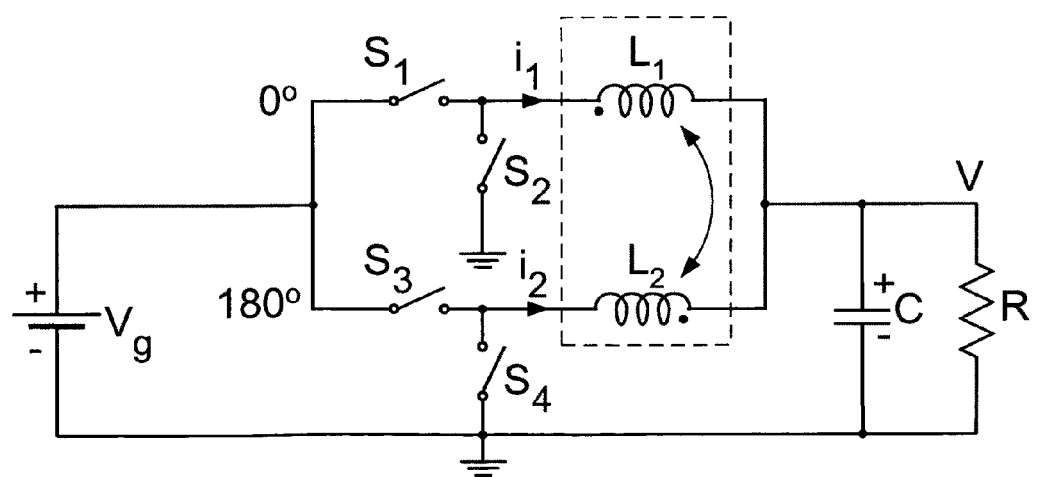

In order to store the DC energy, inductor L must be built with an air-gap such as shown in FIG. 4a, whose size is directly proportional to the DC energy, which needs to be stored. Clearly, addition of the air-gap reduces the inductance L dramatically, and therefore further increases the size of the core needed to provide acceptable AC ripple current of around 20% peak-to-peak relative to DC current I. Ultimately, for a very large DC currents (100 A or more), the air-gap needed is so large, that the magnetic core only increases inductance of the winding by a factor of two or three compared to an inductor winding of the same size without core material. Considering that present day ferrite material have a relative permeability of 2,000 or more, that results in reduction of inductance by a factor of 1000. To reduce the magnetic size and to reduce the output voltage ripple, two buck converters may be operated close to 1 MHz switching frequency while being 180 degree out of phase and use coupled-inductors as illustrated in FIG. 4b.

Figure 5A:
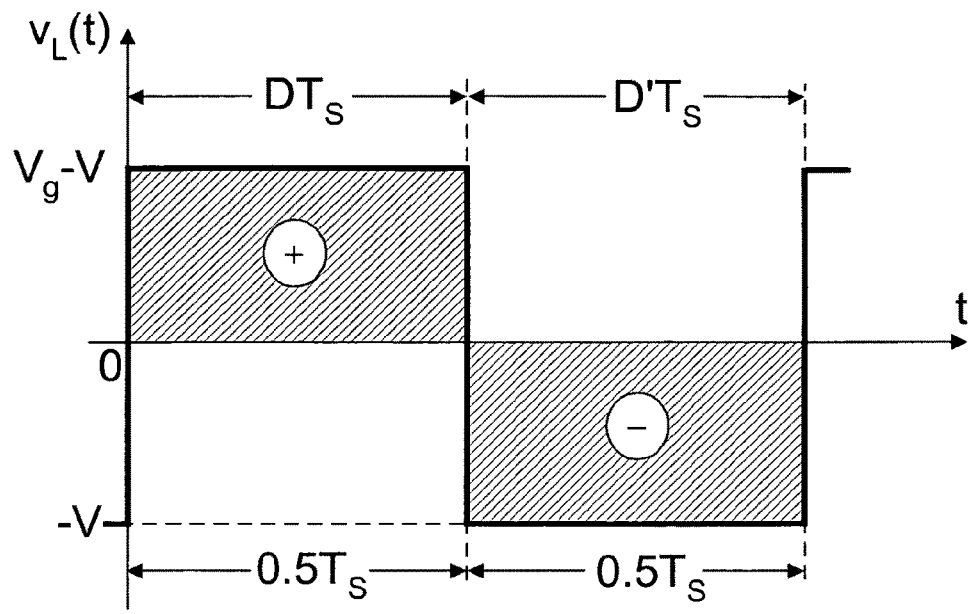
FIG. 5a illustrates the volt-second requirements for the inductor of the buck converter in FIG. 1a and FIG. 5b shows the volt-seconds as a function of the duty ratio D.

Inductor size is also required to be very large because it must also support a superimposed AC flux as seen in FIG. 5a. This AC flux is very large due to large volts-seconds imposed on the core as given by:

$$\text{Volt-sec}/(VT_S) = (1-D) \quad (2)$$

Figure 5B:
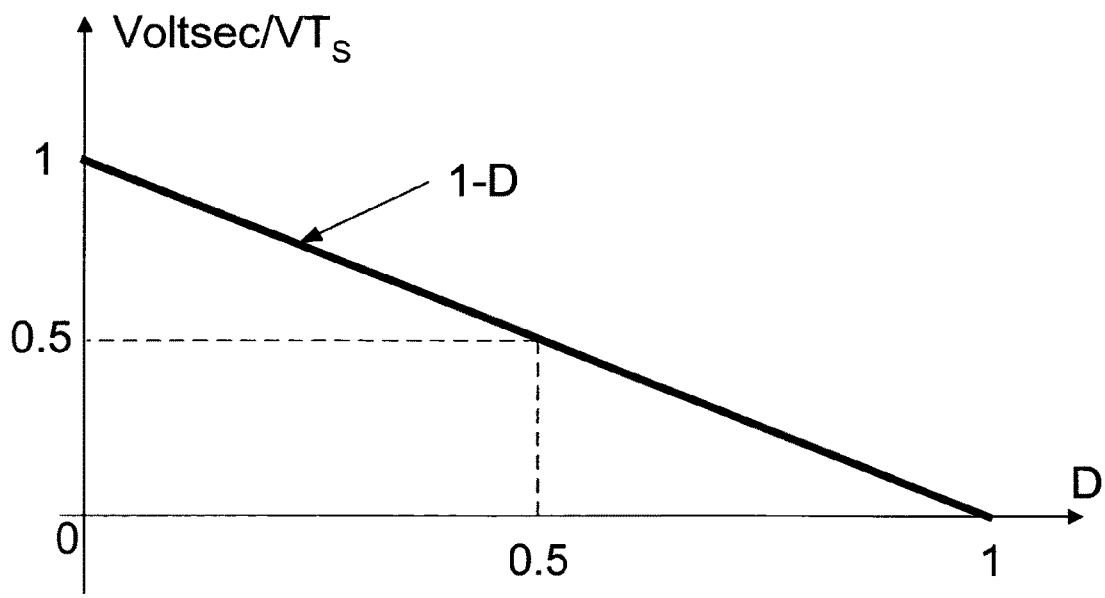

The graph of Volt-seconds as a function of duty ratio D is shown in FIG. 5b.

Note that for large step down (small duty ratio D), the volt-seconds are approaching $VT_S$, where V is regulated output DC voltage and $T_S$ switching period.

In summary, the size of the inductor L in the prior-art buck converter is very large due to the two basic requirements:
 a) need for large DC energy storage;
 b) large AC volt-seconds imposed on the inductor.

The present approach to minimize inductor size is to increase switching frequency sufficiently high, such as to several MHz, so that small inductance value could be used. This clearly reduces efficiency dramatically.

High volt-seconds (and consequent large magnetic core size requirements) and DC-bias and air-gap seem to be inevitable in switching power conversion. However, this is not the case, as the new storageless converter with step-down DC gain characteristic introduced in the next section will demonstrate.

Objective

The main objective is to replace the current prior-art buck converter with an alternative solution which offers much reduced size and weight, increased efficiency and provide the storageless operation with fast transient response.

SUMMARY OF THE INVENTION

Basic Operation of the Storageless DC-DC Converter

Figure 6A:
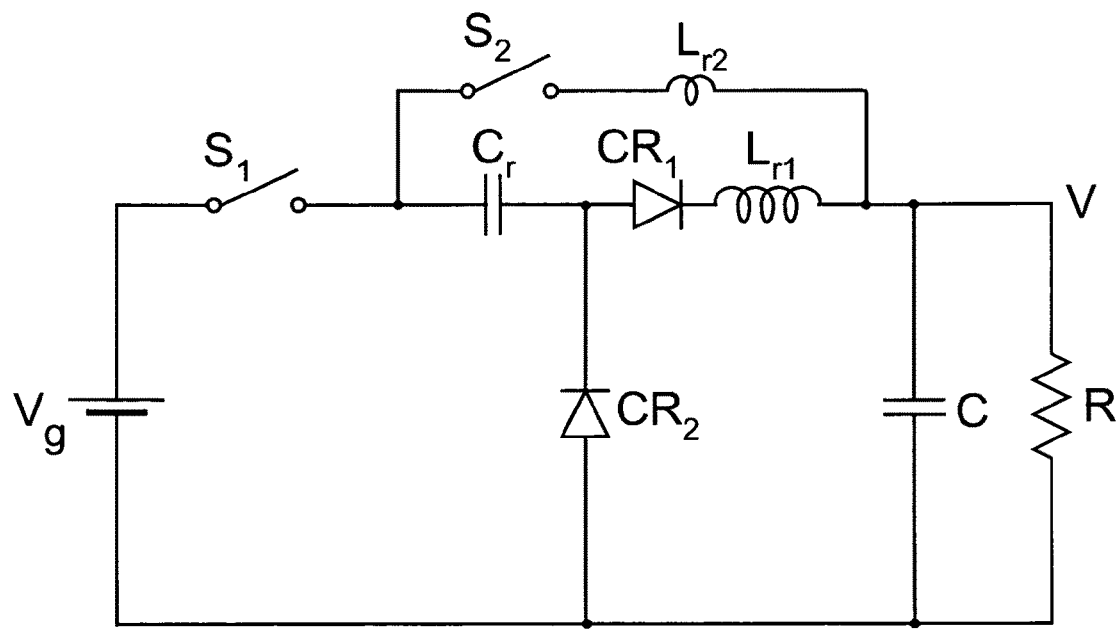

The present invention is shown in FIG. 6a. The switching topology comprises four switches: two controlling switches $S_1$ and $S_2$ and two current rectifier switches $CR_1$ and $CR_2$.

Note also the presence of the first resonant inductor $L_{r1}$ in series with the current rectifier $CR_1$ and second resonant inductor $L_{r2}$ in series with the switch $S_2$. Such placement of inductors into branches with switches as illustrated in FIG. 7a and FIG. 7b is not allowed in conventional square-wave and resonant switching converters (2,3). In conventional square-wave switching converters this would result in large turn-OFF voltage across switch as shown in FIG. 7c, which would ultimately destroy the switch. However, here it is essential for the new switching method consisting of two independent resonant circuits, one obtained for the ON-time switching period and the other obtained for the OFF-time switching period, as defined by the switch states in diagram of FIG. 6b.

Figure 6B:
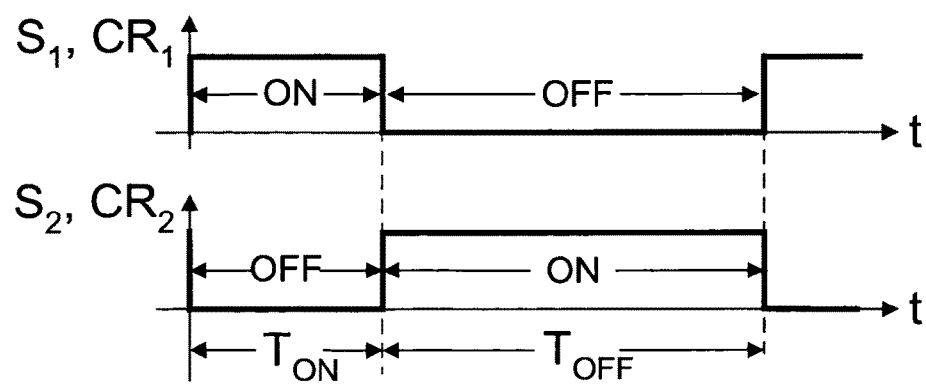
Figure 7A:
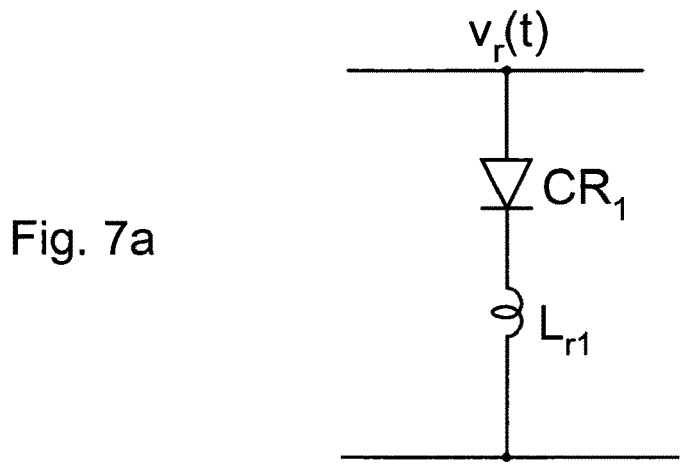
FIG. 7a illustrates a branch comprising a current rectifier in series with an inductor.
Figure 7B:
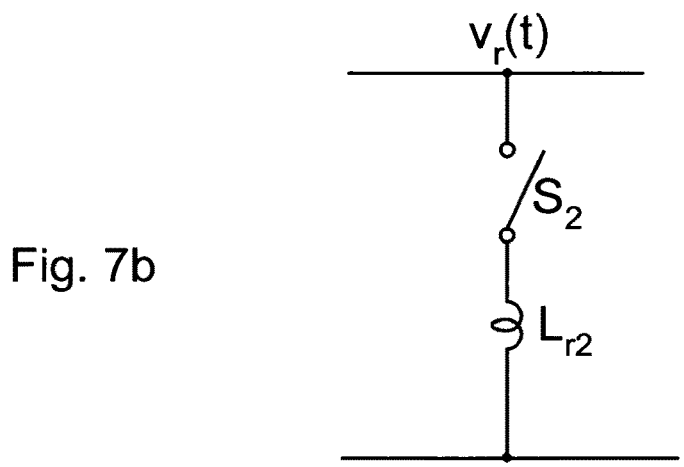
FIG. 7b illustrates a branch comprising an ideal switch in series with an inductor and FIG. 7c illustrates the voltage waveform of inductor when current through ideal switch in FIG. 7b is suddenly interrupted.
Figure 7C:
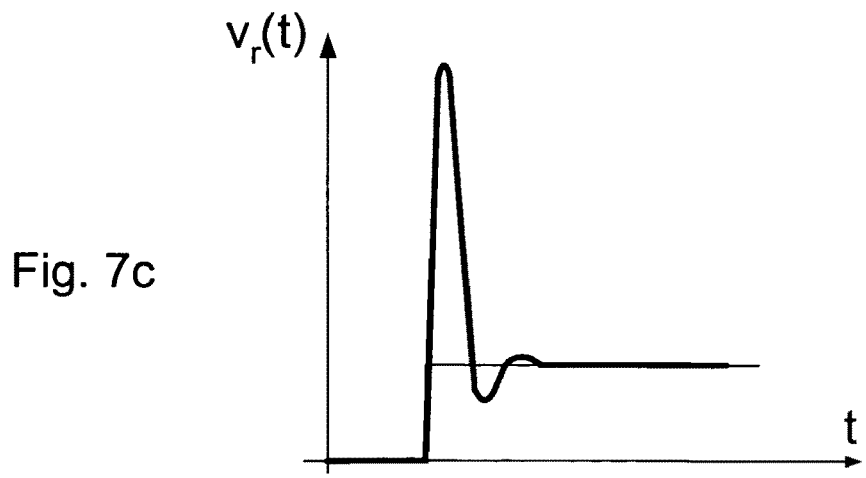

Note that the two active switches, $S_1$ and $S_2$ are switching out of phase: when one is ON, the other is OFF and vice versa as per timing diagram of FIG. 6b. The two passive current rectifier switches $CR_1$ and $CR_2$ operate in-phase with their respective controlling switches $S_1$ and $S_2$ as per switching timing diagram in FIG. 6b in its first objective to provide a fixed 2:1 stepped-down conversion ratio. The second objective of the switching timing control will be to provide, in addition to a fixed 2:1 step-down conversion ratio, a continuous control of the output voltage with larger step-down conversion ratios by use of duty ratio control. To accomplish that objective, diode rectifier $CR_1$ switching timing different that in FIG. 6b will be needed as fully described in later section.

Alternative Switch Implementations

Figure 8A:
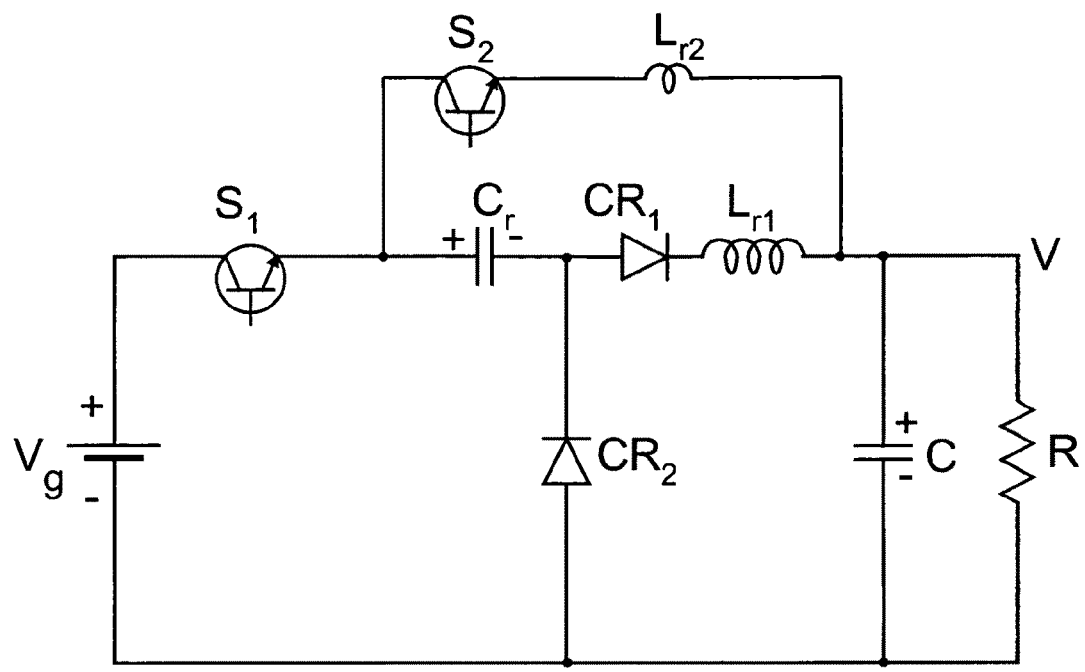
FIG. 8a illustrates another embodiment of the present invention of FIG. 6a with two controllable bi-polar transistors and two current rectifiers.
Figure 8B:
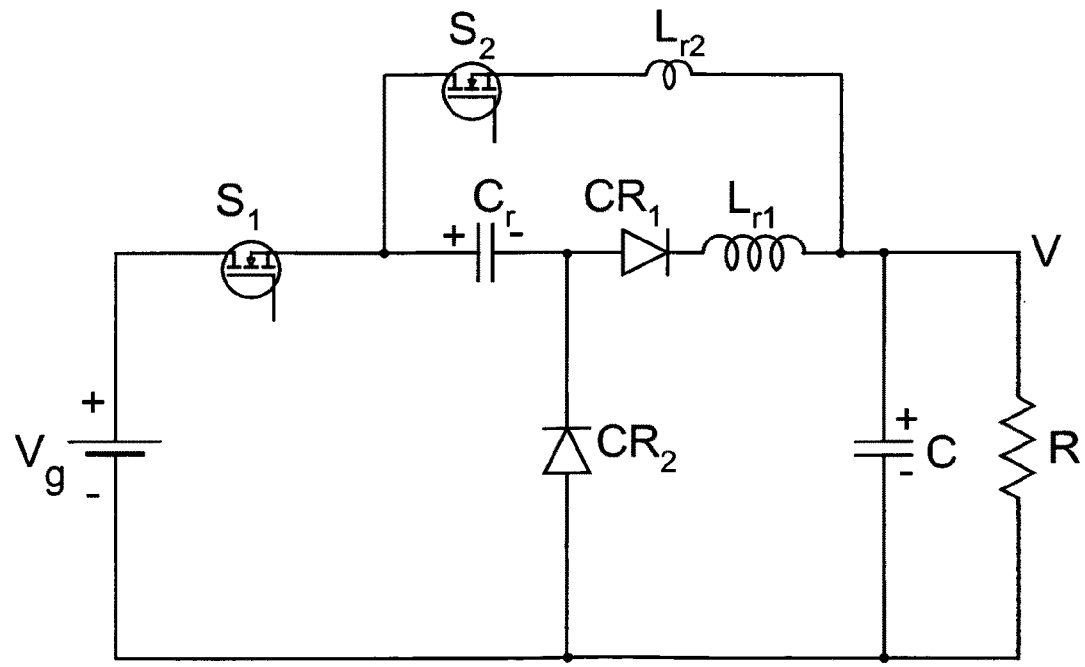
FIG. 8b illustrates yet another embodiment of the present invention of FIG. 6a with two controllable MOSFET transistors and two current rectifiers.
Figure 9A:
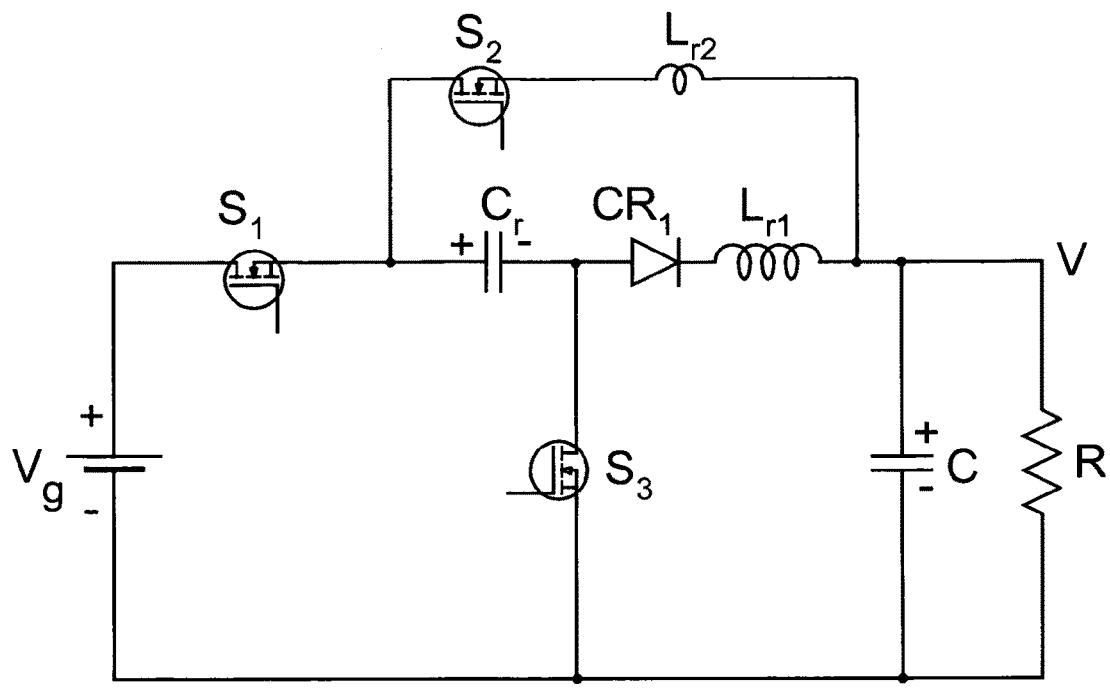
Figure 9B:
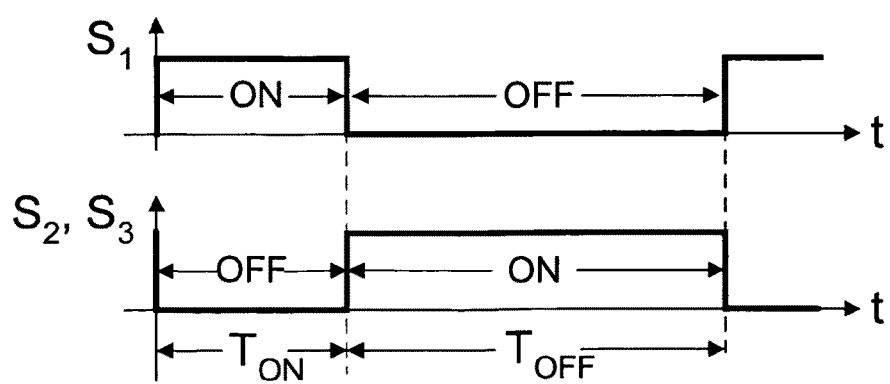
Figure 10A:
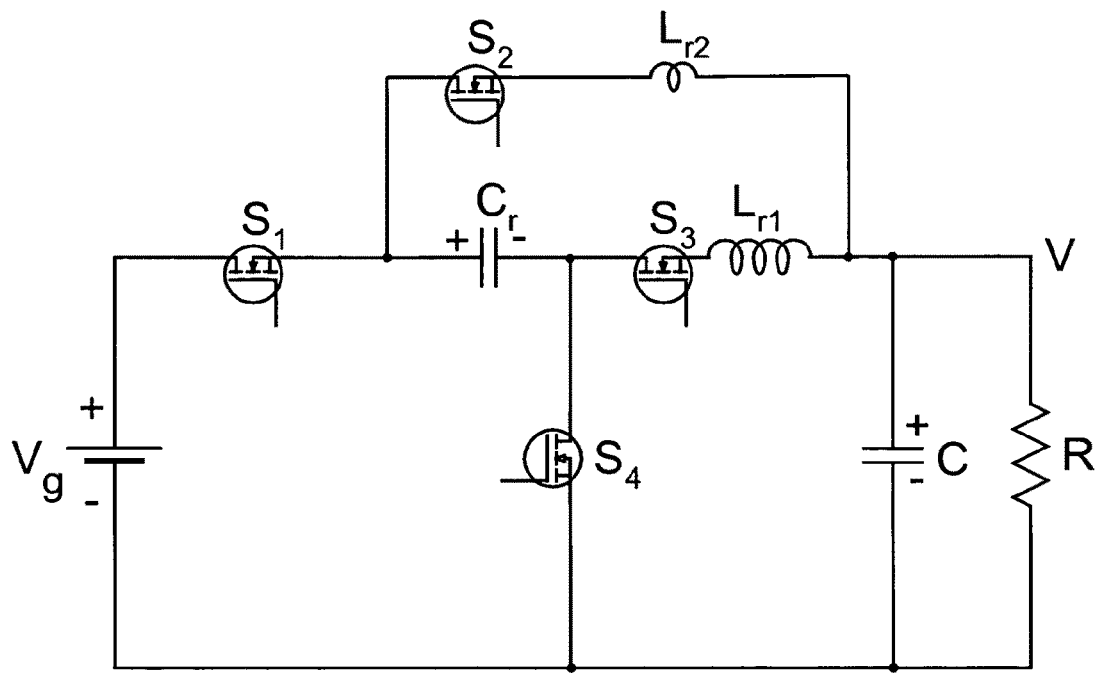
Figure 10B:
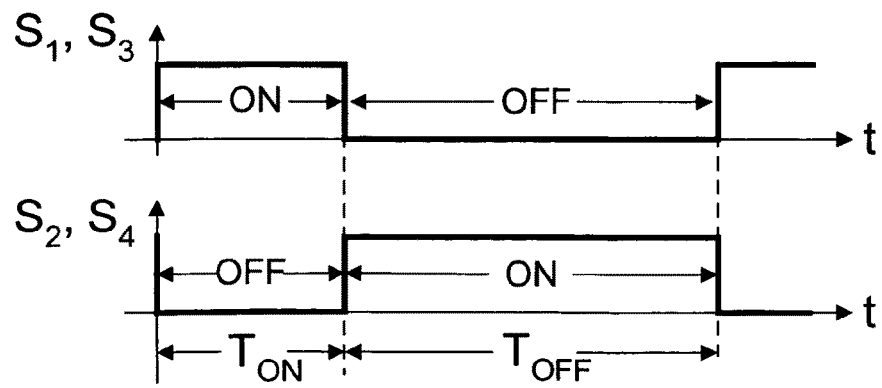

The two controlling switches can be in its simplest form implemented using two bi-polar transistors as illustrated in FIG. 8a. One possible two-MOSFET transistor implementation is shown in FIG. 8b and another in FIG. 9a in which three MOSFET switches are used with corresponding switch states as shown in FIG. 9b. In the three-MOSFET switch case the current rectifier switch $CR_2$ is replaced with a MOSFET switch operating as a synchronous rectifier to reduce diode conduction losses. This particular switch implementation is highlighted here, as it will be used later on to demonstrate the continuous output voltage control by varying the conduction time of the current rectifier $CR_1$. An alternative all-MOSFET transistor implementation is shown in FIG. 10a with switch-states shown in FIG. 10b.

Derivation of Discrete 2:1 DC Conversion Ratio

Two switching states of active switches $S_1$ and $S_2$ define also two distinct linear switching networks as follows:
 a) for ON-time interval $DT_S$ shown in FIG. 11a and FIG. 11b;
 b) for OFF-time interval $(1-D)T_S$ shown in FIG. 12a and FIG. 12b.

Figure 2A:
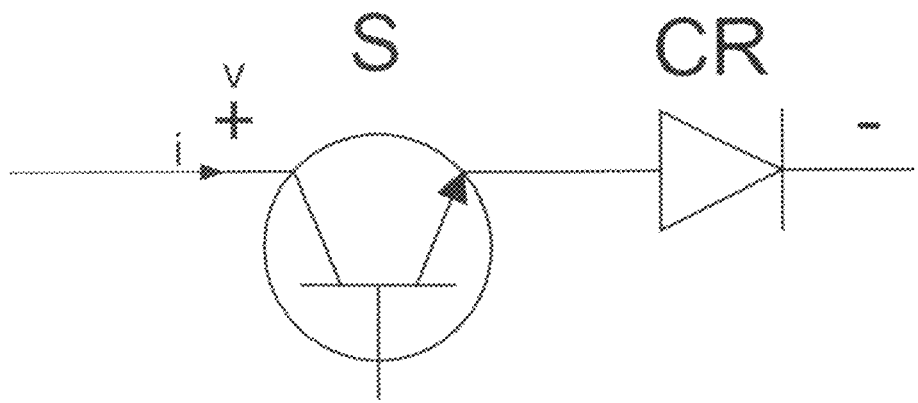
FIG. 2a shows a composite voltage bi-directional switch (bi-polar transistor and diode in series) and FIG. 2b shows that composite switch of FIG. 2a which operates in first and second quadrants.
Figure 2B:
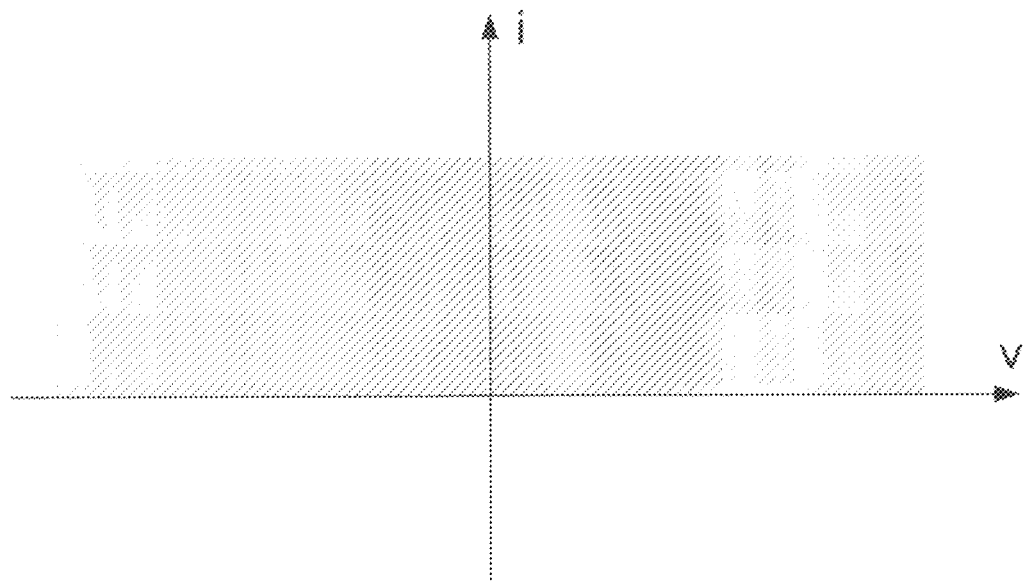
Figure 11A:
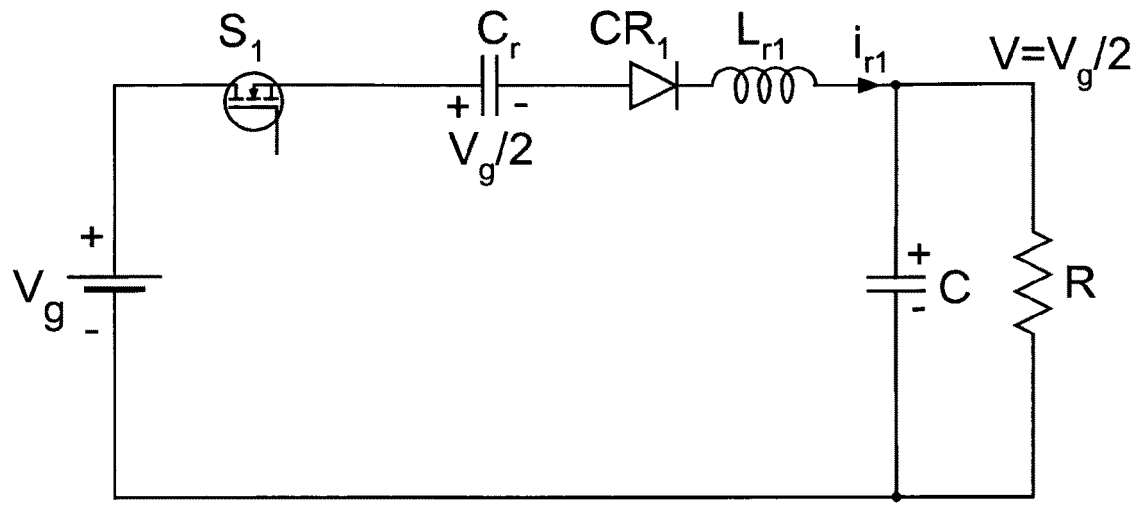
Figure 11B:
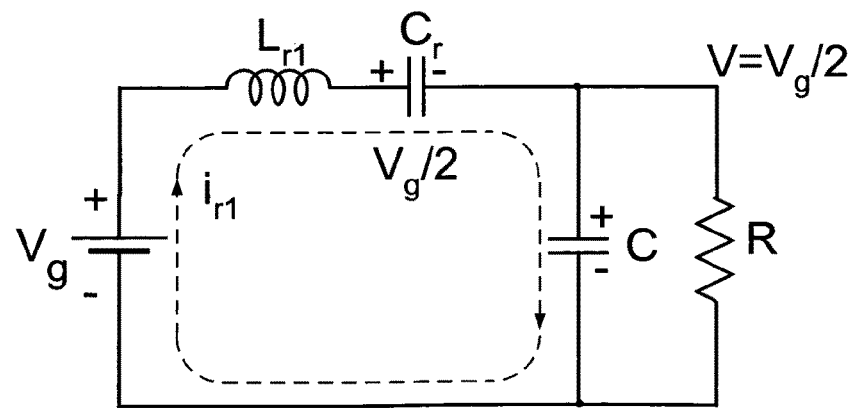

The two switching devices $S_1$ and $CR_1$ are intentionally displayed in FIG. 11a to emphasize the fact that they form during ON-time interval a composite two-quadrant voltage bi-directional switch (VBS), which can block the voltage of either polarity but can only conduct the current in one direction dictated by the current rectifier. The VBS switch composed of one-quadrant bipolar transistor active switch S and one-quadrant current rectifier switch CR depicted in FIG. 2a results in the two-quadrant switch operation illustrated by shaded areas in FIG. 2b.

The key point is that the current in the linear switching network of FIG. 11a can only flow in one direction and charge the resonant capacitor $C_r$. Once the two switching devices are represented by their ideal short circuit condition, the linear switching network of FIG. 11b is obtained.

This also points out to a key clear distinction with the prior-art square-wave switching method illustrated earlier by the prior-art buck converter. The inductor L in a buck converter (FIG. 5a) needs the whole switching period $T_S$ to be volt-second balanced: during ON-time there are positive volt-seconds (and increasing AC flux in the magnetic core) and during OFF-time there are negative volt-seconds (and decreasing AC flux or resetting of core flux). Note that in the new converter of FIG. 6a this is not the case: the inductor $L_{r1}$ is both set and reset during the same ON-time interval $DT_S$. The same holds true for the other inductor $L_{r2}$ during the OFF-time interval. During ON-time interval $DT_S$ the resonant capacitor $C_r$ is charged from the input source while conducting the load current at the same time.

Figure 12A:
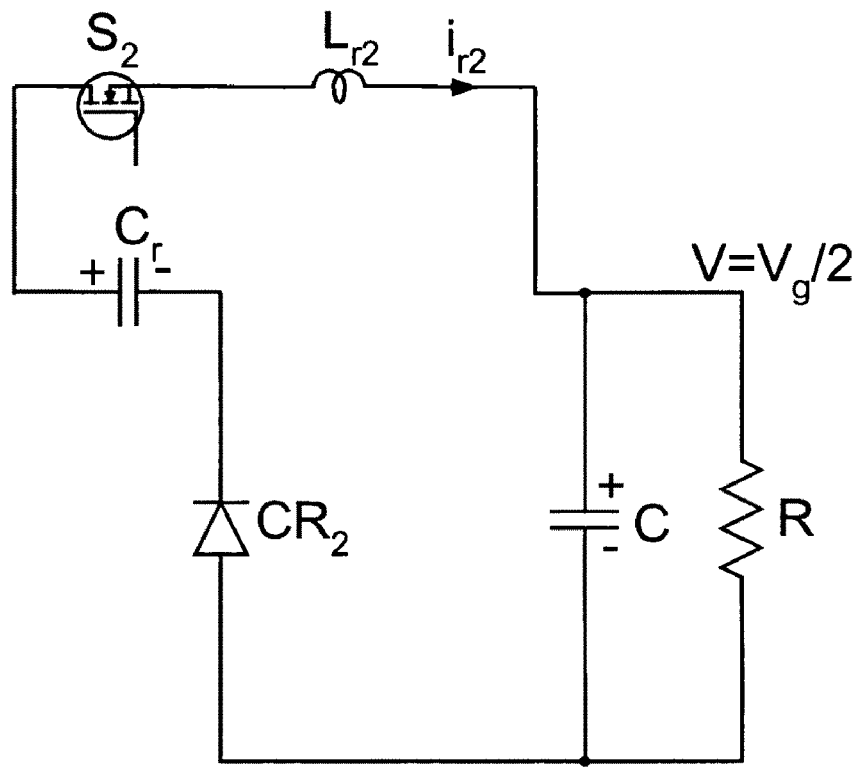

During OFF-time interval $D'T_S$, the switches $S_2$ and $CR_2$ are in series, as illustrated by switching linear circuit of FIG. 12a. Once again the two switches in series form effectively another VBS switch and therefore allow current in only one direction, which is direction dictated by current rectifier $CR_2$. During this OFF-time interval, the charge stored in a resonant capacitor $C_r$ in previous ON-time interval is fully discharged into the load, as illustrated in FIG. 12b.

We now extend the state-space averaging method (1, 4) to handle the case of the two resonant inductors each being volt-second balanced separately during each individual ON-time and OFF-time intervals respectively and not over the entire switching period $T_S$ as for square-wave switching converters. By writing the volt-second balance for each resonant inductor in their respective switching intervals we impose that net DC voltage across each inductor must be zero for each of the two intervals so that:

For interval $DT_S$:

$$\int v_{Lr1} dt = V_g - (V + V_{cr}) = 0 \qquad (3)$$

For interval $D'T_S$:

$$\int v_{Lr2} dt = V_{cr} - V = 0 \qquad (4)$$

Equations (3) and (4) result in a unique solution for both V and $V_{cr}$ as:

$$V = V_{cr} = \tfrac{1}{2} V_g \qquad (5)$$

Therefore the basic conversion function of the present invention is obtained as that of a fixed step-down conversion ratio of 2:1 independent of duty ratio and independent of particular values of two resonant inductors $L_{r1}$ and $L_{r2}$. The fixed 2:1 step-down conversion ratio and solution (5) play a crucial role in making possible at least a hundredfold reduction of the size of the magnetics compared to the prior-art buck converter operating under same conditions (switching frequency, input voltage, load current, etc.). Note that this fixed conversion ratio is independent of the operating duty ratio.

Thus, it appears that this converter can provide only a fixed 2:1 step-down conversion ratio and that it is incapable of providing the continuous output voltage control and therefore regulation by duty ratio D control. This is, however, not the case as will be demonstrated in the later section.

Analysis of Two Independent Resonant Circuits

Figure 13A:
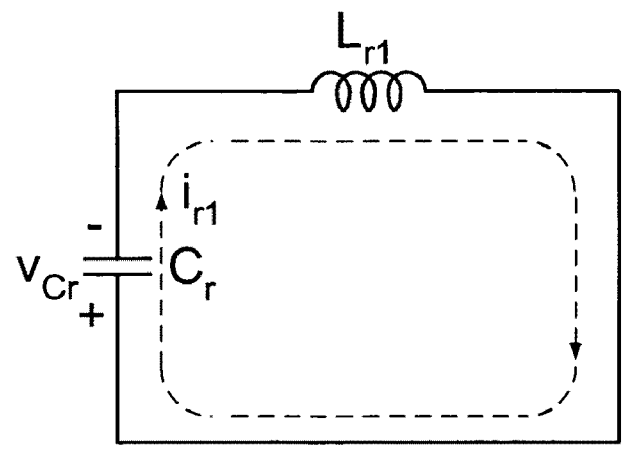
FIG. 13a illustrates an equivalent circuit model for resonant current through inductor $L_{r1}$ during ON-time interval.

Under the condition (5) in the linear switched network of FIG. 11a, the three DC voltages exactly balance during ON-time based on (3), therefore effectively eliminating any DC voltage from the circuit operation and resulting in simplified resonant equivalent circuit model of FIG. 13a, which does not have any net DC voltage on resonant capacitor $C_r$. Note also that the load capacitor C is several times larger in value than resonant capacitor $C_r$ so it is actually shorted and not present in the resonant circuit model. In the prior-art resonant converters (3), a single resonance is spanning through both ON-time and OFF-time switching intervals and thus leading to many related problems: large size of a single resonant inductor, large voltage and current overstresses much beyond those of square-wave switching. The only benefit for such prior-art resonant switching was in possibility of zero-current switching under special conditions. Here we will obtain both zero current switching of all four switches at both turn-ON and turn-OFF as a result of the operation of the converter based on this new storageless-switching method.

Figure 12B:
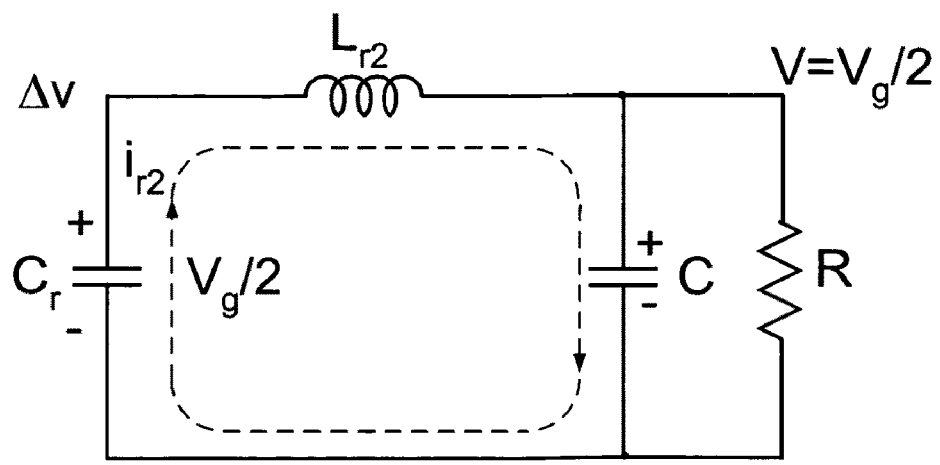
Figure 13B:
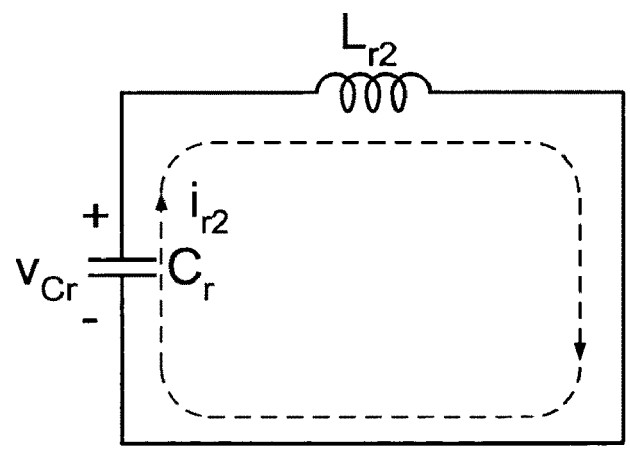
FIG. 13b illustrates an equivalent circuit model for resonant current trough inductor $L_{r2}$ during OFF-time interval.

The same conditions apply to the equivalent circuit of FIG. 12a or FIG. 12b, in which DC voltage of resonant capacitor $V_{Cr}$ and output DC voltage exactly cancel based on (4), leaving once again only the AC ripple voltage of the resonant capacitor to drive the resonant circuit of FIG. 13b. As before, the output capacitor C is shorted in the equivalent circuit model of FIG. 13b due to its large value in comparison to the resonant capacitor value.

Clearly, although the two resonances are independent from each other (the circuit models in FIG. 13a and FIG. 13b), they are described by identical equivalent resonant circuit models, hence, the same solutions will apply except for corresponding designation of resonant inductors $L_{r1}$ and $L_{r2}$ and respective time intervals $T_{ON}$ and $T_{OFF}$ during which they are applicable. Note also that the voltage bi-directional switch implementation limits the resonant inductor current in each interval to the positive half-cycle of the sinusoidal current excursion of the resonant solution.

Let us now derive the simple analytical expressions for the resonant capacitor current $i_{cr}$ for a special case when:

$$L_{r1} = L_{r2} = L_r \qquad (6)$$

Later this will be generalized for the most general case in which two resonant inductances and their half-cycle intervals are different.

Resonant Equations

We now undertake to develop the pertinent resonance equations, which will provide analytically the resonant currents and resonant voltages so that their time domain solutions can be displayed. The derived analytical results could also be used to calculate the component values needed for optimum operation of the converter.

From the resonant circuit model of FIG. 13a, we can now write the resonant equations:

$$L_r di_r/dt = -v_r \qquad (7)$$

$$C_r dv_r/dt = i_r \qquad (8)$$

whose solutions are:

$$i_r(t) = I_m \sin \omega_r t \qquad (9)$$

$$v_r(t) = R_N I_m \cos \omega_r t \qquad (10)$$

where $R_N$ is characteristic impedance, $\omega_r$ is radial resonant frequency, $f_r$ resonant frequency and $T_r$ resonant period given by:

$$R_N = \sqrt{L_r/C_r} \qquad (11)$$

$$\omega_r = 1/\sqrt{L_r C_r} \qquad (12)$$

$$T_r = 1/f_r = 2\pi \sqrt{L_r C_r} \qquad (13)$$

From the converter of FIG. 8a with the equivalent circuit model in FIG. 13a, the resonant current $i_r$ has in its path the transistor and a diode connected in series. Therefore, the sinusoidal resonant current $i_r$ will only be able to flow in positive directions, as its negative direction flow is being prevented by unidirectional current property of the diode. This will stop the sinusoidal resonant current flow at zero current level, and allow only a positive half-cycle of the resonant current to flow as illustrated in the resonant capacitor current time domain waveform during the ON-time shown in FIG. 14a. Note also the superimposed small co-sinusoidal ripple voltage on resonant capacitor during the same ON-time interval (FIG. 14b).

Figure 14A:
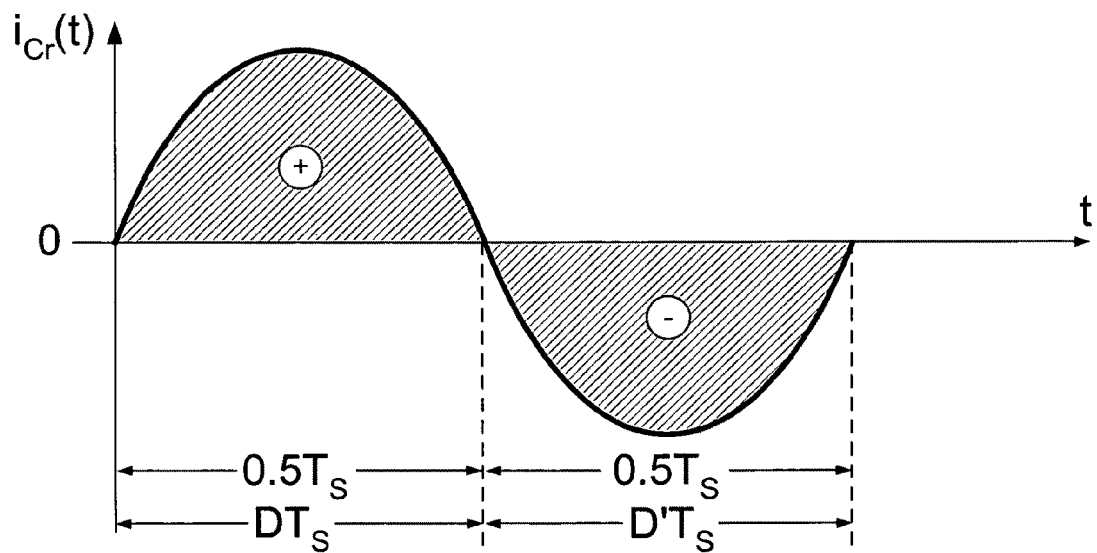
FIG. 14a illustrates current waveform through resonant capacitor $C_r$ and FIG. 14b illustrates resonant capacitor $C_r$ voltage waveform.
Figure 14B:
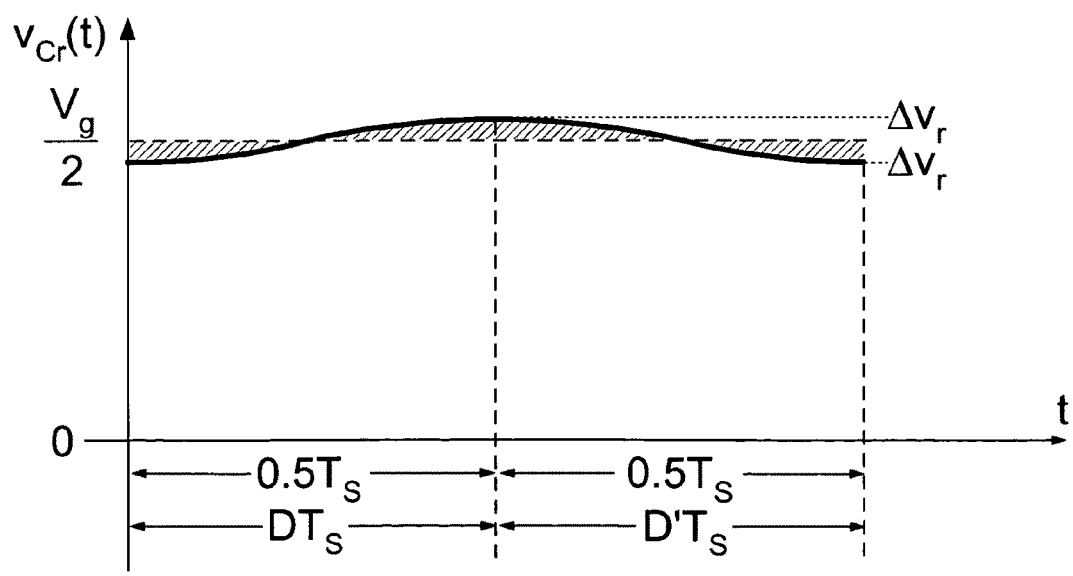

As the same resonant current solution applies during the OFF-time interval, the resonant capacitor current is of opposite polarity shown by the shaded region in FIG. 14a during the OFF-time interval and corresponding ripple voltage on resonant capacitor during the same OFF-time interval shown in FIG. 14b. Note that the assumption (6) also implies that the operational duty ratio is D=0.5 so as to obtain optimum operation. For example, the switching frequency of operation could be made smaller than resonant frequency, in which case the two coasting intervals with zero current will be obtained. However, the DC conversion would not change from fixed 2:1 even if one were to change the duty ratio under that condition. Operation under this condition is sub-optimal as coasting intervals would only provide the gaps in the load current and therefore ultimately increase the conduction losses due to higher rms current value for the same load current.

The shaded areas in FIG. 14a must be equal as required by the charge balance imposed on the resonant capacitor in steady-state condition. The shaded areas in FIG. 14b on the other hand must be equal for each ON-time and OFF-time interval alone, as they represent the net AC voltage excitation on each resonant inductor separately, with each inductor required to be flux-balanced during each respective subinterval, ON-time for resonant inductor $L_{r1}$ and OFF-time for resonant inductor $L_{r2}$.

We can now also take a very special case:

$$T_r = T_S \tag{14}$$

Or alternatively that:

$$f_r = f_s \tag{15}$$

that is, the switching frequency is equal to resonant frequency. In that special case the resonant capacitor current $i_{Cr}$ is as illustrated in FIG. 14a composed of two halves of two separate resonant currents, which effectively form a single sinusoidal resonant capacitor current $i_{Cr}$ given by:

$$i_{Cr}(t) = I_P \sin(\omega_r t) \tag{16}$$

The time domain waveform of the resonant capacitor voltage $v_{Cr}$ is illustrated in FIG. 14b. Note that the small AC ripple capacitor voltage $\Delta v_r$ is superimposed on top of large DC voltage $V_g/2$. However, as described earlier, the large DC voltage does not take part in the resonance, but only a small AC ripple voltage. Note also how the capacitor AC ripple voltage is zero in the middle of each ON-time and OFF-time interval, which marks the instant when the volt-seconds imposed on respective resonant inductors change the polarity so that at the end of each ON-time or OFF-time interval each resonant inductor is volt-second balanced.

What is left is the AC ripple voltage $\Delta v_r$ of the resonant capacitor $C_r$, which is typically 20 times smaller than the respective DC voltage due to typical 20% relative ripple on the resonant capacitor. Therefore, the size of the inductors will be at least 20 times reduced compared to that of the prior-art buck converter as demonstrated next.

Comparison of Magnetics Sizes

Figure 15A:
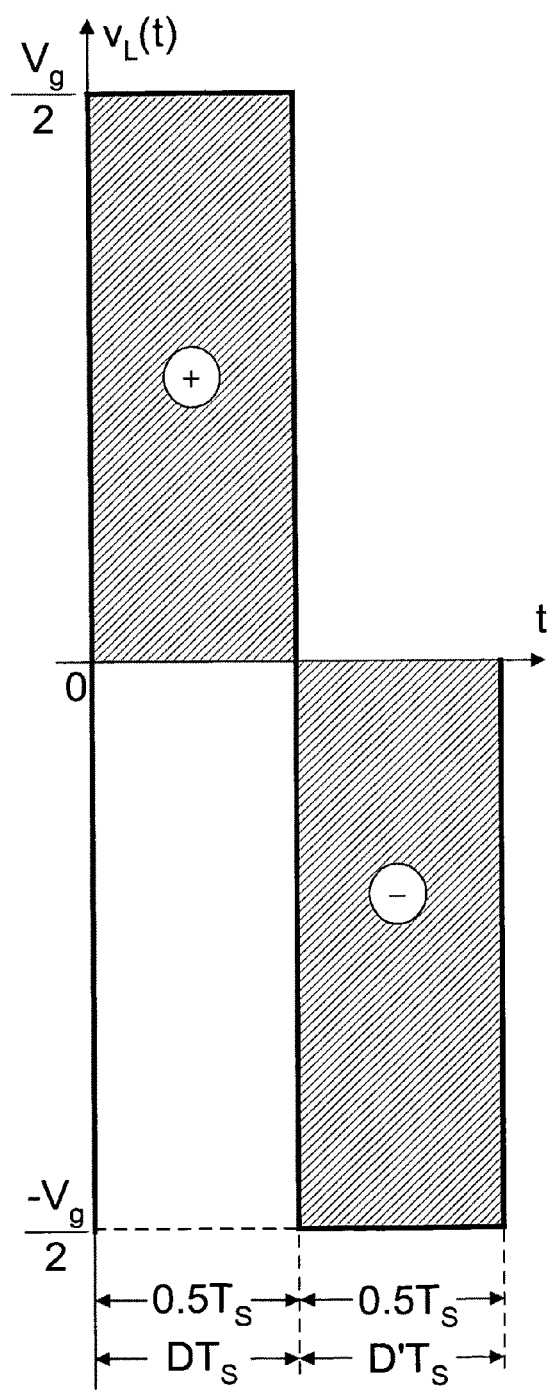

The size of the inductors of the prior-art buck converter and present invention can be now easily compared. The buck converter operation at 50% duty ratio results in 2:1 DC voltage step down and the respective inductor AC voltage waveform is shown in FIG. 15a. The corresponding volt-seconds are given by:

$$\text{Volt-seconds} = \tfrac{1}{2} V T_S \tag{17}$$

Figure 15B:
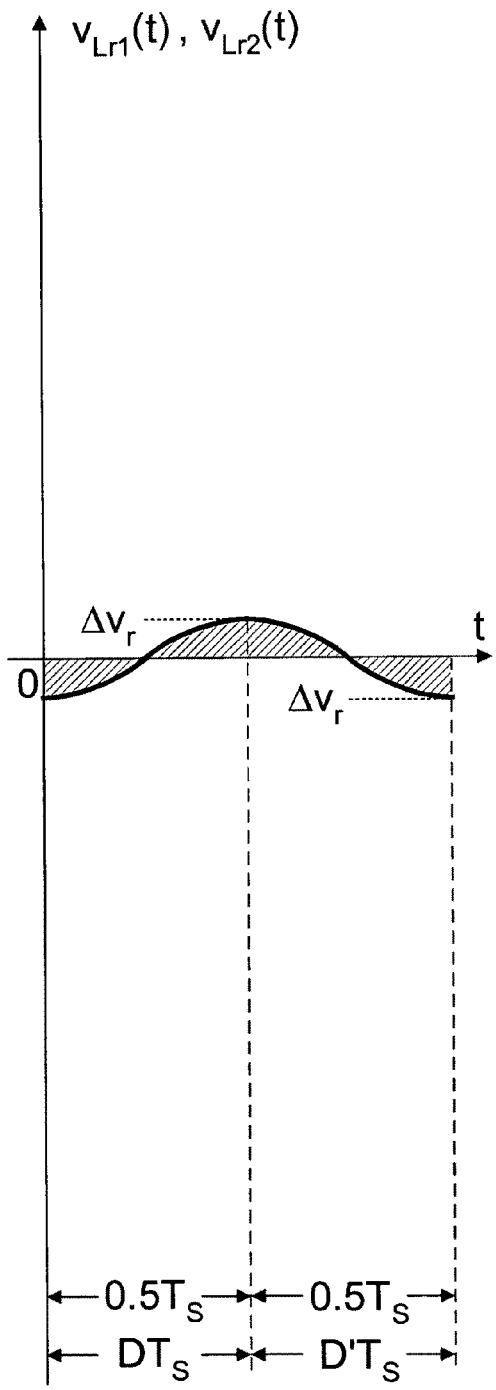

In the present invention, the volt-seconds for two resonant inductors $L_{r1}$ and $L_{r2}$ of FIG. 15b can be approximated as:

$$\text{Volt-seconds} = (\tfrac{1}{8}) \Delta v_r T_S \tag{18}$$

leading to their ratio R of:

$$R = \tfrac{1}{4} \Delta v_r / V_{Cr} \tag{19}$$

In practical applications relative ripple on resonant capacitor voltage could be:

$$\Delta v_r / V_{Cr} = 0.1 \tag{20}$$

or 10%. For example, for 10V DC voltage on resonant capacitor, 1V ripple voltage is typically obtained on resonant capacitor. The output capacitor C will further reduce that by 10 times to 100 mV ripple since output capacitor is 10 times larger than resonant capacitor. Therefore, for the operation at the same switching frequency and resulting in the same DC conversion ratio of 2:1, the present invention can use magnetic core, which is at least 40 times smaller than the magnetic core in an equivalent buck converter operating at the same operating conditions.

DC Current Conversion Ratio

From the converter topology of FIG. 6a, the input and output instantaneous currents are given by:

$$i_g = i_{r1} \tag{21}$$

$$i_0 = i_{r1} + i_{r2} \tag{22}$$

Equation (22) is very important and unique feature of this converter topology as opposed to any other converter topology or extension, which could be obtained by a different placement of the two resonant inductors in the various converter branches. Equation (22) says that both resonant currents contribute to the load current during both ON-time and OFF-time intervals for the present 2:1 fixed step-down conversion ratio. Most importantly, however, this unique feature will extend to the continuous output voltage control as demonstrated later.

Figure 16A:
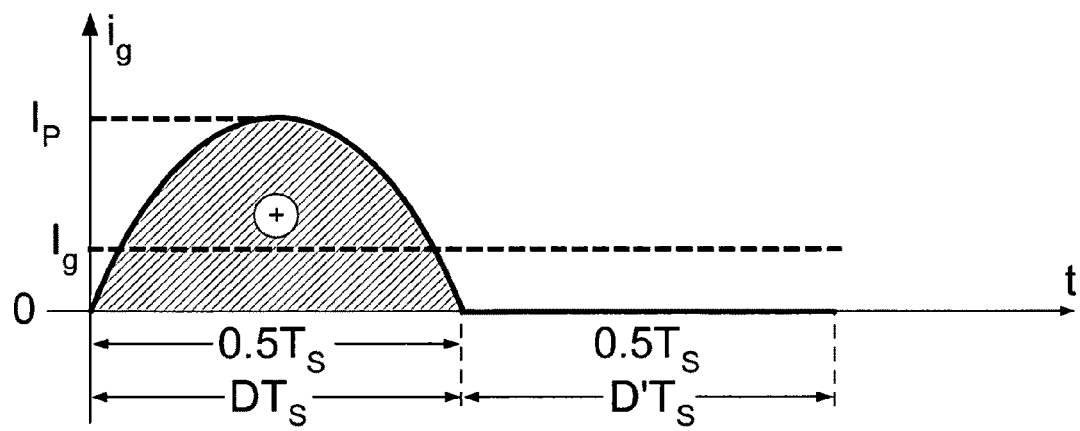
Figure 16B:
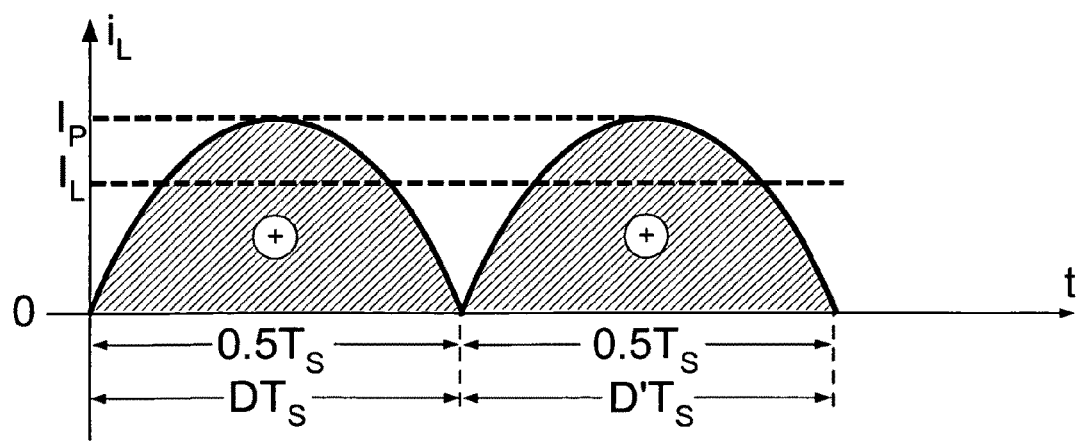

FIG. 16a shows the instantaneous input current of the converter in heavy lines and average source current $I_g$ in dotted lines. Likewise, FIG. 16b shows the instantaneous output current of the converter in heavy lines, while the dotted lines represent the DC load current $I_L$. Now we can establish from FIG. 16b the correlation of $I_P$ and DC load current $I_L$ as:

$$I_P = \pi/2 I_L \tag{23}$$

Fixed 2:1 Conversion Reduces the Losses in Half

Figure 17A:
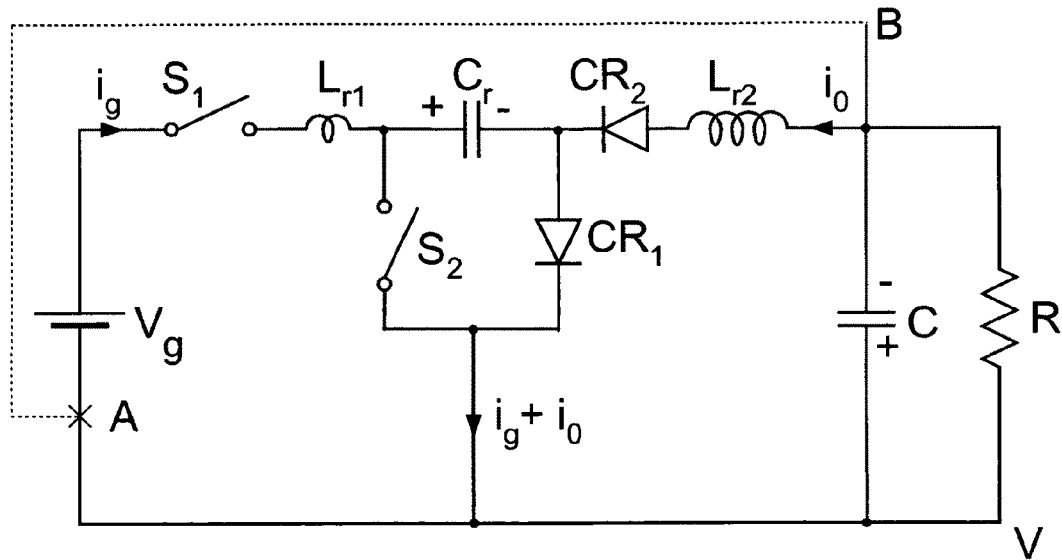
FIG. 17a illustrates a polarity inverting DC-DC converter which uses the two resonance's.
Figure 17B:
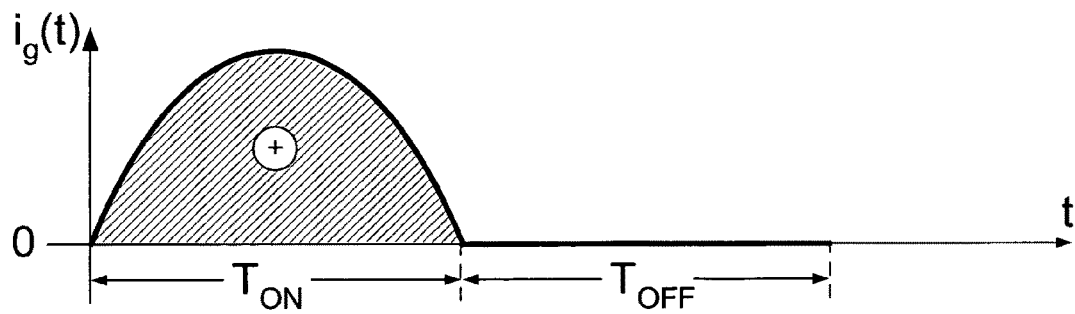
Figure 17C:
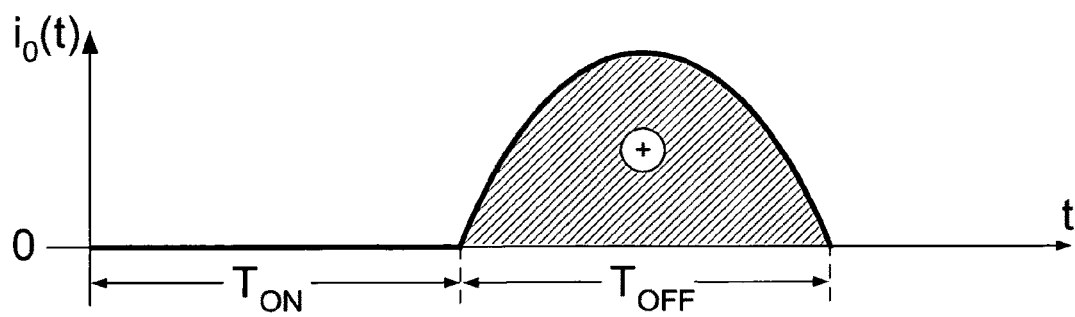

The significance of the fixed 2:1 step-down conversion ratio and its effect upon cutting the losses is a hidden feature, which is not obvious until one reviews another converter of the same storageless-switching family but with fixed 1:1 conversion ratio such as the polarity inverting converter displayed in FIG. 17a. Input current $i_g$ is a half-sinusoidal current charging the resonant capacitor during ON-time interval and is shown in FIG. 17b. During the OFF-time switch $S_2$ and the rectifier $CR_2$ are turned ON and the resonant capacitor $C_r$ is now being discharged to the load to result in the load current shown in FIG. 17c. Note how this floating resonant capacitor $C_r$ actually results in the polarity inverting voltage on the output. Regarding the magnitude of the output voltage, it is the same as the input voltage so has a fixed 1:1 conversion ratio. Therefore, the output voltage $V = V_g$. Note also the designation and the direction of actual flow of the input current $i_g$ and output current $i_0$. Observe also the voltage stresses of all the switches.

Figure 18A:
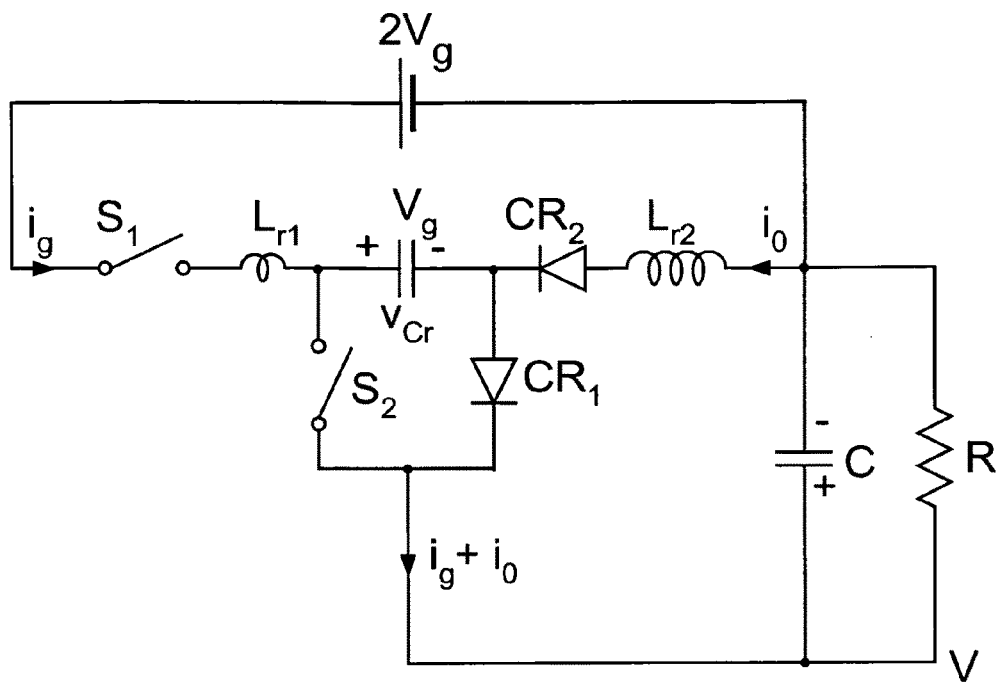
FIG. 18a illustrates a present invention, which has the same conduction losses as the converter in FIG. 17a but which delivers double power to the output.
Figure 18B:
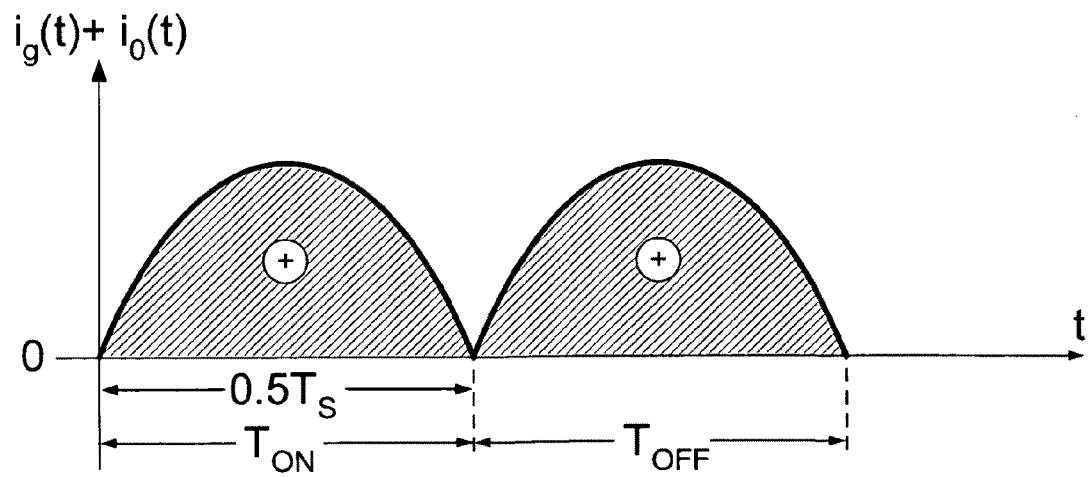

We now convert this polarity inverting converter topology into a polarity non-inverting one shown in FIG. 18a by disconnecting voltage source at the point A in FIG. 17a and reconnecting it to point B to result in the converter of FIG. 18a. Note that all the current stresses in the non-inverting converter of FIG. 18a are identical to those of the polarity-inverting converter of FIG. 17a. Therefore, the two converters should have the same losses. Note, however, that the load current in the converter of FIG. 18a is effectively doubled as seen in FIG. 18b since its load current is given by:

$$i_{load}=i_g+i_0=2i_0 \quad (24)$$

since the load current and source current in the converter of FIG. 17a are equal.

Thus two alternative statements can now be made:
1. For same losses output power is doubled.
2. For same output power the losses are reduced in half In the first case, the converter of FIG. 17a having 90% efficiency will result in the 95% efficiency when the same components are used in present invention of the converter of FIG. 18a. This clearly underscores the importance of the converter topology to the efficiency of the conversion.

In addition, the output current in the polarity-inverting converter is pulsating requiring much larger output capacitor to obtain specified output ripple voltage. Finally, in practical applications, the polarity non-inverting converter is much more needed then the polarity inverting converters such as one in FIG. 17a.

Figure 19A:
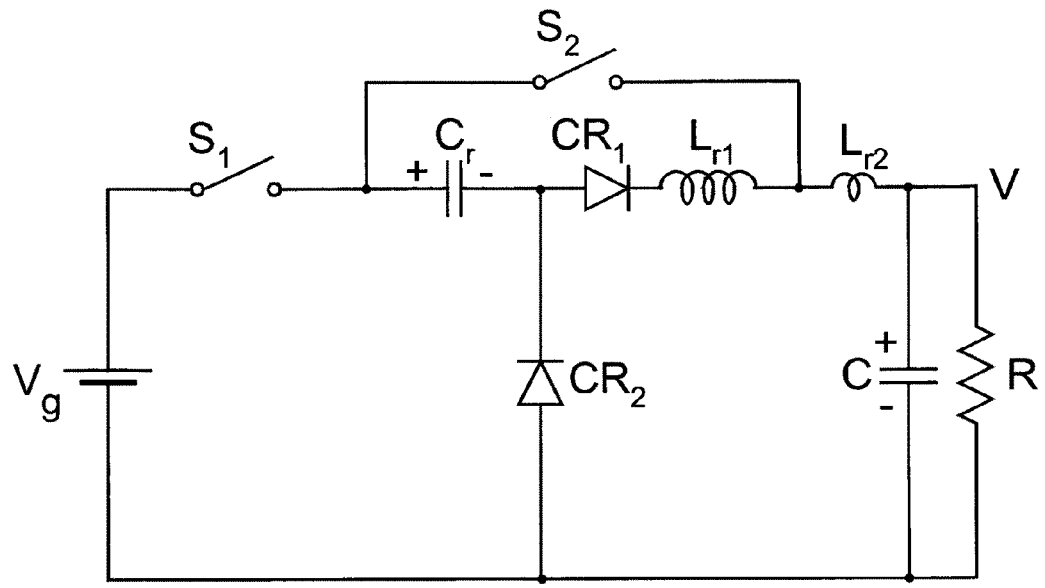
FIG. 19a illustrates one embodiment of the present invention.
Figure 19B:
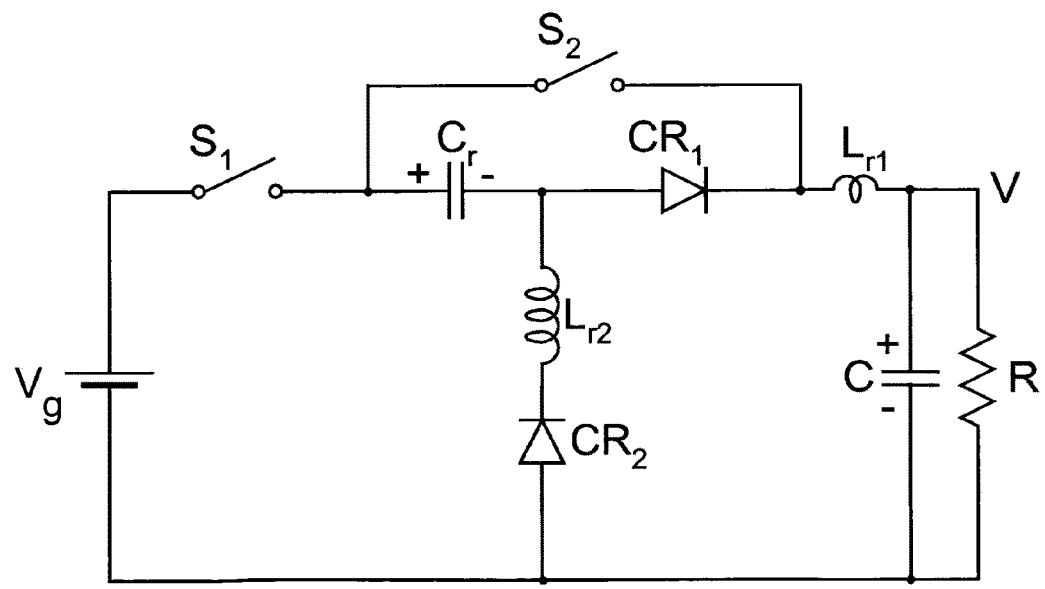
FIG. 19b shows another embodiment of the present invention.
Figure 20A:
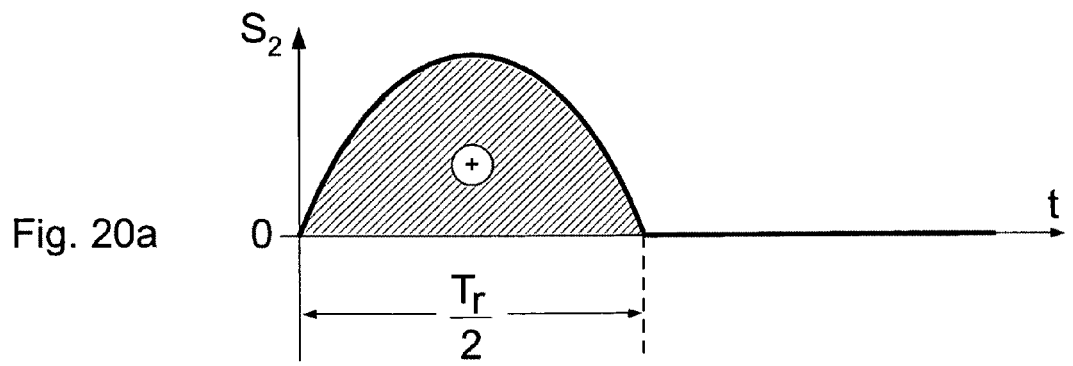
FIG. 20a illustrates the input switch $S_1$ current.
Figure 20B:
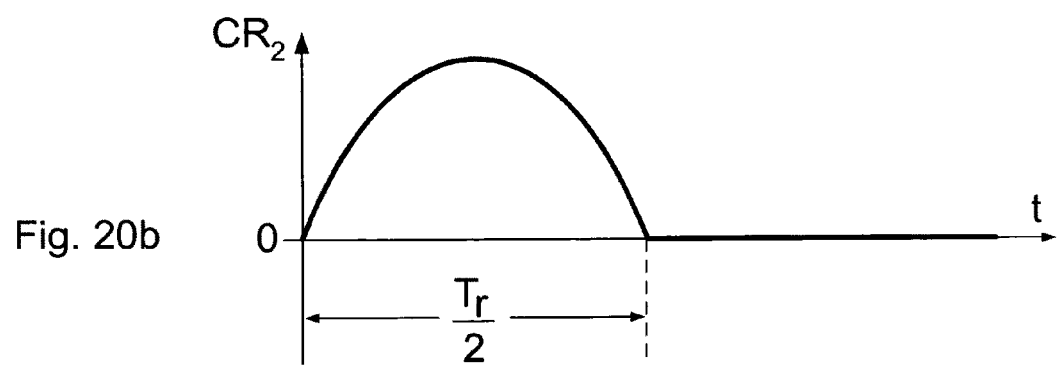
FIG. 20b illustrates the current rectifier $CR_1$ current
Figure 20C:
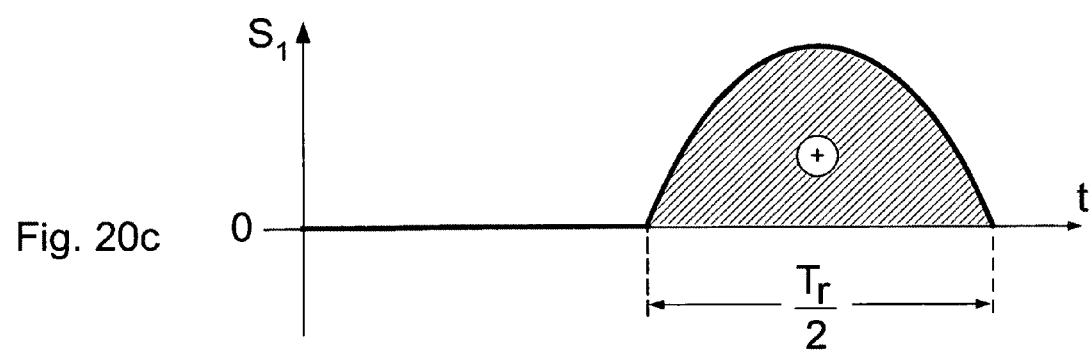
FIG. 20c illustrates the input switch $S_2$ current
Figure 20D:
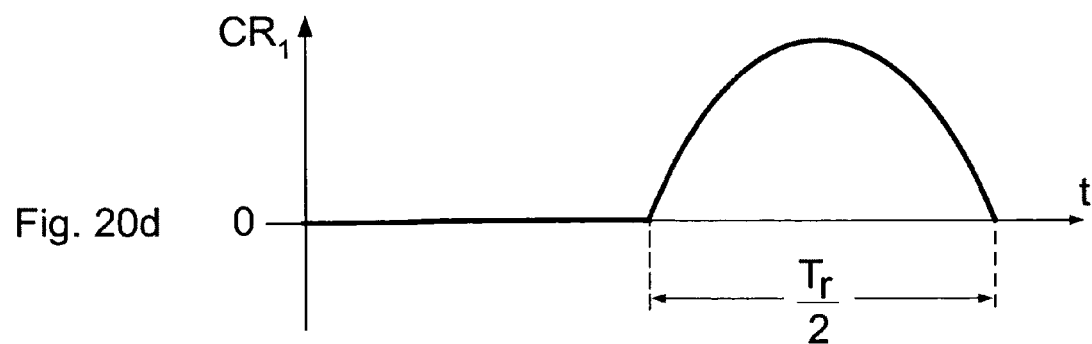
FIG. 20d illustrates the current rectifier switch $CR_1$ current at the optimum duty ratio.

Having established importance of the converter topology to its efficiency and performance (output ripple current and ripple voltage) other converter topologies, which maintain the load current as per equation (22) are clearly favored. Some possible embodiments of the present invention, which satisfy requirement (22), are shown in FIG. 19a and FIG. 19b. Those skilled in the art might also find other equivalent extensions, which satisfy the same requirement (22) and therefore are considered extensions of the present invention.

Conversion Efficiency and Elimination of Switching Losses

At first it may appear that charging and discharging the resonant capacitor $C_r$ could introduce extra losses. However, the opposite is the case. Note that during the $DT_S$ interval the resonant capacitor $C_r$ is charging from input source directly with the DC load current. On the other hand, during the $D'T_S$ interval, the same capacitor is now discharging directly into load. Therefore, its charge and discharge are used to effectively supply the load current at all times therefore reducing the output ripple voltage and minimizing filtering requirements as discussed above.

The resonant charge and discharge of the capacitor has also another benefit for conversion efficiency as seen from the current waveforms for all four switches shown in FIG. 20a, FIG. 20b, FIG. 20c, and FIG. 20d. Note that the two current rectifiers are switching under ideal conditions of zero voltage and zero-current eliminating both turn-ON and turn-OFF switching losses.

Similarly, the two active switches $S_1$ and $S_2$ are turned-ON and turned-OFF at zero current as well. Clearly, such operation of switches is completely unique to this converter and is one of reasons for its ultra efficient operation in addition to extremely small size of the converter due to small sizes of both resonant inductors and resonant capacitor.

Voltage Stresses of the Switches

Another important performance characteristic of switching converters is the voltage stress imposed on the switches, what is also often referred to as the switch utilization as the ratio of the actual power processed by the switches versus power rating of the switches, with 100% being the ideal utilization. Also important is the variation of the switch voltage stresses with the operating duty ratio D. In conventional switching DC-DC converters, the wide input DC voltage range is directly connected with the requirement for high voltage blocking rating of the switches.

Figure 21A:
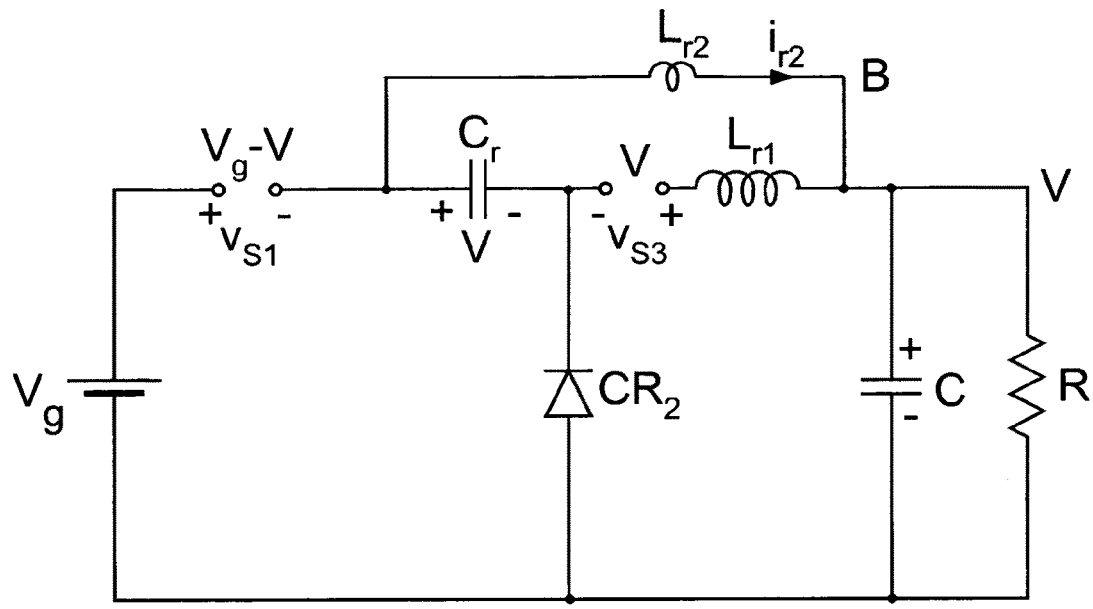
FIG. 21a is a switched network for OFF-time interval displaying voltage stresses of two switches.
Figure 21B:
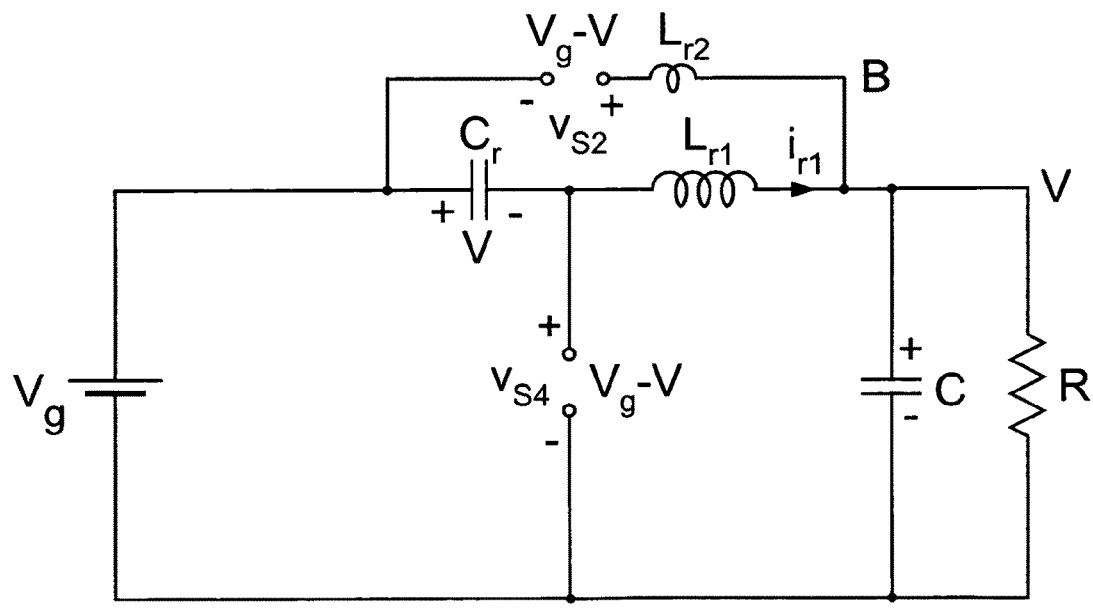
FIG. 21b is a switched network for ON-time interval displaying voltage stresses of the other two switches

From the two switched networks for the ON-time (FIG. 21a) and for the OFF-time (FIG. 21b) one can deduce following voltage rating requirement for the for switches expressed in terms of the input DC voltage $V_g$ and output DC voltage V:

$$V_{S1}=V_{S2}=V_{S4}=V_g-V \quad (25)$$

$$V_{S3}=V \quad (26)$$

Note in particular the low voltage stress of switch $S_3$, which is equal to the output voltage V for all operating condition and applicable for start-up and shutdown transient sequence. As this switch $S_3$ plays a critical role in the continuous output voltage control, which depends on its rectifier implementation, this low voltage stress feature in steady state and transient condition, is very helpful for practical implementation and maintenance of high efficiency. The above equations for voltage stresses are general and valid not only for a 2:1 fixed conversion ratio but also for all other conversion ratios including continuous control with higher step-down presented in later section.

However, for a 2:1 step-down conversion ratio and when steady-state is reached, all four switches are exposed only to 50% of the input DC voltage. Thus, for example, for 48V input voltage and 24V output voltage (nominal 2:1 step-down conversion) all four switches see 24V maximum voltage, so that even 30V rated switches with low ON resistance could be used. This is a feature not attained in any other conventional converter.

Storageless Operation of the Converter

Figure 22A:
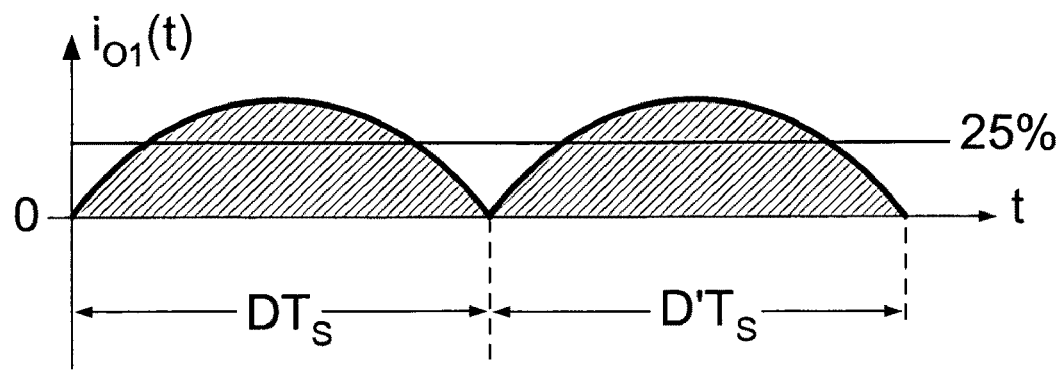
FIG. 22a illustrates the instantaneous and DC load current for 25% load current and FIG. 22b illustrates the instantaneous and DC load current for 100% load current.
Figure 22B:
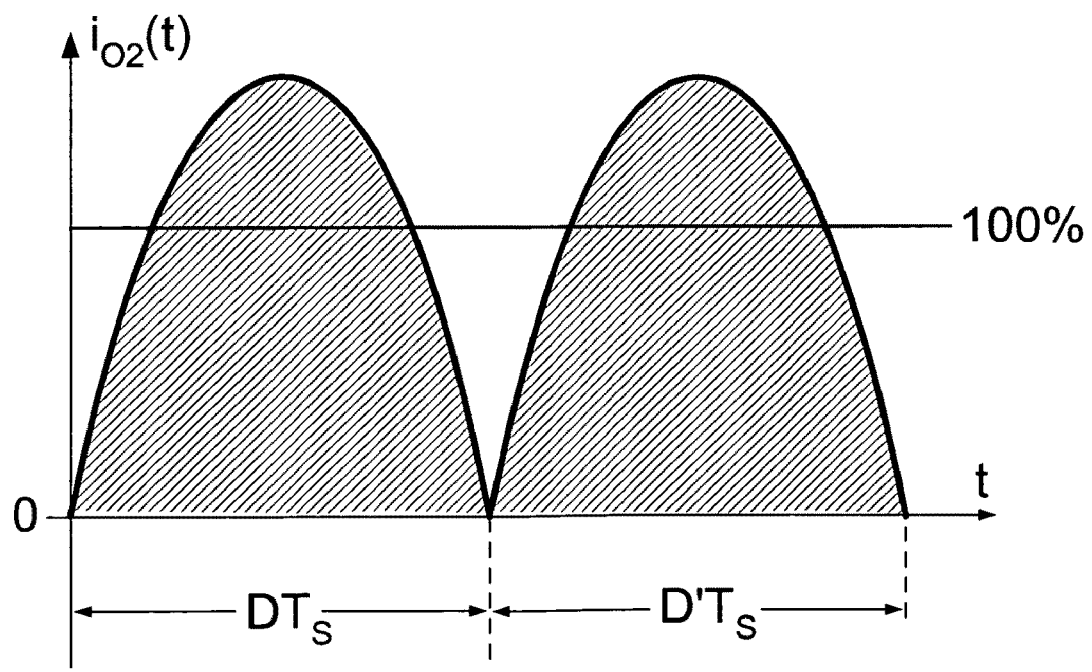

The output current $i_0$ before it was filtered out by output capacitor C to a small output voltage ripple is shown at 25% DC load current in FIG. 22a to consists of two half-sinusoidal load currents, each starting and ending at zero current level. Thus, each switching cycle, both resonant inductor currents settle at the same steady-state conditions shown in FIG. 22a at zero current level. In the buck converter, many switching cycles are needed before the converter is able to settle in the new steady-state load current as seen in FIG. 3c. In the present invention, however, steady-state current conditions are reached every cycle as illustrated in FIG. 22b for the full load current. The input current, therefore, responds to the jump from 25% load current to full load current also within one switching period resulting in natural fast transient response. This is confirmed by the measurements of the transient performance when the converter is subjected to the fast step-load change of the output current in the Experimental section.

Operation with Two Different Resonant Frequencies

The present invention is not limited to operate with the same resonant frequencies defined by same resonant inductances $L_{r1}$ and $L_{r2}$ as assumed until now. For example, by choosing the two resonant inductors so that:

$$L_{r2}=4L_{r1} \quad (27)$$

The switching interval now consists of two different resonant half-intervals, $t_{r1}$ and $t_{r2}$ so that:

$$T_S=t_{r1}+t_{r2} \quad (28)$$

and $$t_{r2}=2t_{r1} \quad (29)$$

Figure 23A:
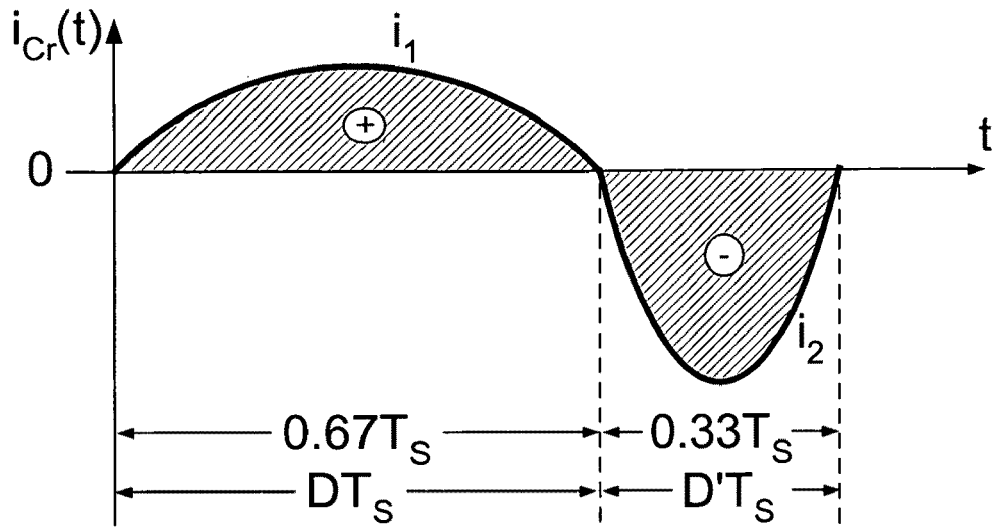
FIG. 23a illustrates the resonant capacitor current.
Figure 23B:
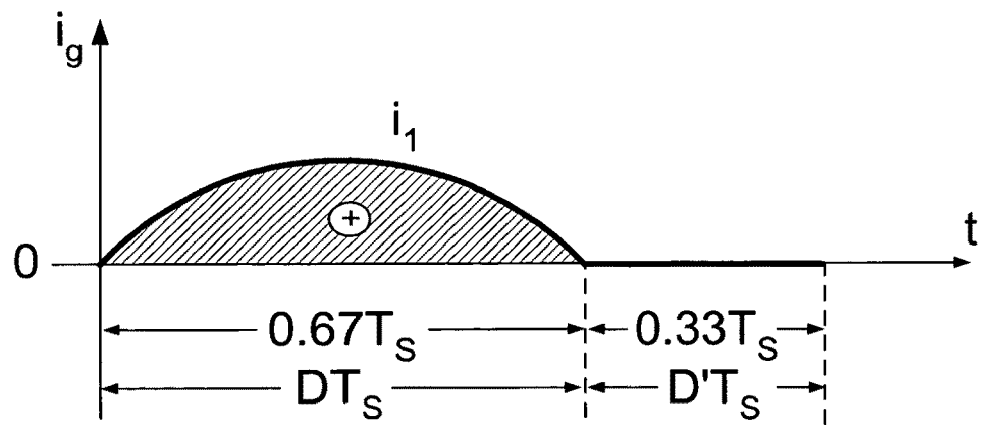
FIG. 23b illustrates the input current and FIG. 23c illustrates the output current when the optimum point is adjusted to be at 0.656-duty ratio.
Figure 23C:
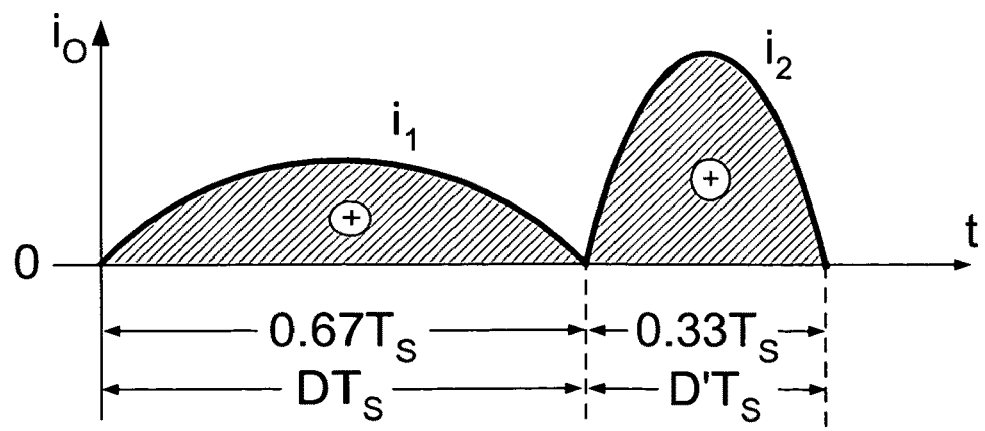

This operation is illustrated by the waveforms in FIG. 23a, FIG. 23b, and FIG. 23c. Note that in this case the converter is operated with a fixed duty ratio of D=2/3=0.67.

Continuous Control of Output DC Voltage

So far it was established that the new storageless converter could provide a fixed step-down conversion of 2:1. However, of very practical importance is that the output voltage can be continuously controlled by use of one of the control variables, duty ratio of the main switch or switching frequency or both. In that case output voltage could be regulated despite the changes of the input voltage and load current by use of the feedback control loop.

Control with Constant Off-Time and Variable On-Time

First we establish that the converter of FIG. 6a does not have to be operated with switching strategy of FIG. 6b which implied that the two passive current rectifier switches operate in response to their respective active switches and in phase with them: when $S_1$ is ON so is $CR_1$ and when $S_1$ is OFF so is $CR_1$. We now employ a different strategy for controlling switches in the converter of FIG. 9a with three MOSFET switches and a current rectifier $CR_1$ to demonstrate how the continuous output voltage control can be obtained. The timing control is shown in FIG. 9b for three active switches. Note the absence of the specified switch state for the current rectifier $CR_1$.

We now take the example of the converter operated at the optimal point with zero current crossings at duty ratio of D=0.66 as was illustrated in the current waveforms of FIG. 23a, FIG. 23b, and FIG. 23c.

Figure 24A:
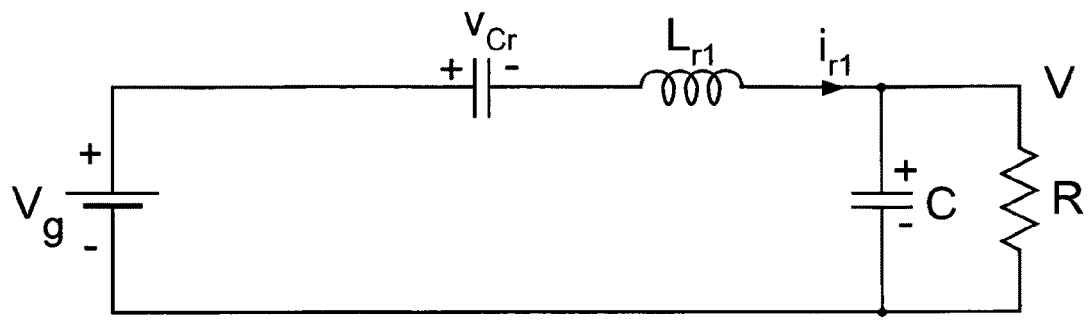
FIG. 24a illustrates the switched network for ON-time interval

We also operate under a special condition of constant OFF-time, and variable ON-time. In addition we choose the OFF-time period to be:

$$t_{r2}=0.5T_{r2}=T_{OFF} \quad (30)$$

so that the resonant inductor current $i_{r2}$ will continue to keep its half-cycle, zero current crossing waveform of FIG. 23c. We now introduce the change of the ON-time interval. The original operation of the converter at optimal point, which had only two, distinguished switched networks, one for ON-time interval and another for OFF-time interval, is now modified so that there are now three distinct switched networks:

1. For interval $DT_S$ shown in FIG. 24a;
2. For interval $D_2T_S$ shown in FIG. 24b;
3. For interval $(1-D-D_2) T_S$ shown in FIG. 24c.

Note in particular introduction of as yet undetermined duty ratio $D_2$ and corresponding interval $D_2T_S$. It is the appearance of this interval and its modulation with the change of duty ratio D, which is responsible for the continuous change of the DC current conversion ratio and thus continuous voltage conversion ratio as described next. At the optimal point it is equal to zero, that is $D_2$=0.

Figure 24B:
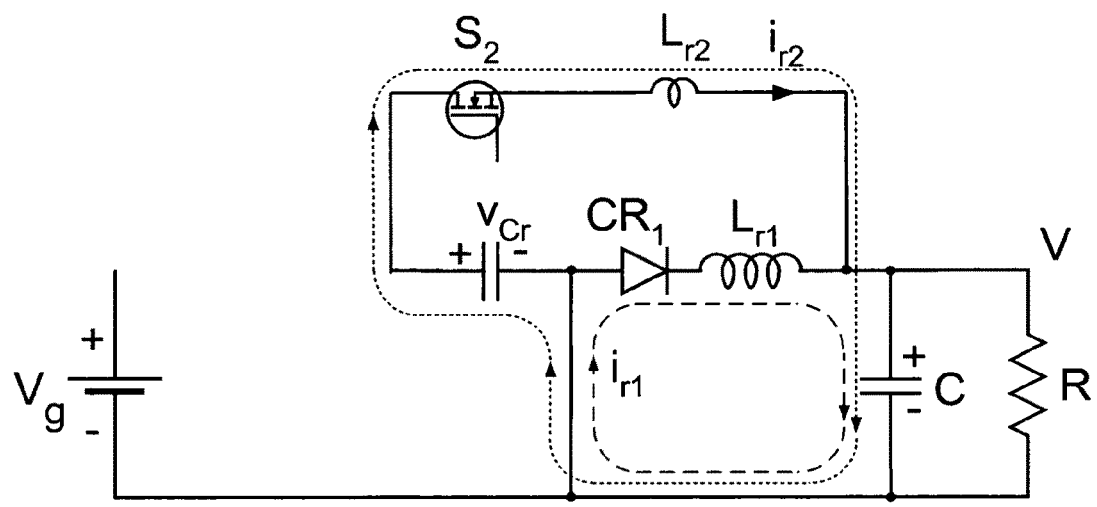
Figure 25A:
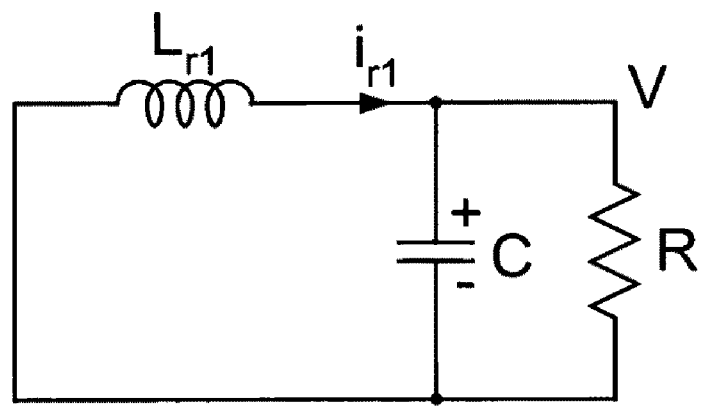
FIG. 25a is equivalent circuit model for resonant inductor $L_{r1}$ and FIG. 25b is equivalent circuit model for resonant inductor $L_{r2}$ for the equivalent circuit model of FIG. 24b.
Figure 25B:
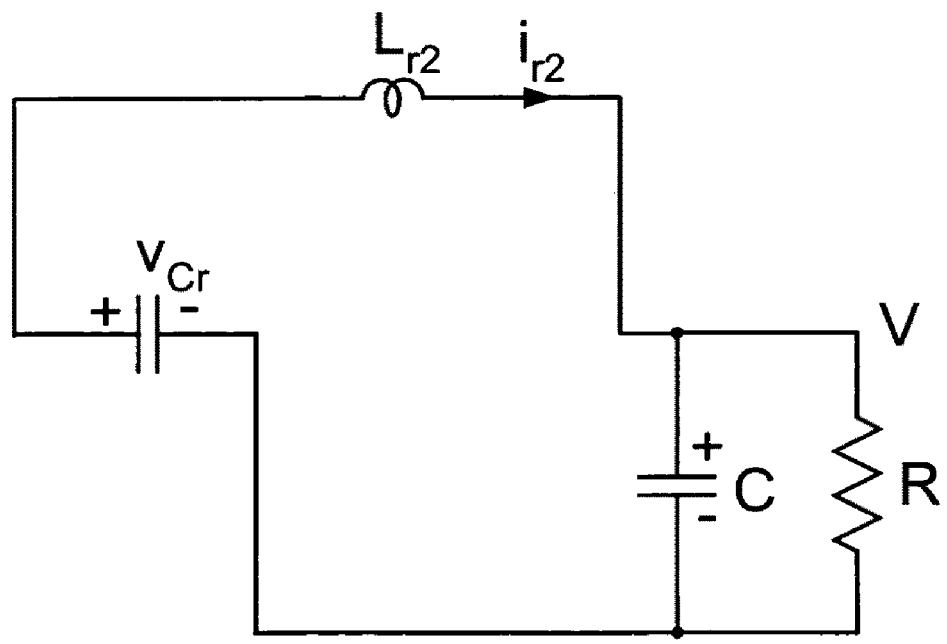

The switched network of FIG. 24b can be further split into two separate linear networks shown in FIG. 25a and FIG. 25b. Therefore the principle of superposition can be used to find the current in each of the two linear circuits and their results added together to result in the currents of the original linear network of FIG. 24b.

Figure 26A:
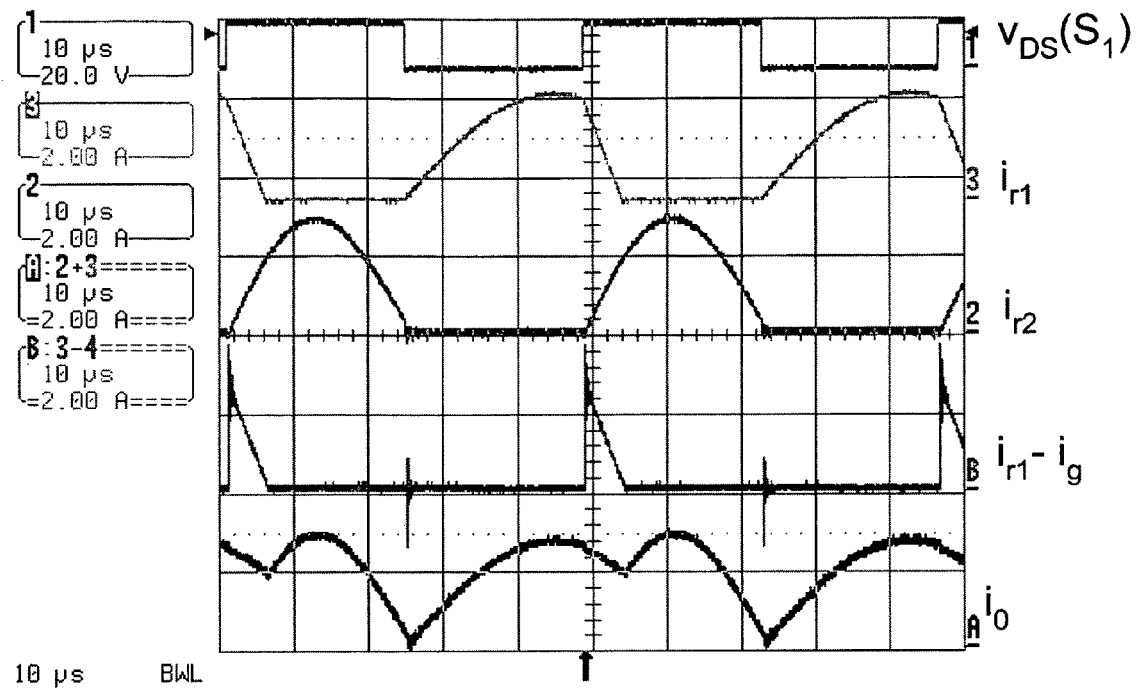
FIG. 26a illustrates the four current waveforms when the converter of FIG. 9a is operating in continuous voltage control mode at 0.5 duty ratio and away from optimum duty ratio at 0.66 at which a fixed 2:1 DC conversion ratio is obtained.

The following discussion of operation is now made with the reference to the current waveforms in the converter, when the duty ratio is reduced from D=0.66 at optimal point to duty ratio D=0.5 as illustrated by actual measured converter waveforms shown in FIG. 26a. The top trace is the main switch voltage to provide the reference point for the duty ratio and OFF time period. The second trace from top is the resonant inductor current $i_{r1}$, the third trace is the resonant inductor current $i_{r2}$, the fourth trace is the difference $(i_{r1}-i_g)$ current and fifth trace is the load current $i_0$.

Figure 26B:
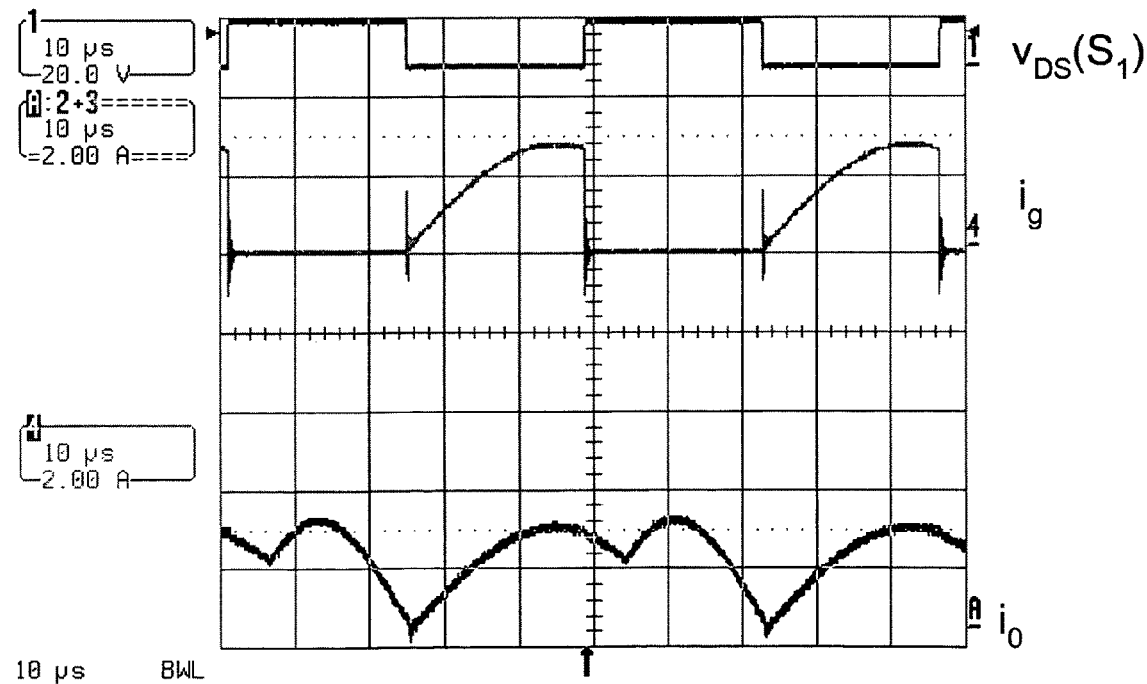

The additional waveform displayed in FIG. 26b is the input switch current shown as the second trace from the top, while the output current (third trace) is the same as in FIG. 26a for establishing reference with the previous waveforms. We now first establish that switch $S_1$ can be indeed turned OFF before the resonant inductor current $i_{r1}$ has reached zero current level as shown in FIG. 26b illustrating the abrupt change in the input current $i_g$ which corresponds to the switched network shown in FIG. 24b which is applicable during the interval $D_2T_S$. When switch $S_1$ is turned-OFF at the end of ON-time interval $DT_S$ (FIG. 24a) there was still stored energy on the resonant inductor $L_{r1}$. The corresponding switched network of FIG. 24b for interval $D_2T_S$ shows that the rectifier $CR_1$ is not turned-OFF but, instead, still continues to conduct (freewheeling) until the resonant inductor current $i_{r1}$ reaches zero. In fact, as explained above by the principle of superposition applicable to the linear networks, the linear network of FIG. 24b can be split into two linear networks shown in FIG. 25a and FIG. 25b, which can be used independently to obtain the time domain current waveforms of each circuit. Then the total current delivered to the load is a superposition of the currents of each separate linear network. The linear network of FIG. 25a leads to the linearly decreasing current with the slope given by $-V/L_{r1}$ where V is the output DC voltage shown as the fourth trace in FIG. 26a. Note also that during this freewheeling interval the resonant inductor current $i_{r2}$ obtained for the resonant circuit in FIG. 25b also flows into the load thus once again satisfying the equation (22) even under the continuous voltage control to result in the output load current $i_0$ shown as bottom trace in both FIG. 26a and FIG. 26b.

Figure 24C:
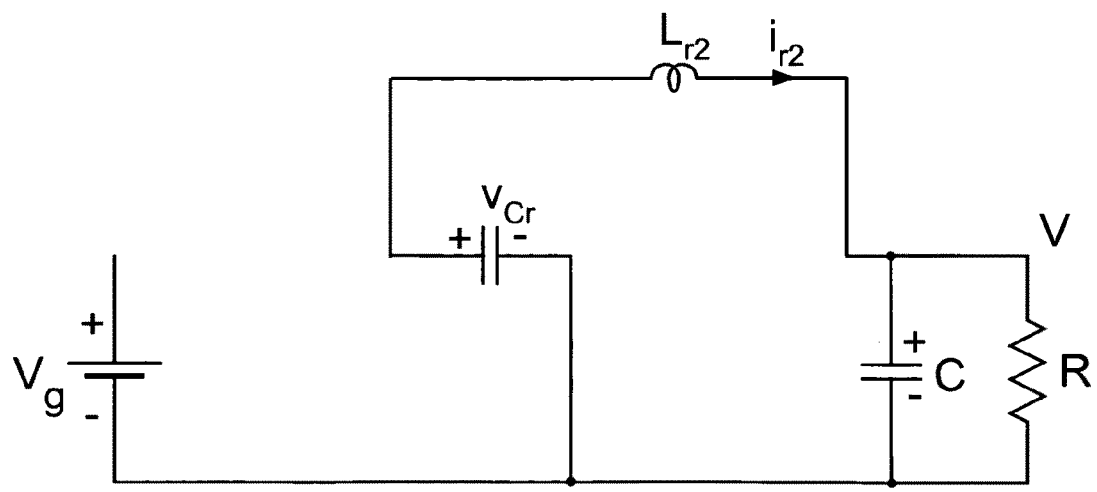

Once resonant inductor current $i_{r1}$ reaches zero at the end of interval $D_2T_S$ the rectifier $CR_1$ is turned-OFF so that a third interval $(1-D-D_2)T_S$ is initiated represented by switched network of FIG. 24c. From FIG. 25b the resonant inductor current $i_{r2}$ is flowing also directly to the load so that the total current delivered to the load is even during interval $D_2T_S$ sum of the two resonant currents as per equation (22). Therefore, this condition (22) is maintained even during the continuous control of the output voltage and result in the continuous output current flowing at all times. Finally, the switched network in FIG. 24c applicable during the interval $(1-D-D_2)T_S$ results in the resonant current $i_{r2}$ shown as third trace from top in FIG. 26a.

The time domain waveform of the input and output currents are shown in FIG. 26a and FIG. 26b. Note how the output current waveform of FIG. 26a has, in fact much reduced ripple current and correspondingly reduced output ripple voltage, as they are being helped by the load current being supplied by both resonant currents during the interval $D_2T_S$.

The average input current is $I_g$ and the average load current I. Thus the DC current conversion ratio is:

$$I_g/I=V/V_g \quad (31)$$

With the continuous duty ratio reduction, the DC current conversion ratio is continuously reduced and as per (31) so is DC voltage conversion ratio. Hence continuous duty ratio control of the output voltage is obtained. Note that there are no other existing resonant converter methods, which can control the output voltage by duty ratio control. There are either incapable of voltage control, or when they are, the control is not possible with duty ratio control, but by using ratio of the switching frequency and resonant frequency.

Let us now find the analytical expression for the DC conversion gain.

Continuous DC Conversion Gain Formula

Figure 27A:
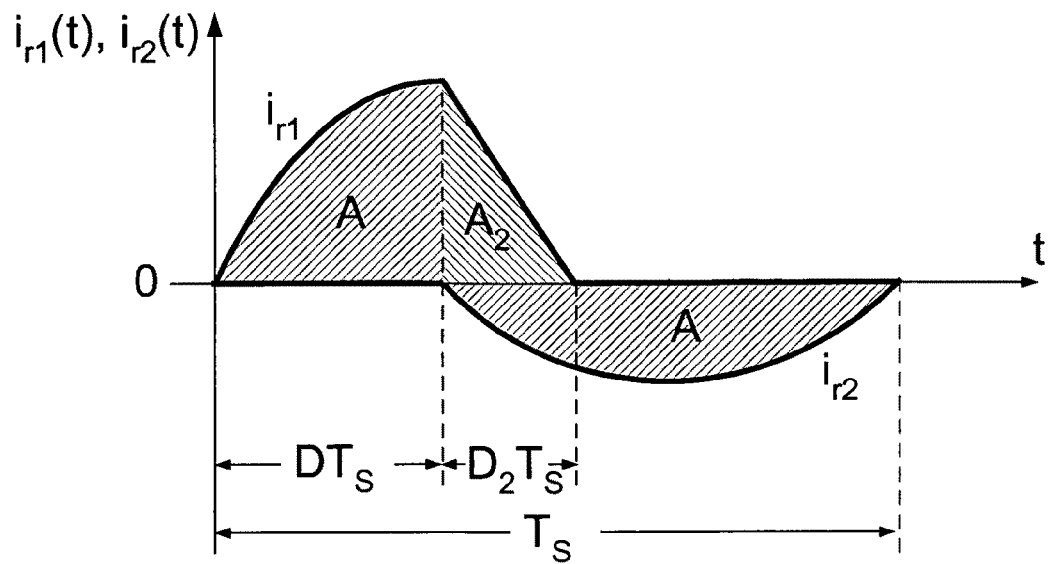
FIG. 27a illustrates the two resonant current waveforms and designates appropriate areas used for analytical determination of the DC conversion ratio and FIG. 27b is the graph of the theoretically predicted DC conversion ratio.

The DC conversion gain formula can be found from the two resonant inductors currents waveforms and the designation of the areas A and $A_2$ under the respective current waveforms shown in FIG. 27a.

The DC current conversion ratio in terms of the areas and ratio of two areas are:

$$I_g/I = A/(2A+A_2) \quad (32)$$

$$A_2/A = D_2/D \quad (33)$$

from which DC conversion gain is obtained as:

$$V/V_g = D/(2D+D_2) \quad (34)$$

where $D_2$ is a freewheeling duty ratio complex function dependent on resonant inductors values, duty ratio D, switching period $T_S$, output load resistor R and resonant capacitor $C_r$, that is:

$$D_2 = f(D, L_{r1}, L_{r2}, C_r, R, T_S) \quad (35)$$

This function is found analytically, but is not included here due to its complexity.

DC gain formula (34) for the special case when $D_2=0$ at the optimal point reduces to:

$$V/V_g = 0.5 \quad (36)$$

Figure 27B:
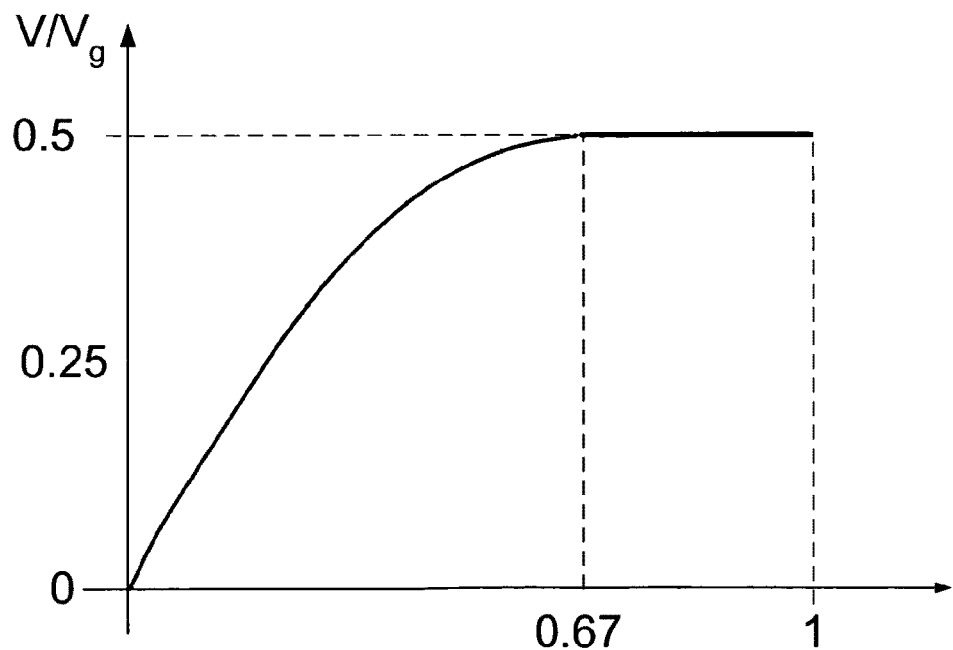
Figure 28A:
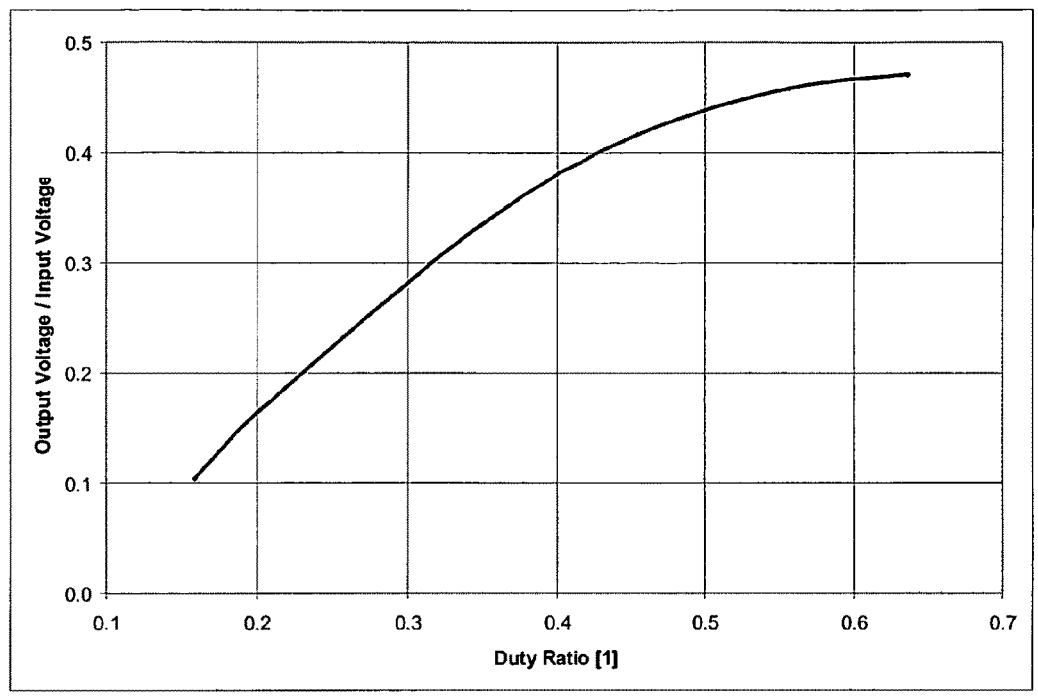
FIG. 28a is the measurement of the DC conversion ratio on a first experimental prototype with 12V input voltage and 2 A load current and FIG. 28b is the measurement of the DC conversion ratio for three load currents of 2 A, 4 A and 8 A obtained on an optimized prototype of a 750 W, 100V to 48V DC-DC converter described in second experimental section.
Figure 28B:
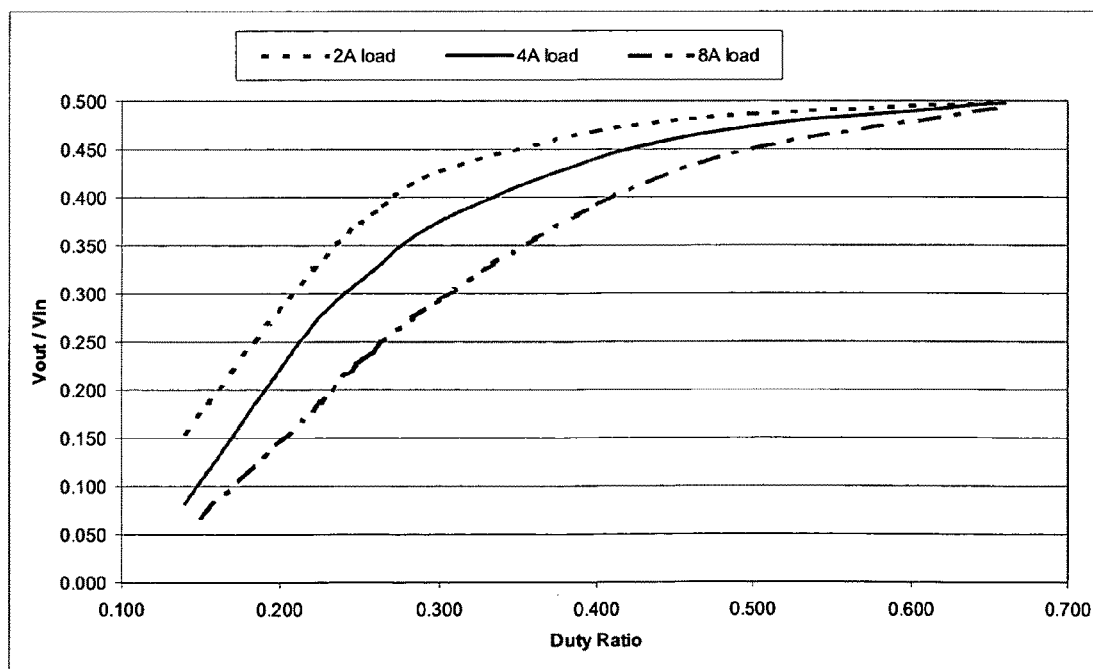

This theoretical DC gain is shown graphically in FIG. 27b to result in conversion gain of 0.5 at and above 0.67 duty ratio for the previous example, and that it converges to linear DC gain characteristic of $D/D_2$ for lower duty ratios. Ultimately it becomes zero at duty ratio of zero. The measurements of the DC conversion ratio on the 12V, 12 W breadboard prototype displayed in the graph of FIG. 28a confirm the above analytical result. FIG. 28b show the measurement results for the DC conversion ratio obtained on the experimental prototype of a 750 W, 100V to 48V converter. The DC conversion measurements are shown for load currents of 2 A, 4 A and 8 A demonstrating the fact that despite the load current dependence, the well behaved voltage Dc conversion ratio is obtained even for the light load of 10% of full load current.

Experimental 12V to 6V Step-Down Converter Prototype

The experimental prototype of the DC-DC step-down converter operating at a constant current of 2 A or higher loads was built to verify the key performance features. The following resonant components were used:

$$L_{r1}=3\mu H \quad L_{r2}=12\mu H \quad C_r=19\mu F \quad (37)$$

The other components used:

Three MOSFETs: IRF 530, current rectifiers:
50SQ100(100V, 5 A) (38)

Figure 29A:
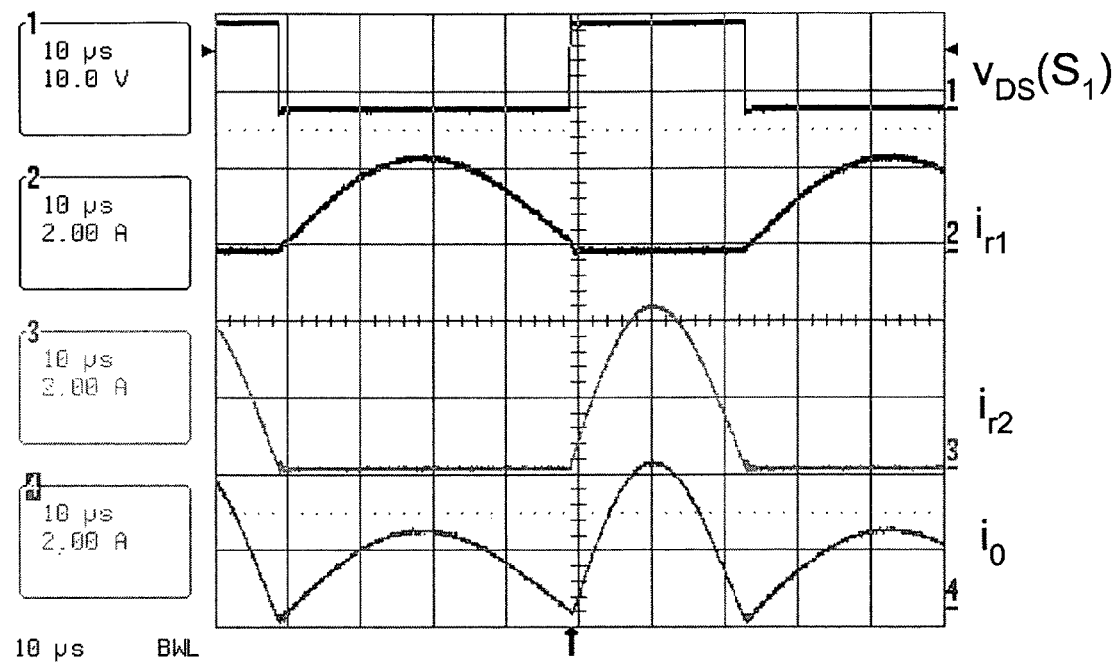
FIG. 29a are the current waveforms measured on the first experimental prototype with 12V input voltage at optimum duty ratio of 0.66.

Operation at zero current level was obtained at approximately 0.67 duty ratio and switching frequency of 16 kHz as seen in the experimental waveforms of FIG. 29a, which agree quite well with the prediction. Shown in FIG. 29a from top to bottom are, voltage of switch $S_1$, resonant current $i_{r1}$, resonant current $i_{r2}$ and the load current $i_0$. This also confirms equation (22) that the output current is the sum of the two resonant currents at the optimal point. Note how the resonant inductors currents start at zero current level and after respective half-cycle resonance return to zero at which instant the respective rectifier switches turn-OFF.

Figure 29B:
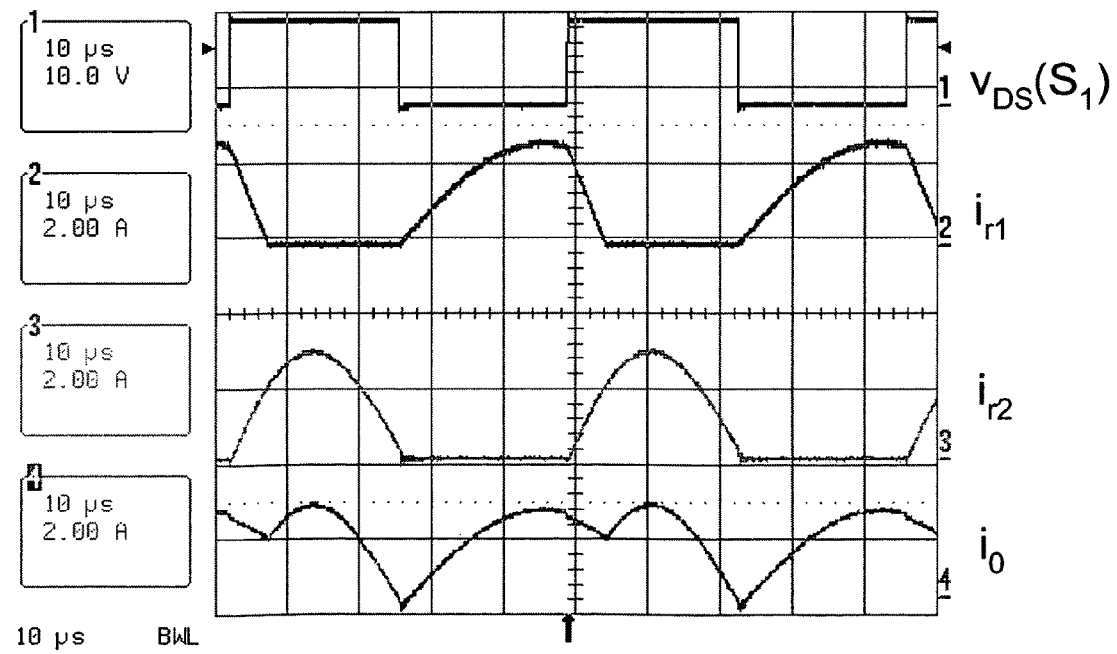
FIG. 29b are the same current waveforms but measured at duty ratio of 0.5.

The waveforms in FIG. 29b show the same currents when the duty ratio D is reduced to 0.5. Note how the resonant inductor current $i_{r1}$ now displays the linearly decreasing current during the freewheeling interval $D_2T_S$ as theoretically predicted. Since the OFF-time interval did not change, the resonant inductor current $i_{r2}$ has the same full half-cycle as seen in third trace. Finally, the bottom trace confirms that output load current is the sum of the two resonant currents displayed above. Note how the ripple of output current is effectively reduced due to resonant currents summation during the freewheeling interval $D_2T_S$.

Figure 30A:
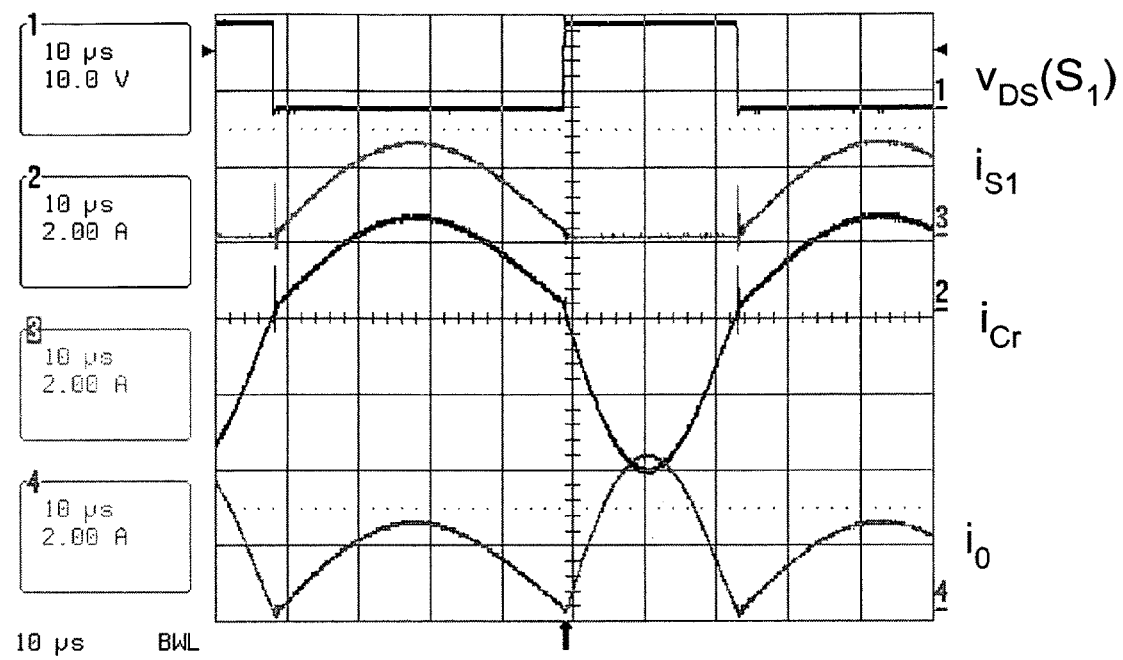
FIG. 30a are current waveforms measured on the first experimental prototype with 12V input voltage but at duty ratio of 0.66.
Figure 30B:
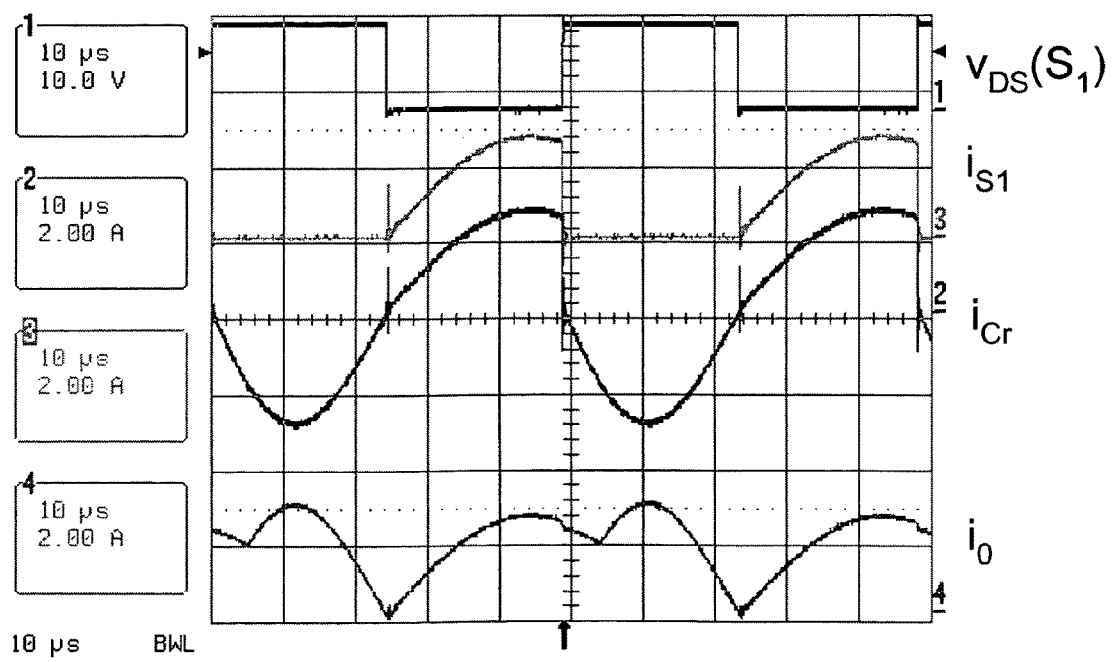
FIG. 30b are the same current waveforms but measured at duty ratio of 0.5.

Current waveforms displayed for duty ratio 0.67 in FIG. 30a are from top to bottom: input current $i_{S1}$, resonant capacitor current $i_{Cr}$ and load current $i_0$. Note how resonant capacitor current is charge balanced as the areas above and below zero current level are equal. This charge balance must be maintained under all duty ratios. Thus in the waveforms for D=0.5 shown in FIG. 30b the capacitor current is indeed charge balanced. As the duty ratio was decreased the charge stored on the resonant capacitor during ON-time is reduced, so that the discharge is also reduced. As the OFF-time interval is kept constant this resulted in reduced magnitude of the sine-wave resonant inductor current $i_{r2}$ compared to its magnitude in FIG. 30a.

Figure 31A:
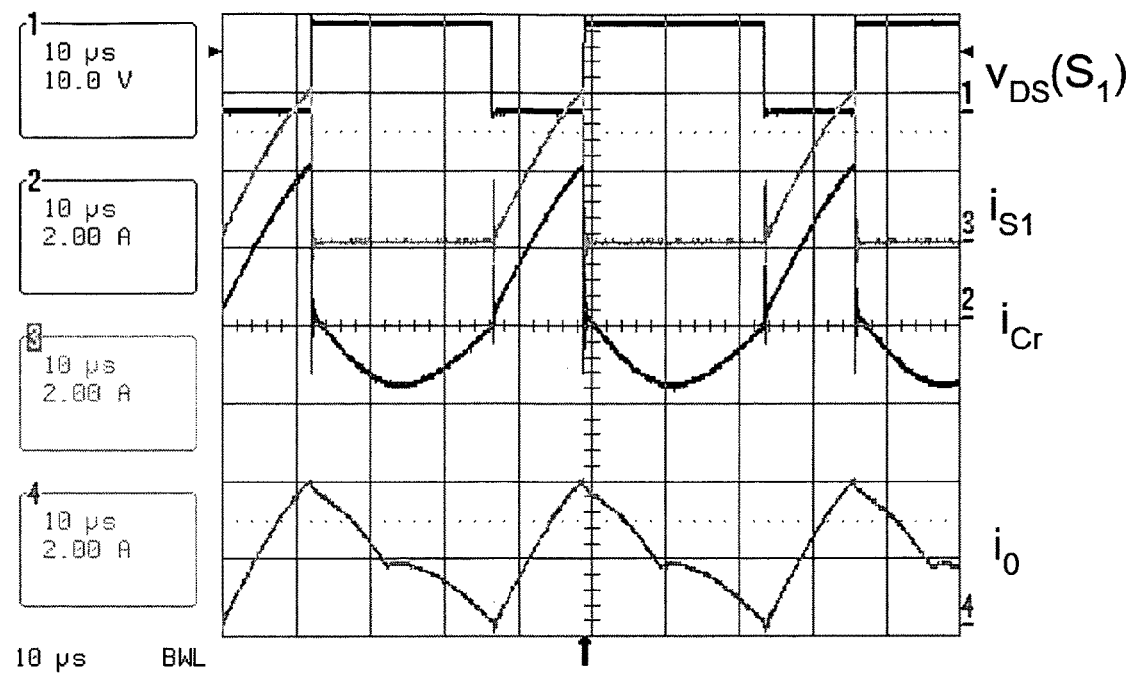
FIG. 31a are the current waveforms measured on the first experimental prototype with 12V input voltage but at duty ratio of 0.33.
Figure 31B:
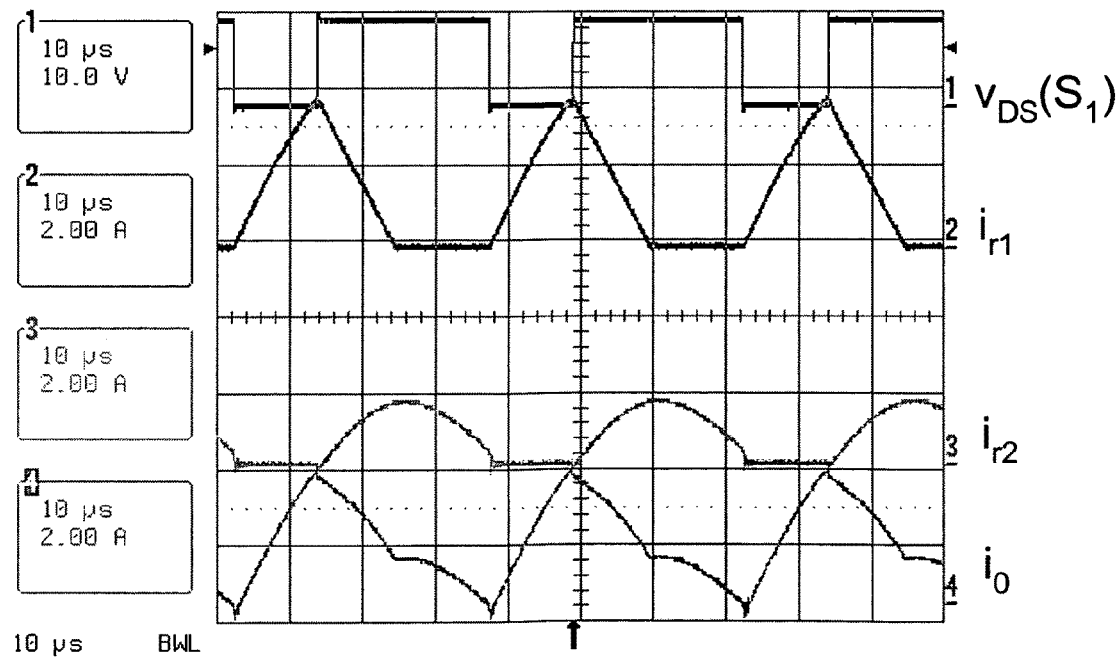
FIG. 31b are the same current waveforms but measured but at duty ratio of 0.33

Waveforms in FIG. 31a are for the further reduced duty ratio to 0.33. Note that the input current still starts from zero current level, but due to the short ON-time interval has a linearly increasing current. Once again the resonant capacitor current $i_{Cr}$ is charge balanced and the load current shows the smaller relative contribution of resonant current $i_{r2}$. FIG. 31b illustrates under the same conditions of 0.33 duty ratio, the resonant current $i_{r1}$ which now exhibit equilateral triangular behavior. From this triangle one can deduce that D=0.33 and $D_2$=0.33 and from the DC conversion can be calculated from the formula (34) that DC conversion ratio is 3:1 or 4V output for 12V input voltage. The measurement confirmed this result. The measurements on this prototype were used to produce the graph in FIG. 28a.

Figure 32A:
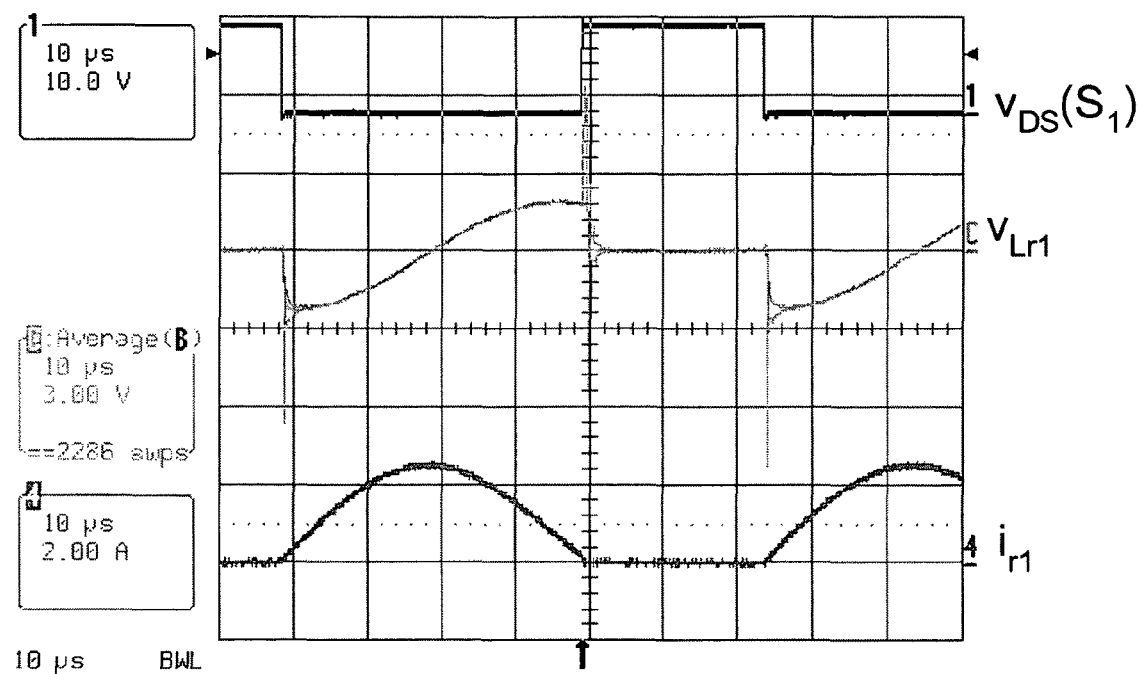
FIG. 32a display the voltage and current of the resonant inductor $L_{r1}$ measured at the optimum duty ratio of 0.66 FIG. 32b display the voltage and current of the resonant inductor $L_{r1}$ measured at the duty ratio of 0.66
Figure 32B:
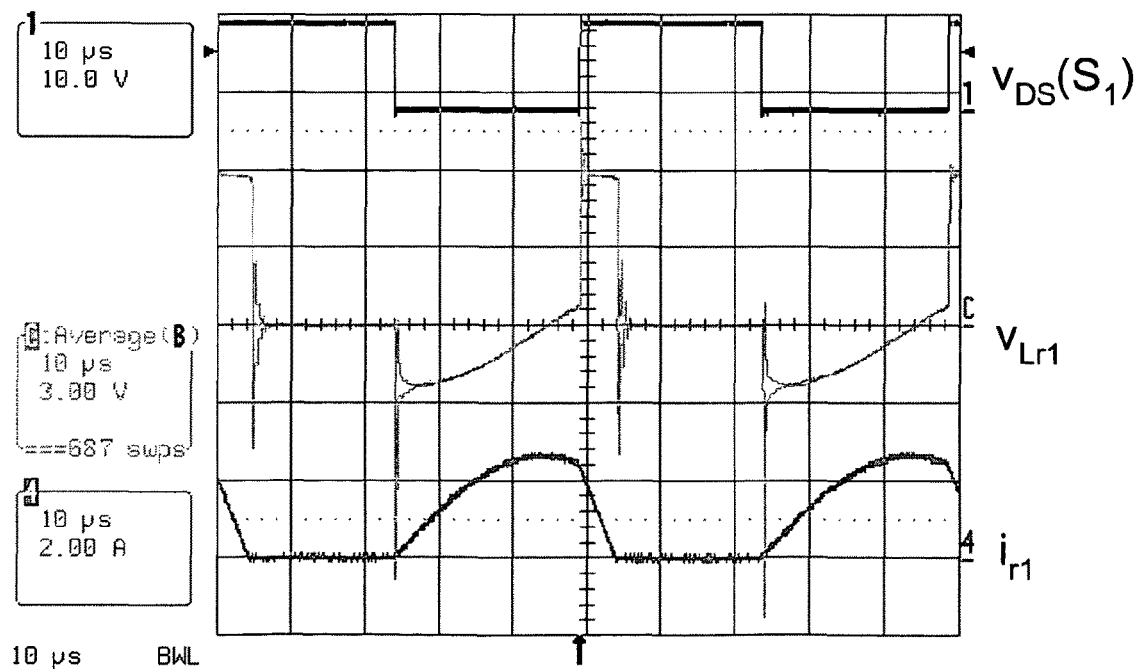
Figure 33A:
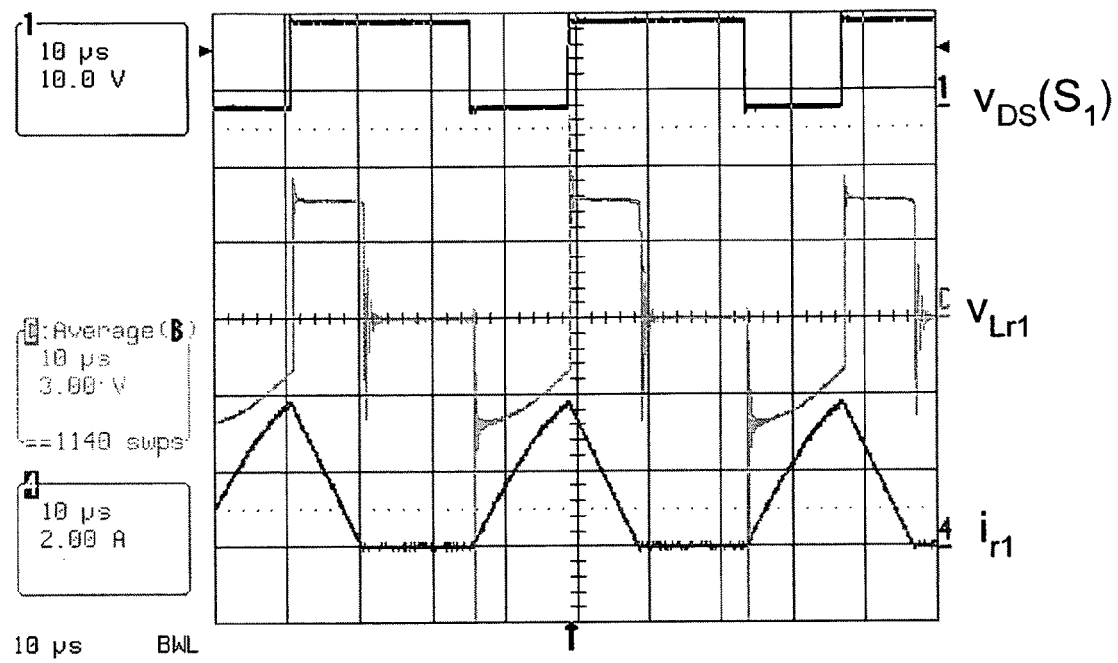
FIG. 33a display the voltage and current of the resonant inductor $L_{r1}$ measured at the optimum duty ratio of 0.33 FIG. 33b display the voltage and current of the resonant inductor $L_{r1}$ measured at the duty ratio of 0.28.
Figure 33B:
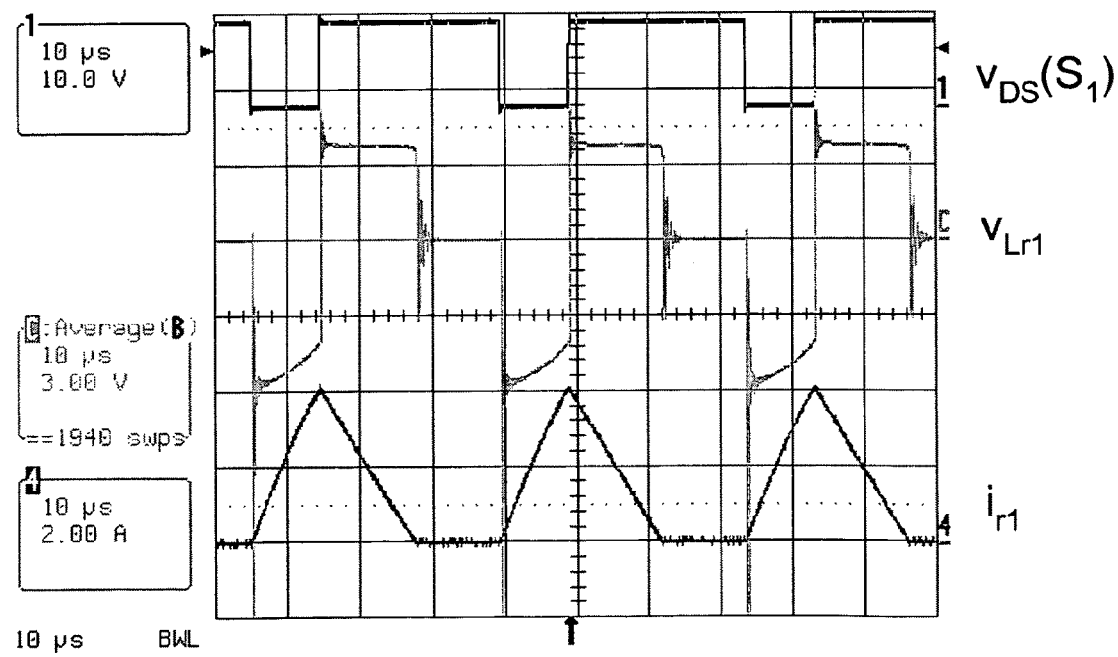
Figure 34A:
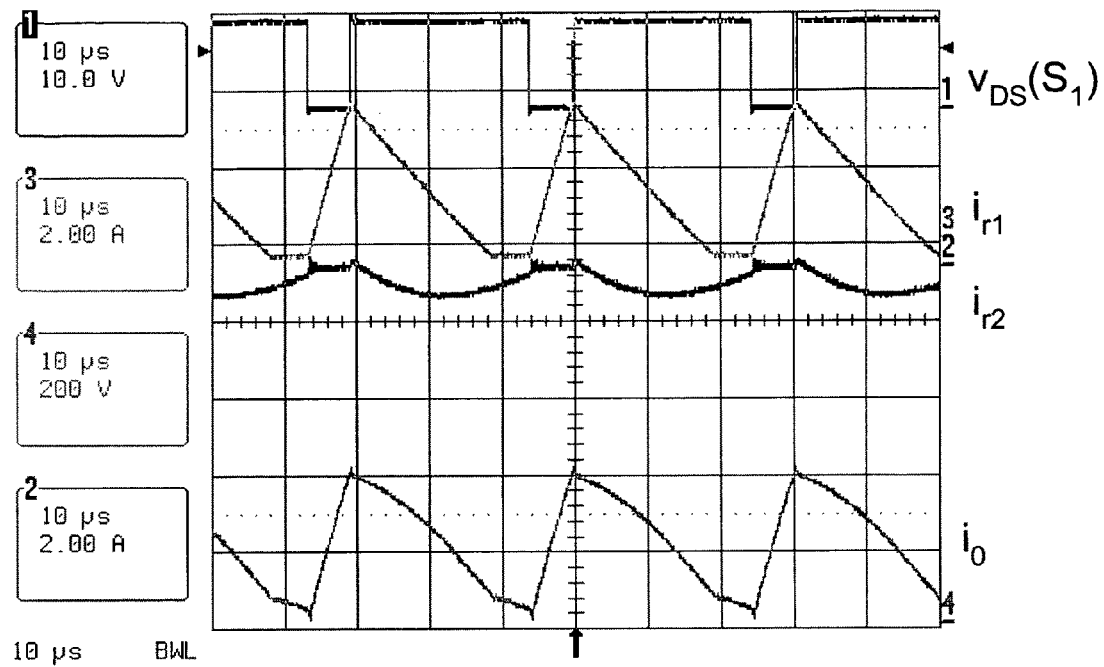
FIG. 34a are the current waveforms measured on the first experimental prototype with 12V input voltage and at duty ratio of 0.2, FIG. 34b are the same current waveforms but measured but at duty ratio of 0.15.

The next few measurements were made to show the voltage and current of the resonant inductor $L_{r1}$ from the optimal point (FIG. 32a) at 0.67 duty, duty ratio 0.5 (FIG. 32b), duty ratio 0.3 (FIG. 33a) and 0.2 (FIG. 33b) to illustrate the voltage excitation on the resonant inductor $v_{Lr1}$ responsible for the continuous output voltage change. Note, for example, on FIG. 32b that the voltage has in addition to co-sinusoidal part also a square wave-voltage part in which the magnitude of that voltage corresponds to the output DC voltage. As the duty ratio is lowered the magnitude of this voltage is also lowered so that it is equal to output DC voltage, while the freewheeling duty ratio $D_2$ is increased continuously. Further decrease of duty ratio to 0.2 results in further reduction of output DC voltage to 2V and corresponding increase of the freewheeling duty ratio $D_2$ as illustrated in FIG. 34a.

Modification to Three-Switch Embodiment

Figure 34B:
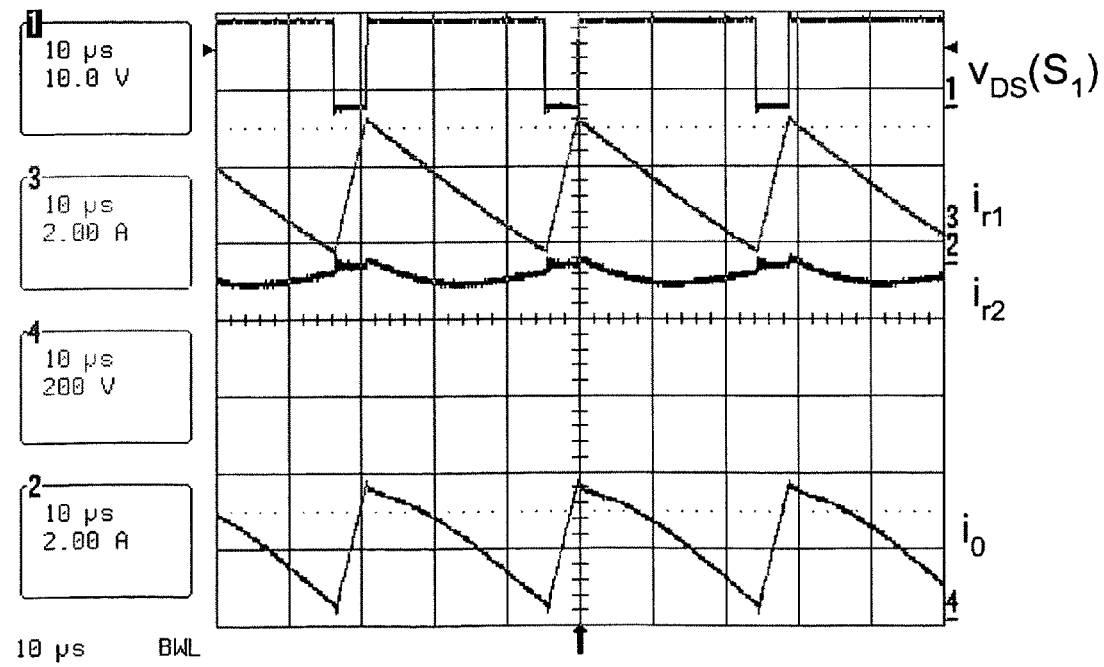

Finally, the critical point is reached for D=0.15 and $D_2$=0.85 (FIG. 34b) so that the following critical condition is reached:

$$D_2 = 1-D \quad (39)$$

Figure 35A:
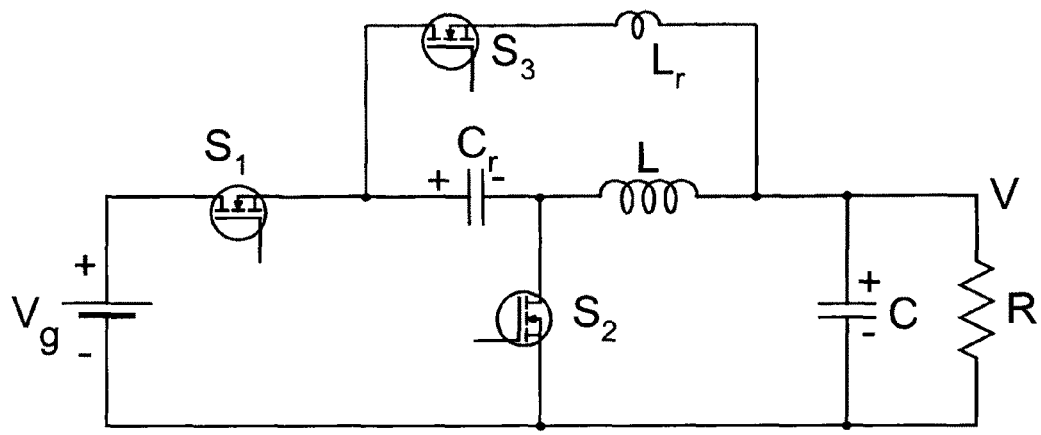
FIG. 35a is a three-switch converter obtained when the current rectifier in the converter of FIG. 9a is shorted.
Figure 35B:
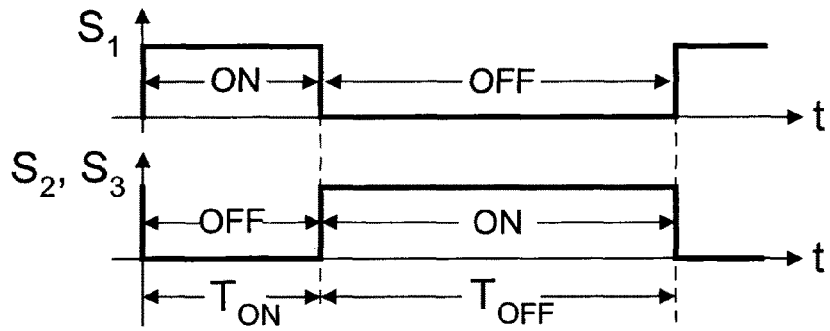
FIG. 35b is the diagram of the state of switches and FIG. 35c is the DC conversion gain of the converter in FIG. 35c.

Note that at this instance, the current rectifier $CR_1$ is conducting at all times. This means that this rectifier switch $CR_1$ can be eliminated and the converter of FIG. 35a with three MOSFET switches used instead. This was done on the prototype by shorting the rectifier switch. The observed waveforms remained identical to those in FIG. 34b made with rectifier switch included The only difference was small increase of the output voltage, which was to be expected since the conduction losses of the rectifier $CR_1$ were eliminated and efficiency increase, so the output voltage had to increase proportionally to loss reduction.

By replacing (39) into DC conversion formula (34), the new DC conversion gain formula is obtained as:

$$V/V_g = D/(1+D) \quad (40)$$

Figure 35C:
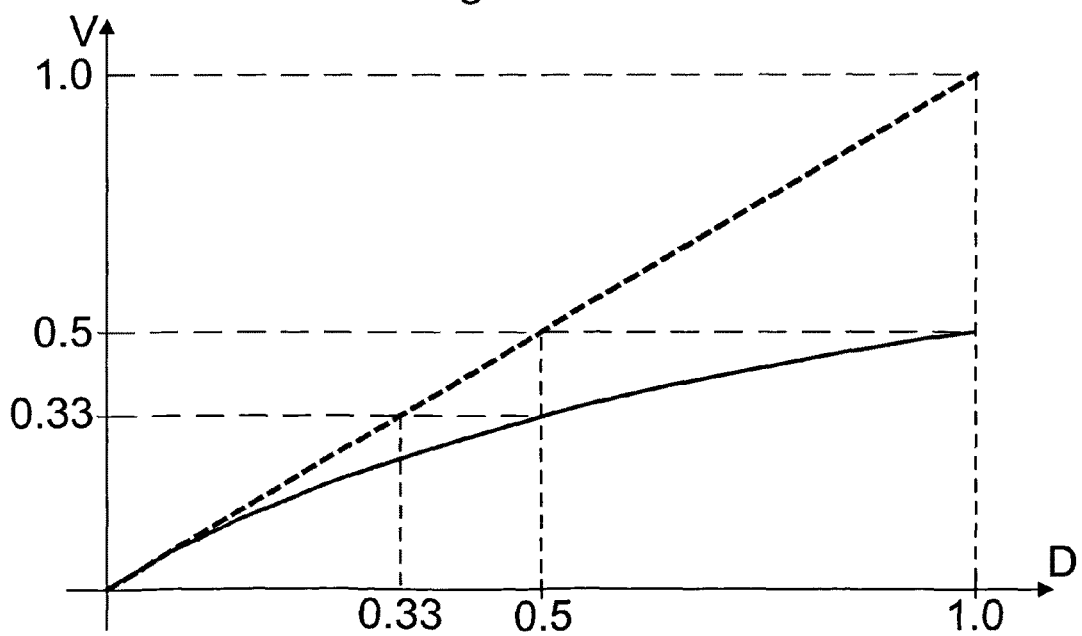
Figure 36A:
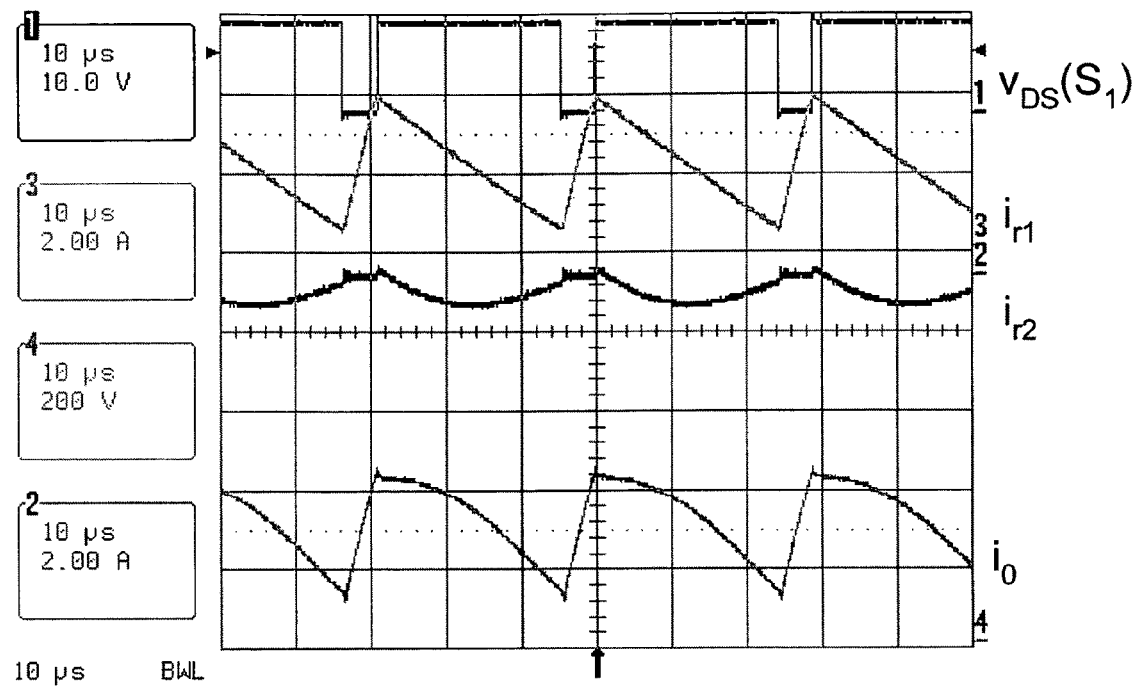
FIG. 36a are the current waveforms measured on the first experimental prototype with load current increased from 2 A to 3 A.
Figure 36B:
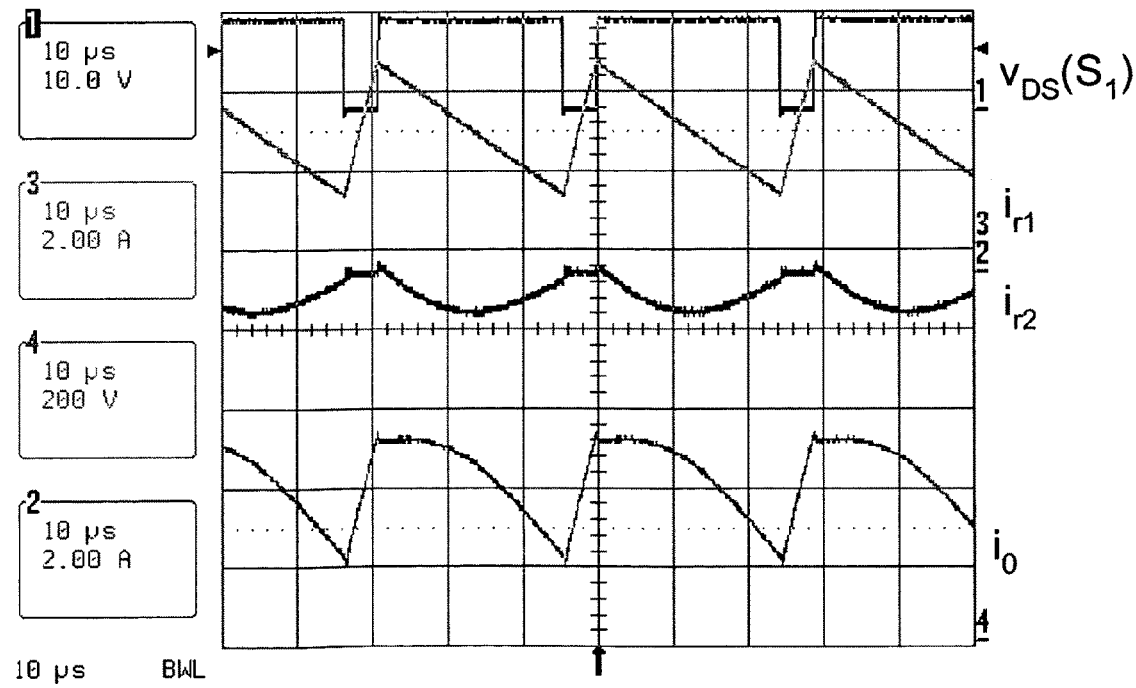
FIG. 36b are the same current waveforms but measured when load is increase to 4 A.

The graphical representation of this DC conversion gain is shown in FIG. 35c. From (40) DC conversion is only function of the duty ratio D like in conventional converters and independent of the load current. This is confirmed by the load current increase to 3 A and 4 A respectively, which resulted in the current waveforms of FIG. 36*a* and FIG. 36*b* respectively.

This performance feature can be therefore used to either operate as a Three-switch converter for ultra low voltage applications or to eliminate the load current dependence of DC conversion ratio in the original Four-Switch converter.

Ultra Low Voltage Applications

In ultra low voltage applications, the Three-switch configuration is used for all operating conditions, with the main advantage in improved efficiency, reduced component count, simple drive and feedback control implementation and DC conversion ratio independence from the load current.

Operation at Light-Load and No-Load

Figure 37A:
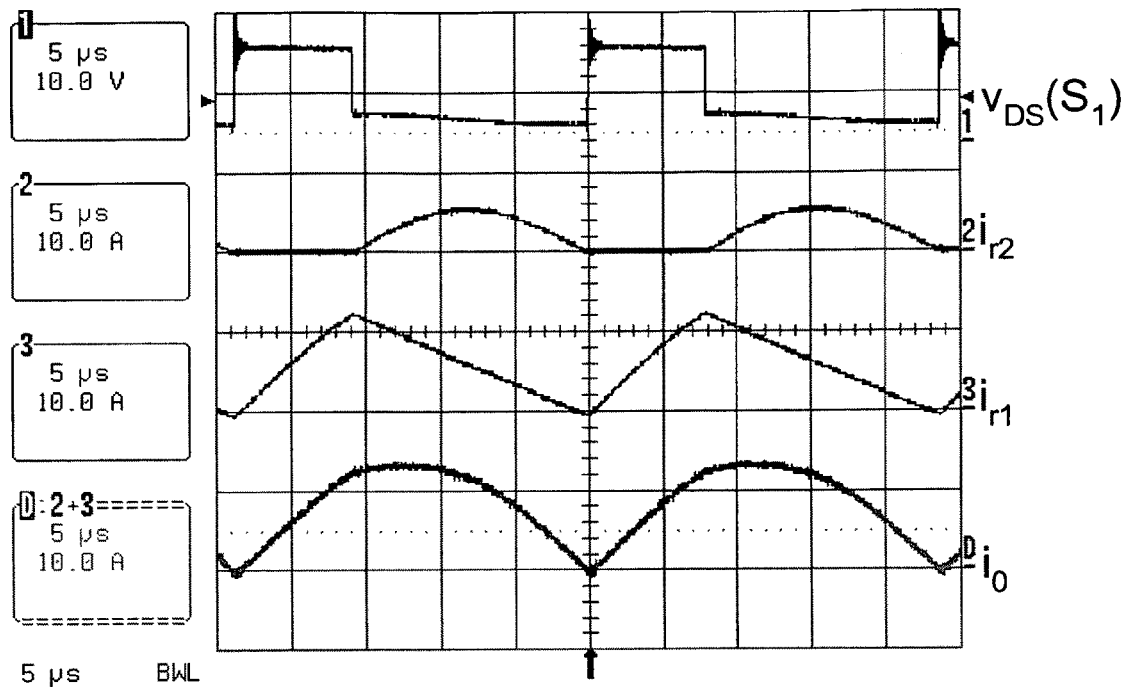
FIG. 37a are the current waveforms measured on the converter of FIG. 35a adjusted so that the resonant inductor $i_{r1}$ current starts and ends at zero current level (third trace from the top).
Figure 37B:
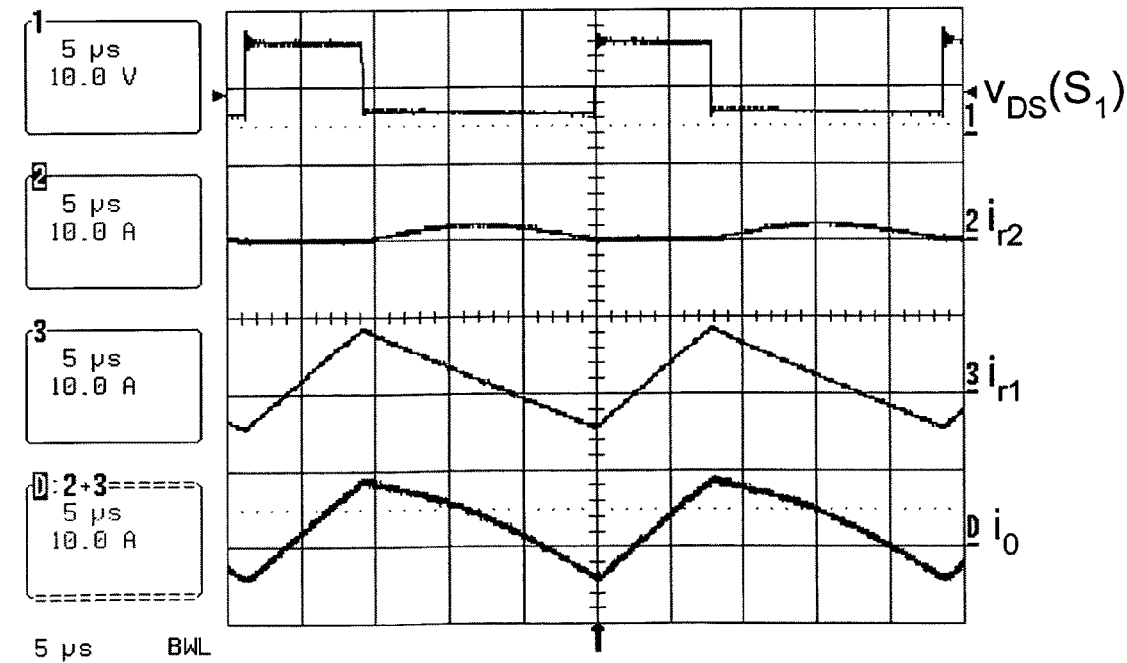
FIG. 37b are the current waveforms when load current is reduced so that the resonant inductor $i_{r1}$ current goes bellow zero current level (third trace from the top).

Another experiment was made to show another feature of the present invention. The four MOSFET switch implementation is used as in converter of FIG. 9*a* and the duty ratio D adjusted so that the load current $i_0$ just reaches zero but does not go below zero as seen in the waveforms in FIG. 37*a*. Then the load current is reduced and the waveforms on FIG. 37*b* are obtained. Note that both resonant current $i_{r1}$ and load current $i_0$ are allowed to go below zero current level. At the same time observation is made to the first order that there is no change of the output voltage despite change in the load current confirming that the DC conversion gain (40) applies.

Transient Load Operation

Present loads in computers, such as modern microprocessors demand a small overshoot/undershoot and fast settling time when the converter is subjected to the fast step-load current change. The present invention does inherently provide the fast transient response due to the fact that all currents start and return to zero current level within a cycle contrary to the conventional buck converter which undergoes many cycles, before the new steady state for new DC current level is reached as seen in FIG. 3*c*. The following step-load current measurements are conducted when the converter is adjusted for fixed 2:1 step-down conversion and operates at optimum point.

Figure 38A:
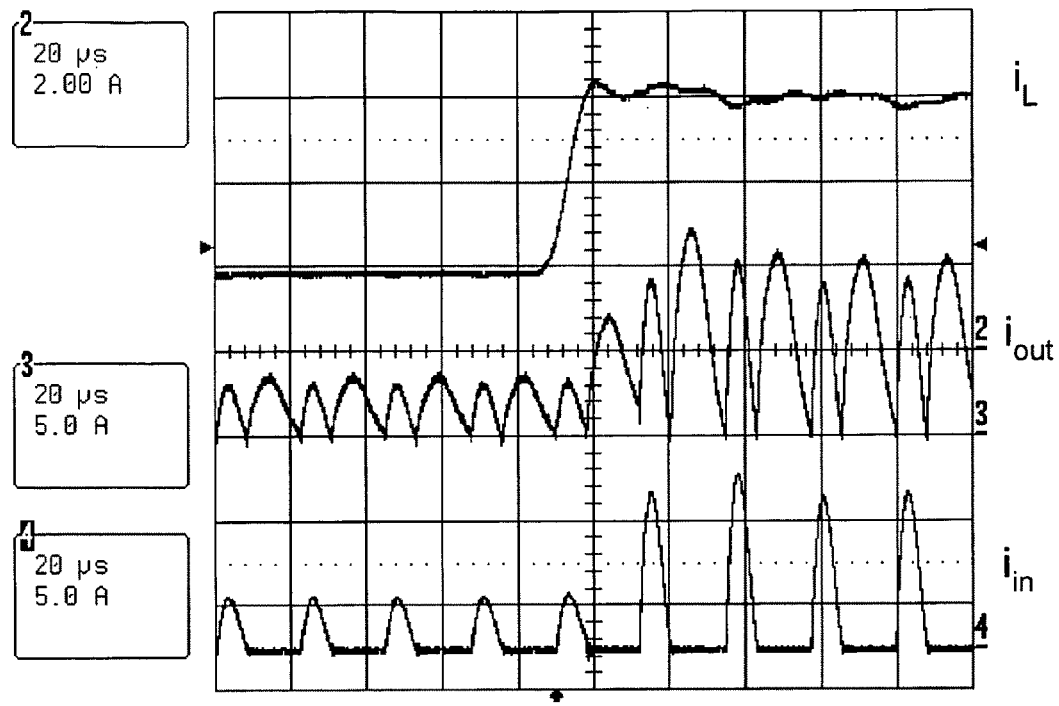
FIG. 38a are the current waveforms measured during the load current transient from 2 A to 6 A.
Figure 38B:
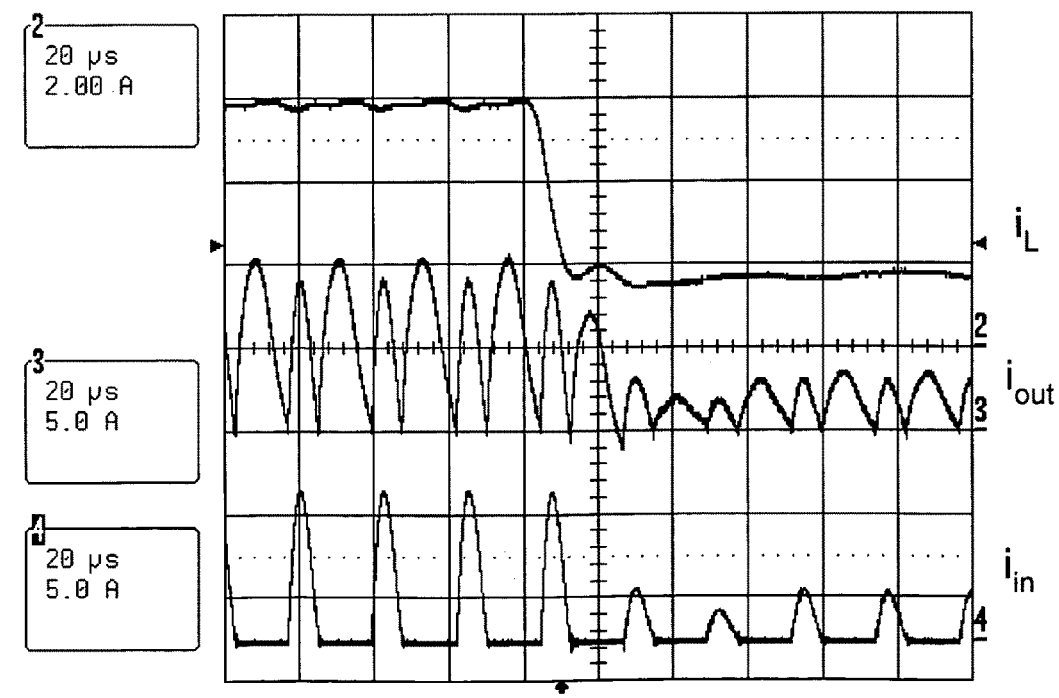
FIG. 38b are the current waveforms measured during the load current transient from 6 A to 2 A.

FIG. 38*a* is experimental measurement for step-load current change from 2 A to 6 A as seen by the top trace. Note how both the load current pulses (second trace) and source current pulses (third trace) immediately respond during the fast transient and change to the pulses with the new DC current level. The same can be observed on FIG. 38*b* for the step-load current change from 6 A to 2 A.

Figure 39A:
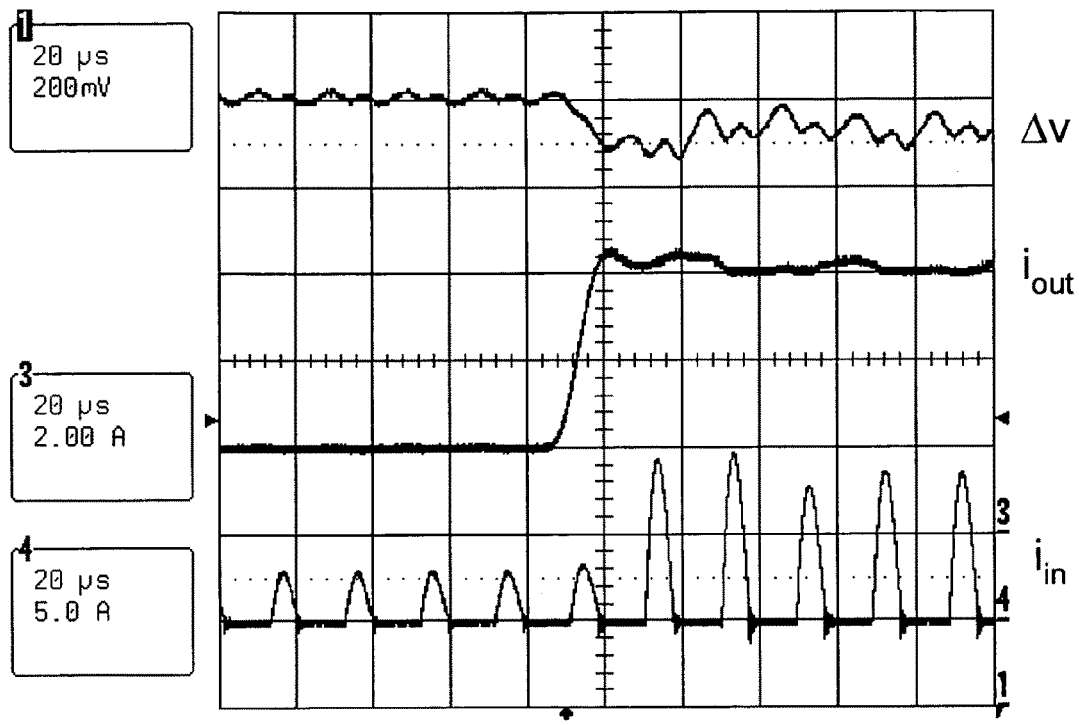
FIG. 39a is the measurement of the output voltage transient during load current change from 2 A to 6 A.
Figure 39B:
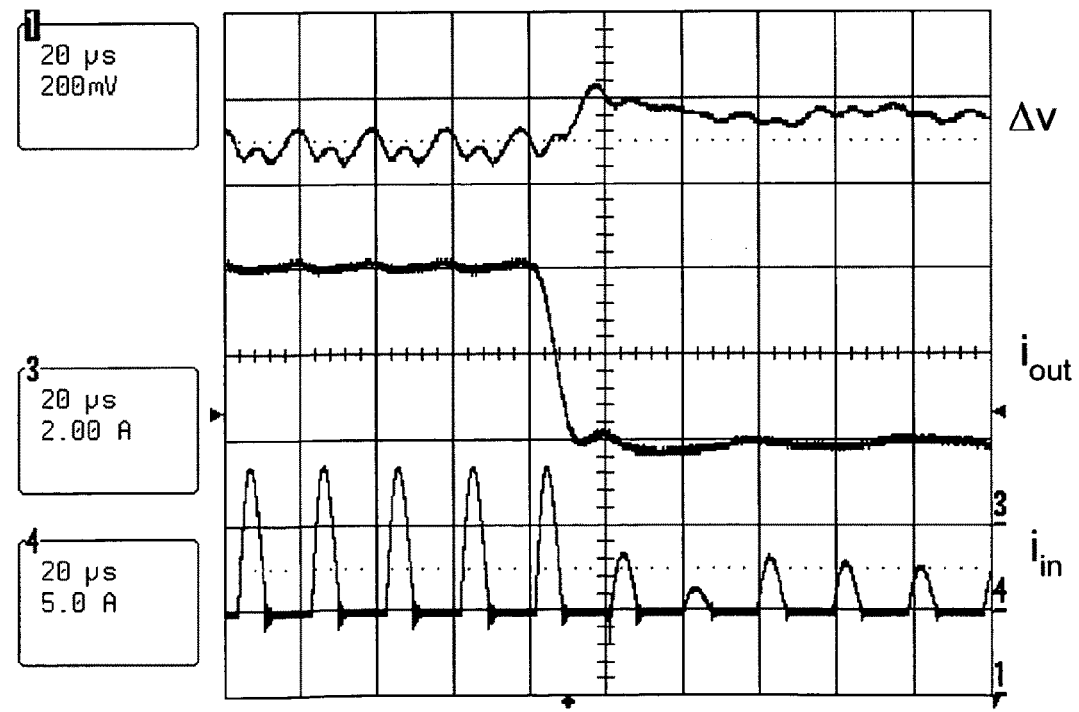
FIG. 39b is the measurement of the output voltage transient during load current change from 6 A to 2 A.

The output voltage overshoots due to the same step-load current change are recorded in the FIG. 39*a* and FIG. 39*b* as the top traces, which confirm a small 100 mV voltage overshoots for 6V output.

Storageless Feature During the Output DC Voltage Control

The previous experiment confirmed outstanding transient performance when converter operates under fixed 2:1 step-down conversion. One might be now worried that this feature is lost when the converter operates in DC voltage control mode described above. However, the same transient performance is confirmed to take place even when the converter is operating in the mode of continuous output voltage control. The reason is that even in that mode of operation the resonant currents are all returning again to zero current level within a single cycle. Hence, the previously described immediate increase of the resonant currents in response to the load current demand is available for the wide range of input voltage change and output load current change.

Experimental Prototype Confirming Efficiency and Size

Figure 40A:
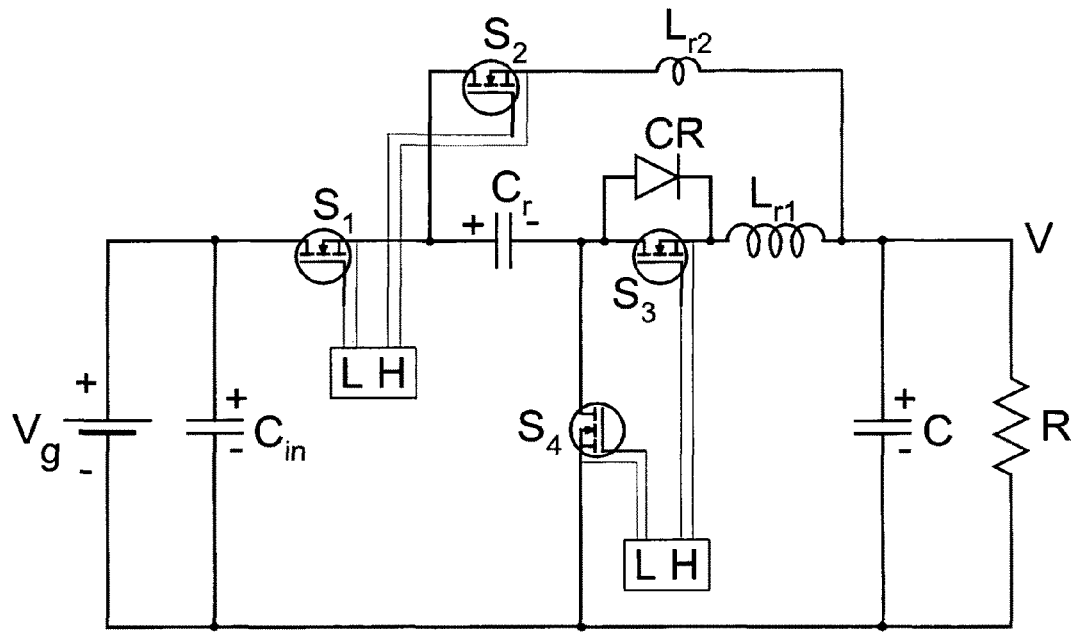
Figure 40B:
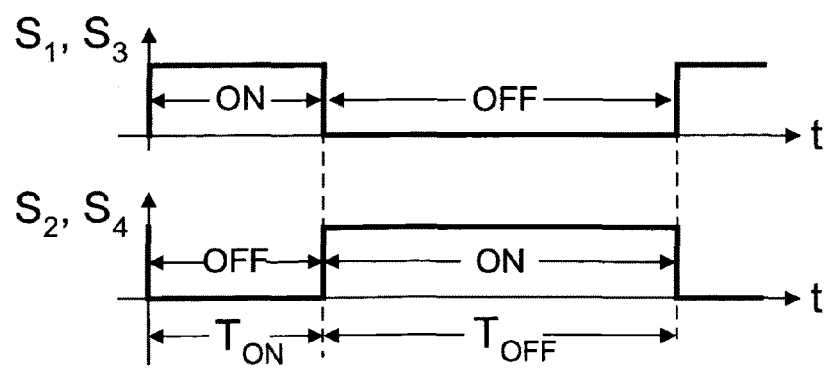

To demonstrate ultra high efficiency and ultra small size of the storageless converter a prototype DC-DC converter is built based on the extension shown in FIG. 40*a* and the switch state diagrams in FIG. 40*b*. The two high-side drivers and two low-side drivers are used to drive the four switches as per diagram in FIG. 40*b*. Note in particular that across the MOSFET switch $S_3$ an external Schottky diode is added to reduce the conduction losses during $D_2T_S$ interval. It is the modulation of this freewheeling interval $D_2T_S$ which results in continuous control of the output voltage. The voltage loop was closed and converter output voltage regulated over the 96V to 120V input voltage change.

Specifications: 750 W to 48V regulated converter

Input Voltage Range: 96V to 120V

Components:

MOSFETS: four IRFB4110

Diode: MBR 2100

Input capacitors: 47 µF, 250V

Output capacitor: 200 µF, 100V

Resonant capacitor: 5 µF, 250V

Resonant inductor $L_{r1}$: 2 µH, 30 A

Resonant inductor $L_{r2}$: 0.5 µH, 30 A

Switching frequency and resonant frequencies calculated at duty ratio of 0.66 are:

Resonant frequencies: $f_{r1}$=50 kHz, $f_{r2}$=100 kHz,

Switching frequency: 67 kHz

Figure 41A:
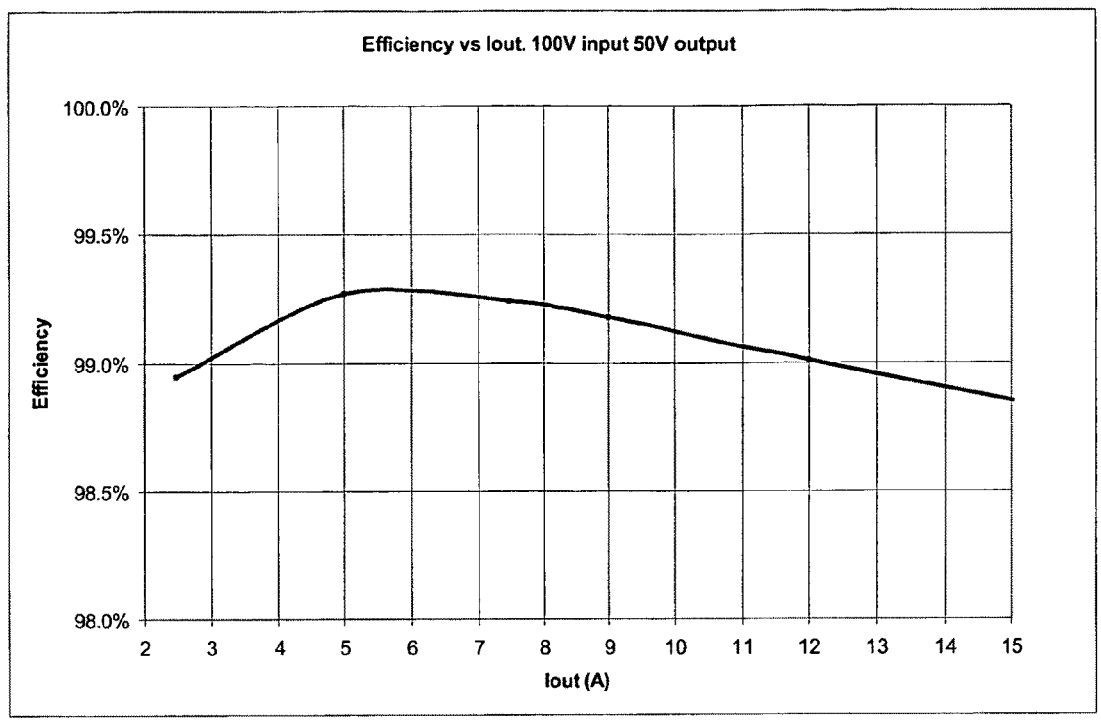
FIG. 41a illustrates the efficiency versus input voltage measurement results on a 750 W experimental converter and FIG. 42b illustrates the total power loss versus input voltage measurement results of the 750 W experimental converter.
Figure 41B:
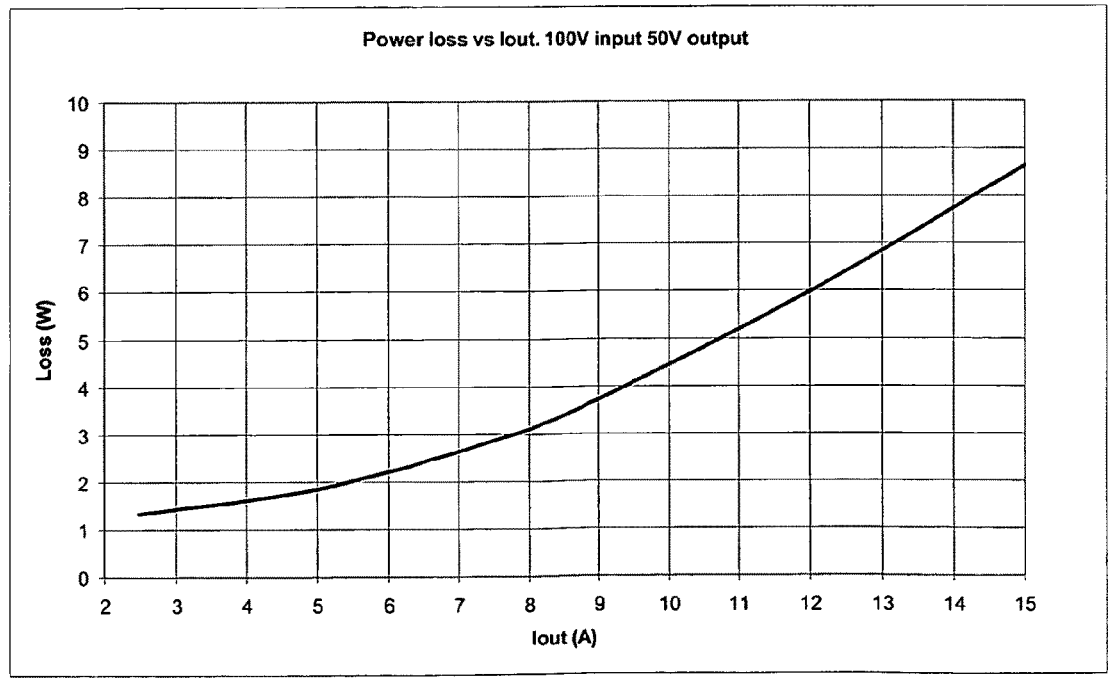

Graph of the efficiency and power loss as a function of the output current power is shown in FIG. 41*a* and FIG. 41*b* respectively. Note that the efficiency over of 99% is achieved over the wide load current range of 3 A to 12 A resulting in corresponding losses of 1.2 W to 6 W. At full load current of 15 A the efficiency of 98.8% is measured and losses of 8.5 W. The dominant part of the size and weight is by far in two resonant inductors. One inductor is made on RM 6 core and the other on RM 8 core resulting in ultra small size for high 750 W total power. The flat magnetic version of the resonant inductor will further considerably reduce resonant inductors sizes.

Figure 42A:
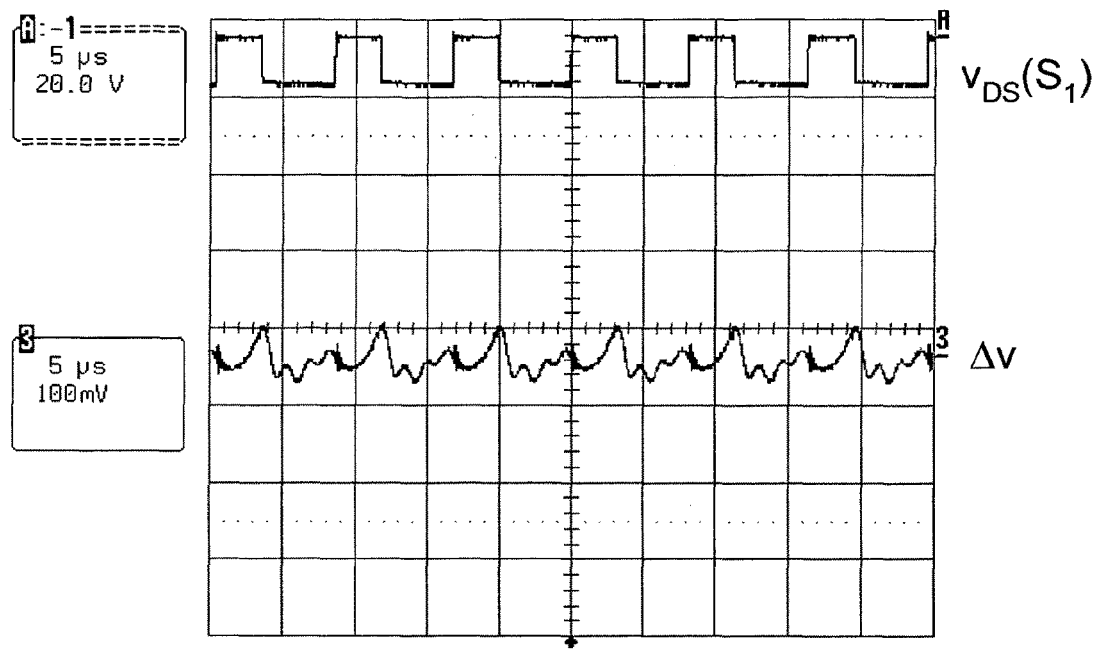
FIG. 42a illustrates the output voltage ripple waveform obtained on an experimental unit (750 W, 100V/48 W) operating at 2 A load current.
Figure 42B:
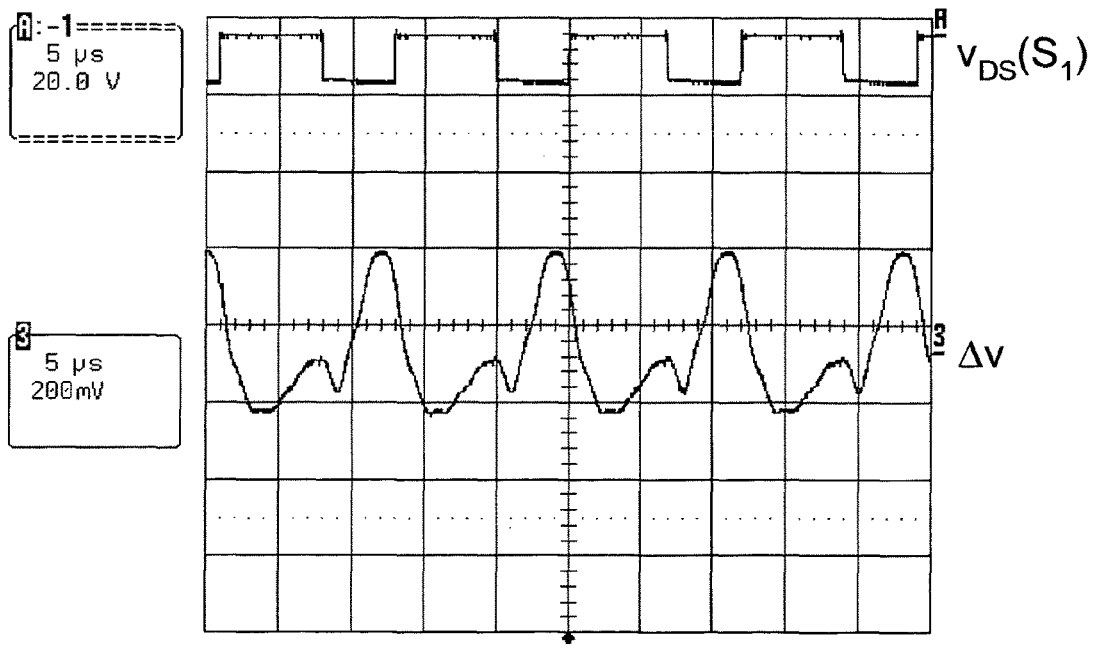
Figure 43A:
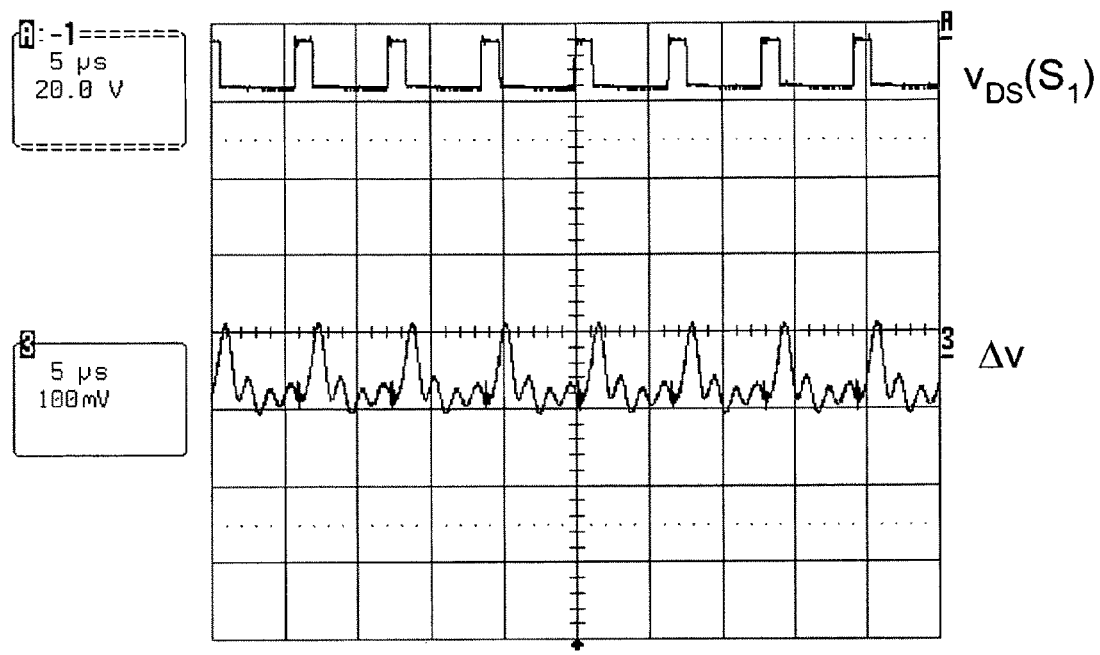
FIG. 43a illustrates the output voltage ripple waveform obtained on an experimental unit (750 W, 100V/48 W) operating at 120V input voltage and 2 A load current.
Figure 43B:
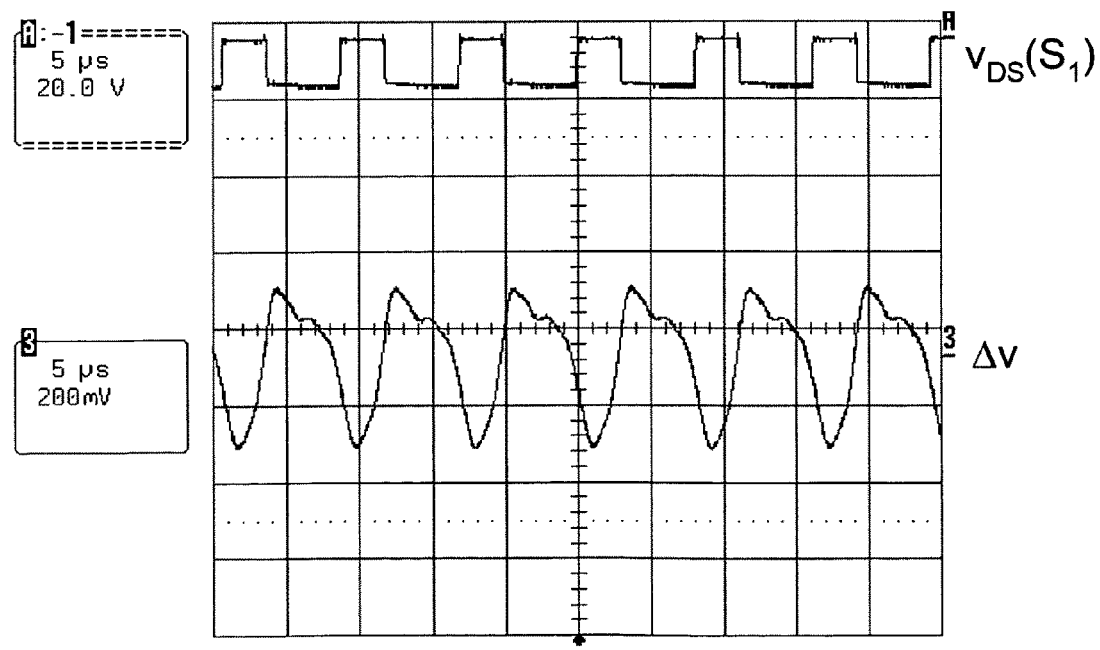
FIG. 43b illustrates the output voltage ripple waveforms obtained on 750 W experimental unit operating at 120V input voltage and full load current of 15 A.

Output ripple voltage measurements for 100V input voltage and 48V output voltage and for 2 A and 15 A load currents are shown in FIG. 42*a* and FIG. 42*b* respectively. Output ripple voltage measurements for 120V input voltage and for 2 A and 15 A are shown in FIG. 43*a* and FIG. 43*b* respectively. Thus at full load the output ripple voltages are less than 1% of the DC value, meeting typical ripple voltage requirements.

CONCLUSION

A storageless step-down DC-DC converter is provided which achieves simultaneously highest efficiency of 99% in an ultra compact size.

REFERENCES

1. Slobodan Cuk, *"Modeling, Analysis and Design of Switching Converters"*, PhD thesis, November 1976, California Institute of Technology, Pasadena, Calif., USA.
2. Dragan Maksimovic, *"Synthesis of PWM and Quasi-Resonant DC-to-DC Power Converters"*, PhD thesis, Jan. 12, 1989, California Institute of Technology, Pasadena, Calif., USA;
3. Vatche Vorperian, *"Resonant Converters"*, PhD thesis, California Institute of technology, Pasdena, Calif.;
4. Slobodan Cuk, R. D. Middlebrook, *"Advances in Switched-Mode Power Conversion"*, Vol. 1, II, and III, TESLAco 1981 and 1983.

What is claimed is:

1. A switching DC-to-DC converter for providing power from a DC voltage source connected between an input terminal and a common terminal to a DC load connected between an output terminal and said common terminal, said converter comprising:
   a first switch with one end connected to said input terminal;
   a second switch with one end connected to another end of said first switch;

a resonant capacitor with one end connected to said another
end of said first switch;
a first current rectifier switch with an anode end connected
to another end of said resonant capacitor;
a second current rectifier switch with an anode end connected to said common terminal and a cathode end connected to said anode end of said first current rectifier
switch;
a first resonant inductor with one end connected to a cathode end of said first current rectifier switch and another
end connected to said output terminal;
a second resonant inductor with one end connected to
another end of said second switch and another end connected to said output terminal;
switching means for keeping said first switch ON and said
second switch OFF during $T_{ON}$ time interval, and keeping said first switch OFF and said second switch ON
during $T_{OFF}$ time interval, where $T_{ON}$ and $T_{OFF}$ are
complementary time intervals within one switching
operating cycle $T_S$;
 wherein said first resonant inductor connected in series
with said first switch, said first current rectifier and
said resonant capacitor form a first resonant circuit
during $T_{ON}$ time interval with a resonant period $T_{r1}$;
 wherein said second resonant inductor connected in
series with said second switch, said second current
rectifier and said resonant capacitor form a second
resonant circuit during $T_{OFF}$ time interval with resonant interval $T_{r2}$;
 wherein a first resonant frequency $f_{r1}$ of said first resonant circuit is independent of a second resonant frequency $f_{r2}$ of said second resonant circuit;
 wherein said $T_{ON}$ time interval is adjusted to one half of
a first resonant period or $0.5T_{r1}$ and said $T_{OFF}$ time
interval is adjusted to one half of a second resonant
period or $0.5T_{r2}$ to obtain a fixed 2:1 step-down conversion ratio with zero freewheeling period;
 wherein said $T_{ON}$ time interval is controlled by continuously reducing the ON-time interval, while keeping
the OFF-time interval constant so that the freewheeling interval is continuously increasing causing the
continuous decrease of the output voltage bellow 2:1
fixed step-down voltage conversion ratio.
2. A converter as defined in claim 1,
wherein said first switch and said second switch are semiconductor bipolar transistors;
wherein said switching means include precise electronically controlling operation of said first switch relative to
said second switch, whereby two transition intervals, a
first transition interval and a second transition interval
are created during which said first switch and said second switch are turned OFF, and
whereby said first and said second transition intervals are
adjusted to minimize switching losses of said first switch
and said second switch.
3. A converter as defined in claim 2,
wherein said first switch and said second switch are semiconductor MOSFET transistors, and
whereby said first switch and said second switch have
substantially reduced conduction losses.
4. A converter as defined in claim 3,
wherein said second current rectifier switch is replaced
with a third MOSFET transistor,
wherein said switching means keep said third MOSFET
transistor switch ON during said $T_{OFF}$ time interval and
OFF during said $T_{ON}$ time interval, and
whereby said third MOSFET transistor switch has substantially reduced conduction losses.
5. A converter as defined in claim 4,
wherein said first current rectifier switch is replaced with a
fourth MOSFET transistor,
wherein said switching means keep said fourth MOSFET
transistor switch ON during said $T_{ON}$ time interval and
OFF during said $T_{OFF}$ time interval, and
whereby said fourth MOSFET transistor switch has substantially reduced conduction losses.
6. A converter as defined in claim 5,
wherein a Schottky diode is connected in parallel with said
fourth MOSFET transistor switch,
wherein a cathode end of said Schottky diode is connected
to a source end of said fourth MOSFET transistor
switch, and
whereby said Schottky diode allows simple drive and feedback control.
7. A switching DC-to-DC converter for providing power
from a DC voltage source connected between an input terminal and a common terminal to a DC load connected between
an output terminal and said common terminal, said converter
comprising:
 a first switch with one end connected to said input terminal;
 a second switch with one end connected to another end of
said first switch and the other end connected to the
output terminal;
 a resonant capacitor with one end connected to said another
end of said first switched;
 a first current rectifier switch with an anode end connected
to another end of said resonant capacitor;
 a second current rectifier switch with an anode end connected to said common terminal;
 a first resonant inductor with one end connected to a cathode end of said first current rectifier switch and another
end connected to output terminal;
 a second resonant inductor with one end connected to
cathode end of said second rectifier and the other end
connected to the other and of resonant capacitor;
 switching means for keeping said first switch ON and
said second switch OFF during $T_{ON}$ time interval, and
keeping said first switch OFF and said second switch
ON during $T_{OFF}$ time interval, where $T_{ON}$ and $T_{OFF}$
are complementary time intervals within one switching operating cycle $T_S$;
 wherein said first resonant inductor connected in series
with said first switch, said resonant capacitor, said
first current rectifier, and said second resonant inductor form a first resonant circuit during $T_{ON}$ time interval with the resonant period $T_{r1}$;
 wherein said second resonant inductor connected in
series with said second switch, said second current
rectifier and said resonant capacitor form a second
resonant circuit during $T_{OFF}$ time interval with the
resonant interval $T_{r2}$;
 wherein a first resonant frequency $f_{r1}$ of said first resonant circuit is independent of a second resonant frequency $f_{r2}$ of said second resonant circuit;
 wherein said $T_{ON}$ time interval is adjusted to one half of
a first resonant period or $0.5T_{r1}$ and said $T_{OFF}$ time
interval is adjusted to one half of a second resonant
period or $0.5T_{r2}$ to obtain a fixed 2:1 step-down conversion ratio with zero freewheeling period.
 wherein said $T_{ON}$ time interval is controlled by continuously reducing the ON-time interval, while keeping
the OFF-time interval constant so that the freewheeling interval is continuously increasing causing the continuous decrease of the output voltage bellow 2:1 fixed step-down voltage conversion ratio.

8. A converter as defined in claim 7,
wherein said first switch and said second switch are semiconductor bipolar transistors;
wherein said switching means include precise electronically controlling operation of said first switch relative to said second switch, whereby two transition intervals, a first transition interval and a second transition interval are created during which said first switch and said second switch are turned OFF, and
whereby said first and said second transition intervals are adjusted to minimize switching losses of said first switch and said second switch.

9. A converter as defined in claim 8,
wherein said first switch and said second switch are semiconductor MOSFET transistors, and
whereby said first switch and said second switch have substantially reduced conduction losses.

10. A converter as defined in claim 9,
wherein said second current rectifier switch is replaced with a third MOSFET transistor,
wherein said switching means keep said third MOSFET transistor switch ON during said $T_{OFF}$ time interval and OFF during said $T_{ON}$ time interval, and
whereby said third MOSFET transistor switch has substantially reduced conduction losses.

11. A converter as defined in claim 10,
wherein said first current rectifier switch is replaced with a fourth MOSFET transistor,
wherein said switching means keep said fourth MOSFET transistor switch ON during said $T_{ON}$ time interval and OFF during said $T_{OFF}$ time interval, and
whereby said fourth MOSFET transistor switch has substantially reduced conduction losses.

12. A converter as defined in claim 11,
wherein a Schottky diode is connected in parallel with said fourth MOSFET transistor switch,
wherein a cathode end of said Schottky diode is connected to a source end of said fourth MOSFET transistor switch, and
whereby said Schottky diode allows simple drive and feedback control.

13. A converter as defined in claim 7,
wherein said one end of said second resonant inductor is disconnected from said second end of said second switch,
wherein said another end of said second resonant inductor is disconnected from said output terminal,
wherein said second end of said second switch is connected to said output terminal,
wherein said cathode end of said second current rectifier switch is disconnected from said anode end of said first current rectifier switch,
wherein said one end of said second resonant inductor is connected to said cathode end of said second current rectifier switch and said another end of said second resonant inductor is connected to said anode end of said first current rectifier switch.

14. A method for storageless switched-mode DC-to-DC step-down power conversion comprising:
providing two controllable three-terminal switches and two rectifier switches, all having an ON-time interval $DT_S$ and an OFF-time interval $(1-D)T_S$ within a switching time period $T_S$ where D is a duty ratio of the switches;
providing a first resonant inductor operating during said ON-time interval in series with one controllable switch, one rectifier switch, and a resonant capacitor with resonant period $T_{r1}$ and being flux-balanced within said ON-time period;
providing a second resonant inductor operating during said OFF-time interval in series with another controllable switch, another rectifier switch, and said resonant capacitor with resonant period $T_{r2}$ and being flux-balanced within said OFF-time period;
providing said resonant capacitor being charged from a DC source during said ON-time interval and being discharged into a DC load during said OFF-time interval;
adjusting ON-time to be equal to $T_{r1}$ and adjusting OFF time to be equal to $T_{r2}$ so that the fixed 2:1 step-down conversion ratio is obtained with zero freewheeling interval;
continuously reducing ON-time, while keeping the OFF-time constant so that the output voltage is continuously reduced bellow 2:1 DC voltage conversion ratio.

15. A method for storageless switched-mode DC-to-DC step-down power conversion as defined in claim 14 wherein said two controllable three-terminal switches are bipolar transistors and said two-terminal switches are current rectifiers (diodes).

16. A method for storageless switched-mode DC-to-DC step-down power conversion as defined in claim 15 wherein said two controllable three-terminal switches are MOSFET transistors.

17. A method for storageless switched-mode DC-to-DC step-down power conversion as defined in claim 16 wherein one said current rectifier switch is replaced with a MOSFET transistor being turned ON and OFF as a synchronous rectifier to reduce conduction losses.

18. A method for storageless switched-mode DC-to-DC step-down power conversion as defined in claim 17 wherein another said current rectifier switch is replaced with a MOSFET transistor to reduce conduction losses.

19. A method for storageless switched-mode DC-to-DC step-down power conversion as defined in claim 18 wherein a Schottky diode was connected in parallel with said one current rectifier to allow simple drive and feedback control implementation.

* * * * *